US008128397B2

(12) United States Patent  
Ciccone et al.

(10) Patent No.: US 8,128,397 B2
(45) Date of Patent: Mar. 6, 2012

(54) CROSS-OVER NOZZLE SYSTEM FOR STACK MOLDS

(75) Inventors: Vince Ciccone, Kleinberg (CA); John M. Plut, Kitchener (CA); Petrica Maran, Mississauga (CA)

(73) Assignee: Injectnotech Inc., Mississauga (CA)

( * ) Notice: Subject to any disclaimer, the term of this patent is extended or adjusted under 35 U.S.C. 154(b) by 3 days.

(21) Appl. No.: 12/848,070

(22) Filed: Jul. 30, 2010

(65) Prior Publication Data

US 2011/0086124 A1 Apr. 14, 2011

Related U.S. Application Data

(63) Continuation-in-part of application No. 12/648,104, filed on Dec. 28, 2009, now abandoned, which is a continuation of application No. 12/191,266, filed on Aug. 13, 2008, now Pat. No. 7,658,607, which is a continuation-in-part of application No. 11/836,650, filed on Aug. 9, 2007, now Pat. No. 7,427,197, which is a continuation of application No. 11/102,566, filed on Apr. 8, 2005, now Pat. No. 7,261,553.

(60) Provisional application No. 60/561,053, filed on Apr. 9, 2004.

(51) Int. Cl.
    *B29C 45/22* (2006.01)
(52) U.S. Cl. ............... 425/564; 425/572; 425/588
(58) Field of Classification Search ............ 425/564, 425/572, 588
    See application file for complete search history.

(56) References Cited

U.S. PATENT DOCUMENTS

| 4,303,382 A | 12/1981 | Gellert |
| 4,309,163 A | 1/1982 | Cottancin |
| 4,330,257 A | 5/1982 | Rees et al. |
| 4,599,064 A | 7/1986 | Landis et al. |
| 5,069,615 A | 12/1991 | Schad et al. |
| 5,324,192 A | 6/1994 | Zakich |
| 5,522,720 A | 6/1996 | Schad |
| 5,773,049 A | 6/1998 | Kashiwa et al. |
| 5,846,472 A | 12/1998 | Rozema et al. |
| 6,409,955 B1 | 6/2002 | Schmitt et al. |
| 6,575,731 B1 | 6/2003 | Olaru et al. |
| 6,835,060 B2 | 12/2004 | Sicilia |
| 6,852,265 B2 | 2/2005 | Olaru et al. |
| 6,955,534 B2 | 10/2005 | Dewar |
| 7,122,145 B2 | 10/2006 | Olaru et al. |
| 7,128,565 B2 | 10/2006 | DiSimone et al. |
| 7,261,553 B2 * | 8/2007 | Ciccone et al. ............... 425/572 |
| 7,427,197 B2 * | 9/2008 | Ciccone et al. ............... 425/564 |
| 7,658,607 B2 * | 2/2010 | Ciccone et al. ............... 425/564 |
| 2003/0206987 A1 | 11/2003 | George et al. |

FOREIGN PATENT DOCUMENTS

| CA | 2407163 | 4/2004 |
| CA | 2416895 | 7/2004 |
| WO | WO 2005/025833 | 3/2005 |

* cited by examiner

*Primary Examiner* — Timothy Heitbrink
(74) *Attorney, Agent, or Firm* — Kilpatrick Townsend & Stockton LLP

(57) ABSTRACT

A crossover nozzle system for transferring molten plastic from an inlet at the center of the stationary platen of an injection machine to the main manifold of the molding chambers of the stack molds of the injection molding machine. The crossover nozzle system incorporates liquid cooling to create a high viscosity viscous seal from molten plastic at a parting line between moveable components. Accordingly, no other seal is required between the components.

21 Claims, 40 Drawing Sheets

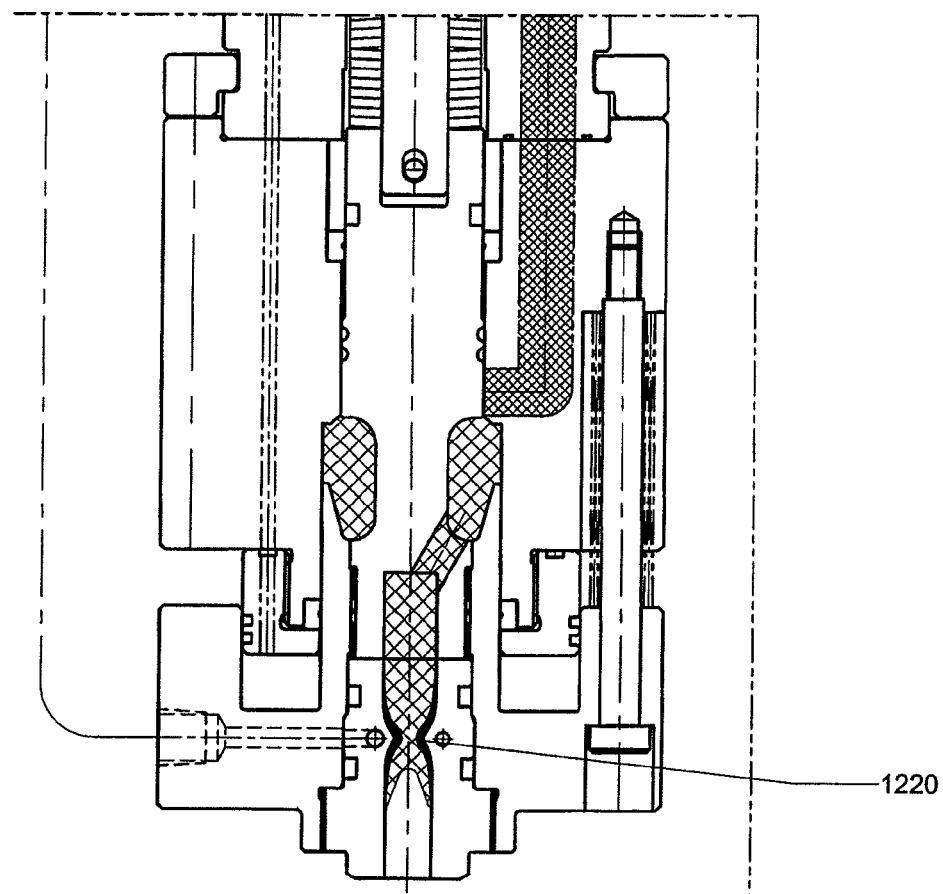
Fig. 32
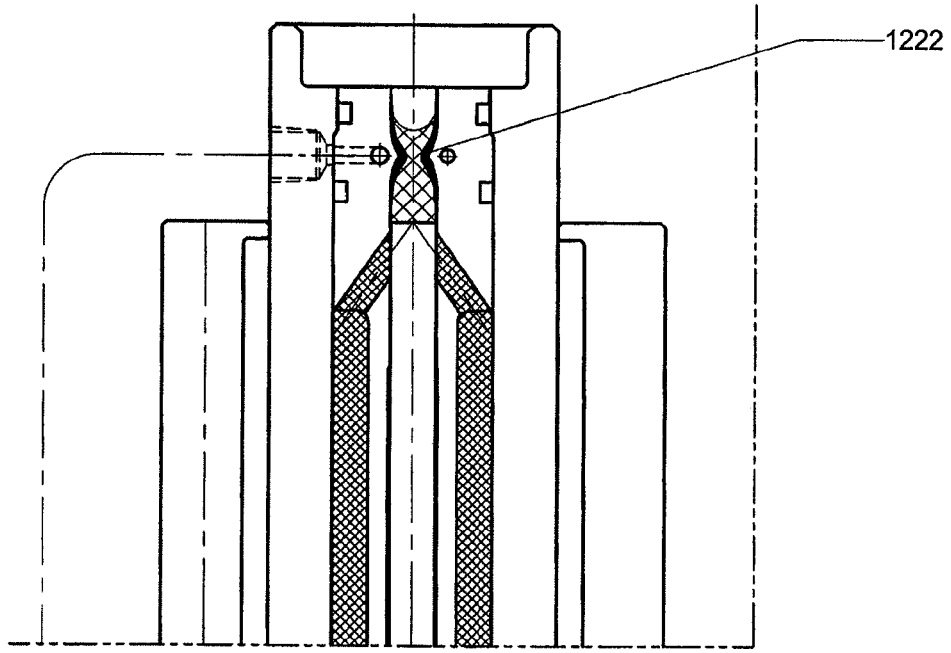

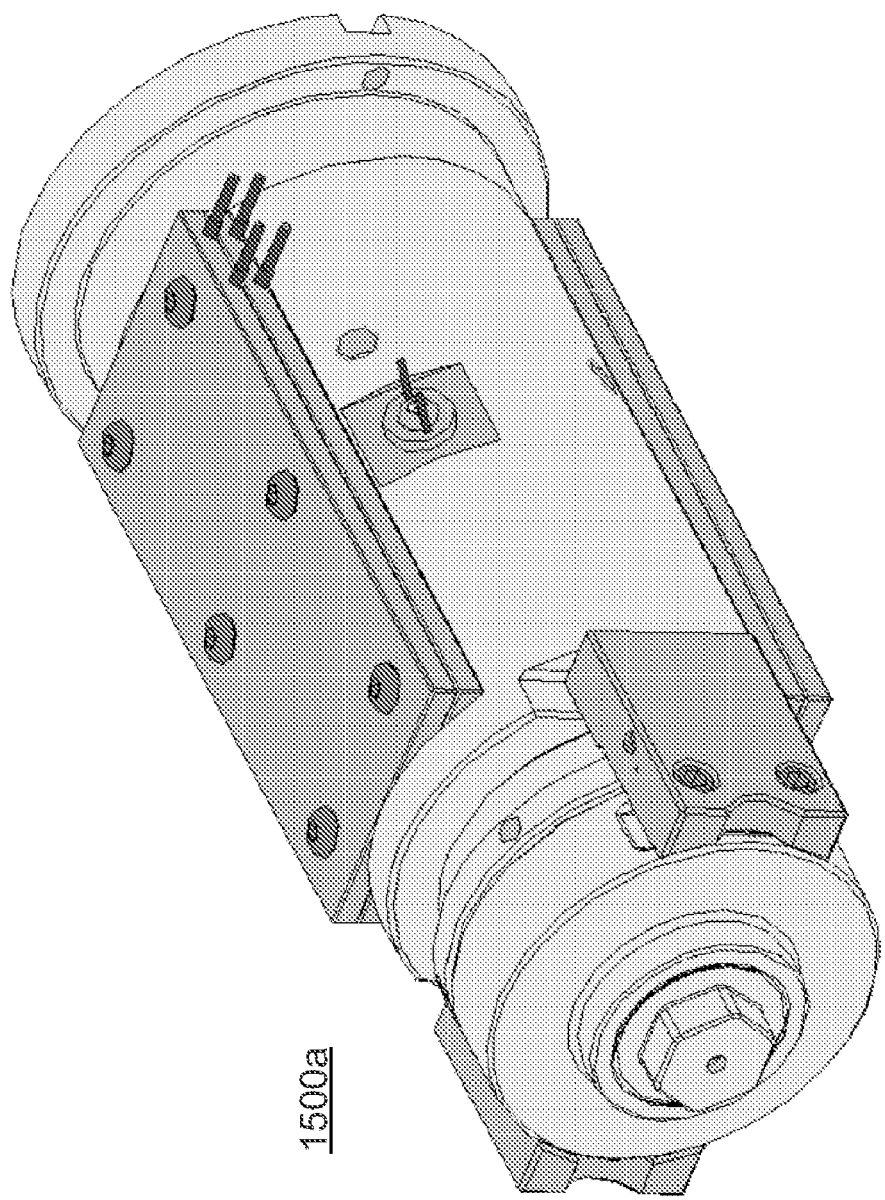

CROSS-OVER NOZZLE SYSTEM FOR STACK MOLDS

CROSS-REFERENCES TO RELATED APPLICATIONS

This application is a continuation-in-part of U.S. application Ser. No. 12/648,104, filed on Dec. 28, 2009, which is a continuation of U.S. application Ser. No. 12/191,266, filed on Aug. 13, 2008, now U.S. Pat. No. 7,658,607, which is a continuation-in-part of U.S. application Ser. No. 11/836,650, filed on Aug. 9, 2007, now U.S. Pat. No. 7,427,197, which is a continuation of U.S. application Ser. No. 11/102,566, filed on Apr. 8, 2005, now U.S. Pat. No. 7,261,553, which claims the benefit of U.S. Provisional Application No. 60/561,053, filed on Apr. 9, 2004, the entire contents of which are herein incorporated by reference for all purposes.

BACKGROUND OF THE INVENTION

The present invention relates to injection molding machines, and in particular, to a system that transports molten plastic to molding chambers of stack molds in an off-center location, or when the transfer of the molten plastic needs to be in the center of the mold as in a split sprue bar.

For injection molds having two or more cavities, it is desired to ensure that molten plastic reaches all molding chambers at the approximately same time, or at least such that preferential flow to any one of the molding chambers is minimized. For most injection molds, molten plastic is transferred from the stationary machine platen to the stationary side of the injection mold and to the molding chamber(s). For stack molds as the one shown in FIG. 1 (prior art), molten plastic is transferred through the sprue, into a long sprue bar extending to the manifold, located in the center of the mold, which then transfers it equally to all cavities involved.

However, for stack molds as the ones shown in FIG. 2 (prior art) and FIG. 3 (prior art), where the centerline of molding chambers coincides with centerline of mold, molten plastic cannot reach the manifold directly along the centerline, but rather must take a detour route and enter the manifold at an offset location. For such stack molds, a system is needed to ensure a proper flow of molten plastic to the molding chambers.

BRIEF SUMMARY OF THE INVENTION

The embodiments of the present invention provide a system that transfers molten plastic from the inlet at the center of stationary platen of injection machine, through a feeder manifold and an off-center crossover nozzle, to the main manifold of the stack mold. The embodiments of the present invention are especially valuable when transfer of molten plastic directly along the centerline of mold is not possible, or when the transfer of molten plastic is in the center of the mold as a split sprue bar.

For a further understanding of the nature and advantages of the invention, reference should be made to the following description taken in conjunction with the accompanying drawings.

BRIEF DESCRIPTION OF THE DRAWINGS

FIG. 32 is an enlarged section detail of the central portion of FIG. 31, showing the opening of the crossover nozzle system between injection cycles.

FIG. 40 is a perspective view of the crossover nozzle system of FIG. 38, showing the accessibility from the front of the system.

DETAILED DESCRIPTION OF THE INVENTION

Figure 1:
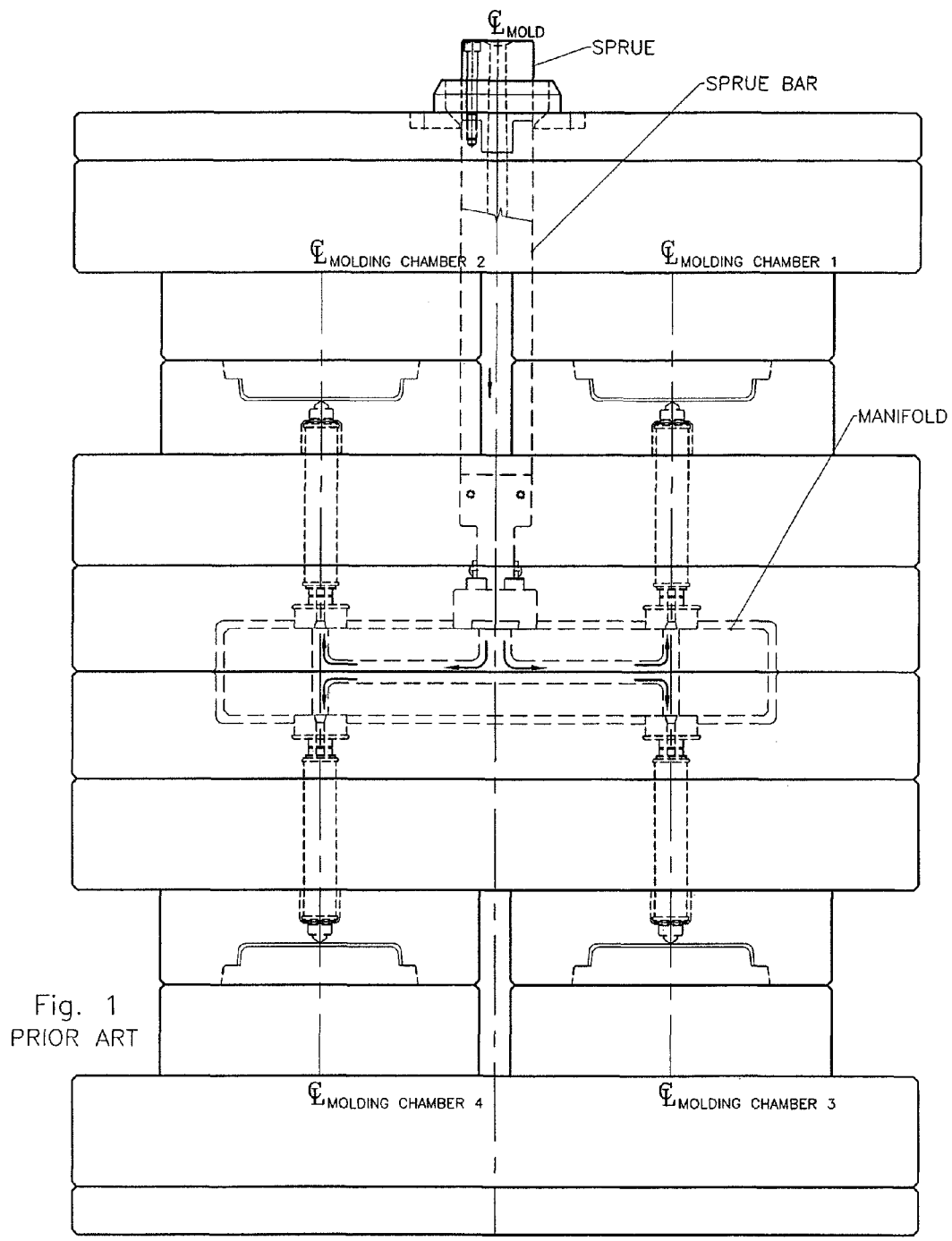
FIG. 1 is an exemplary diagram of a prior art stack mold.
Figure 2:
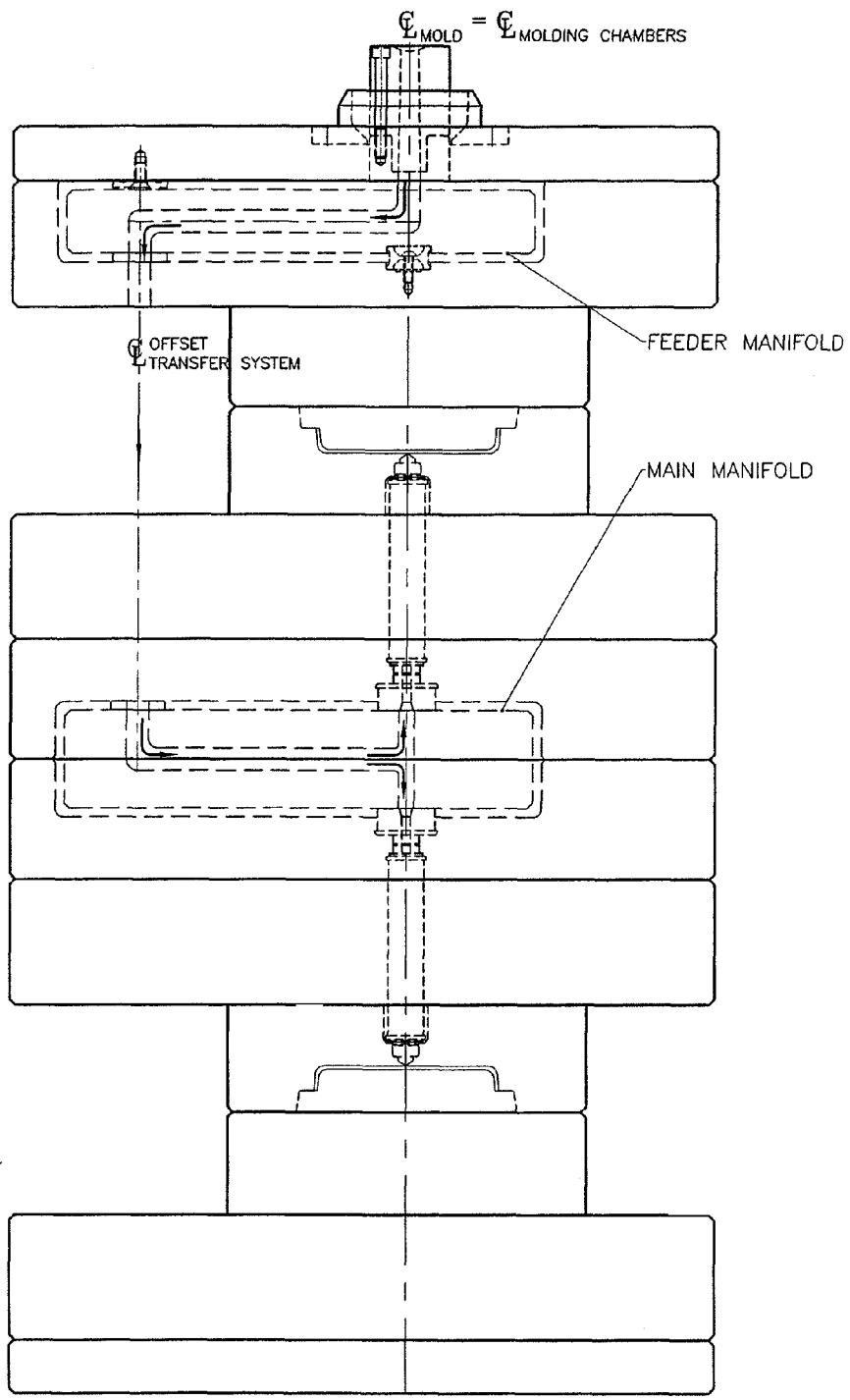
FIGS. 2-3 are exemplary diagrams of prior art stack molds where the centerline of molding chambers coincides with centerline of the mold.
Figure 3:
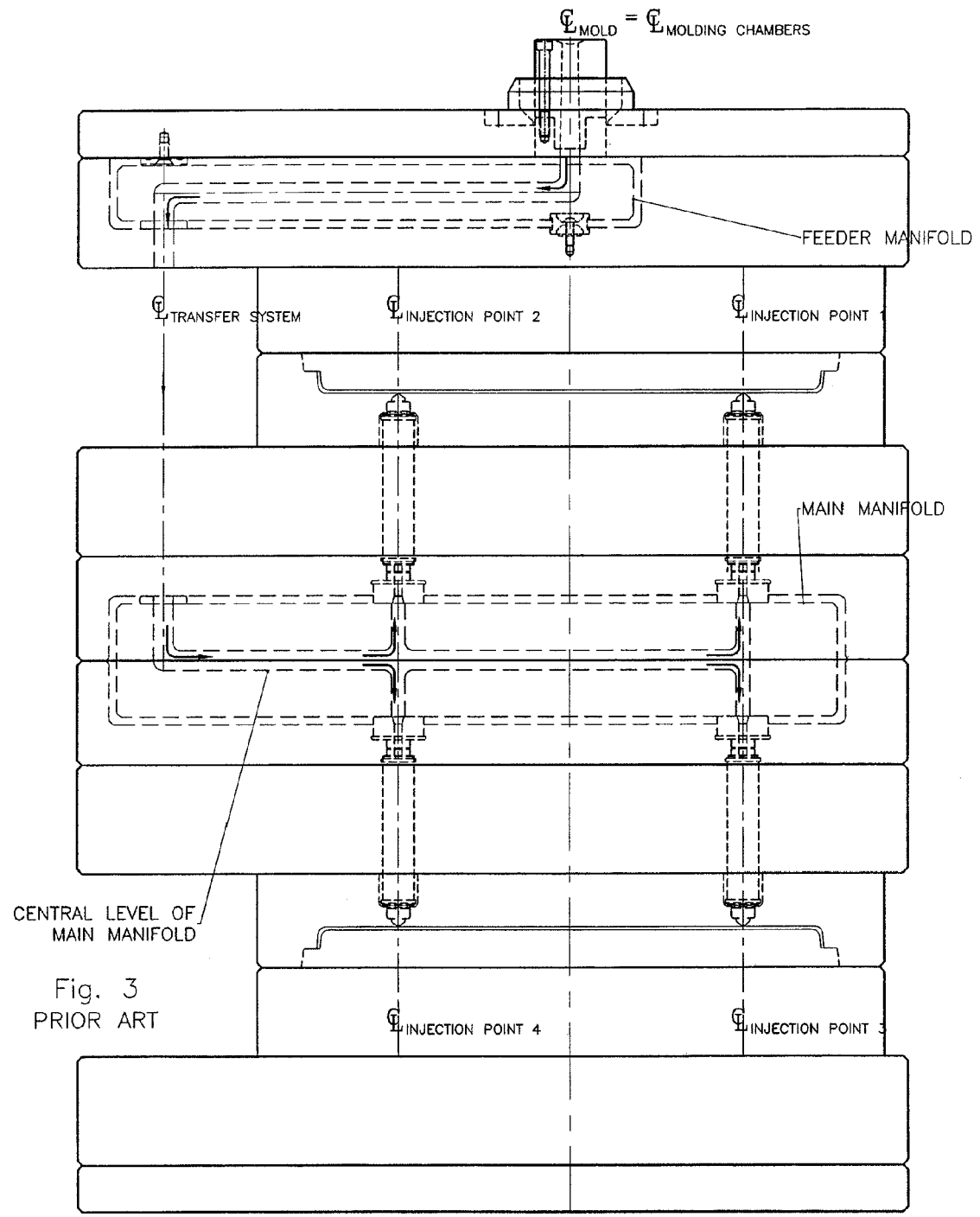
Figure 4:
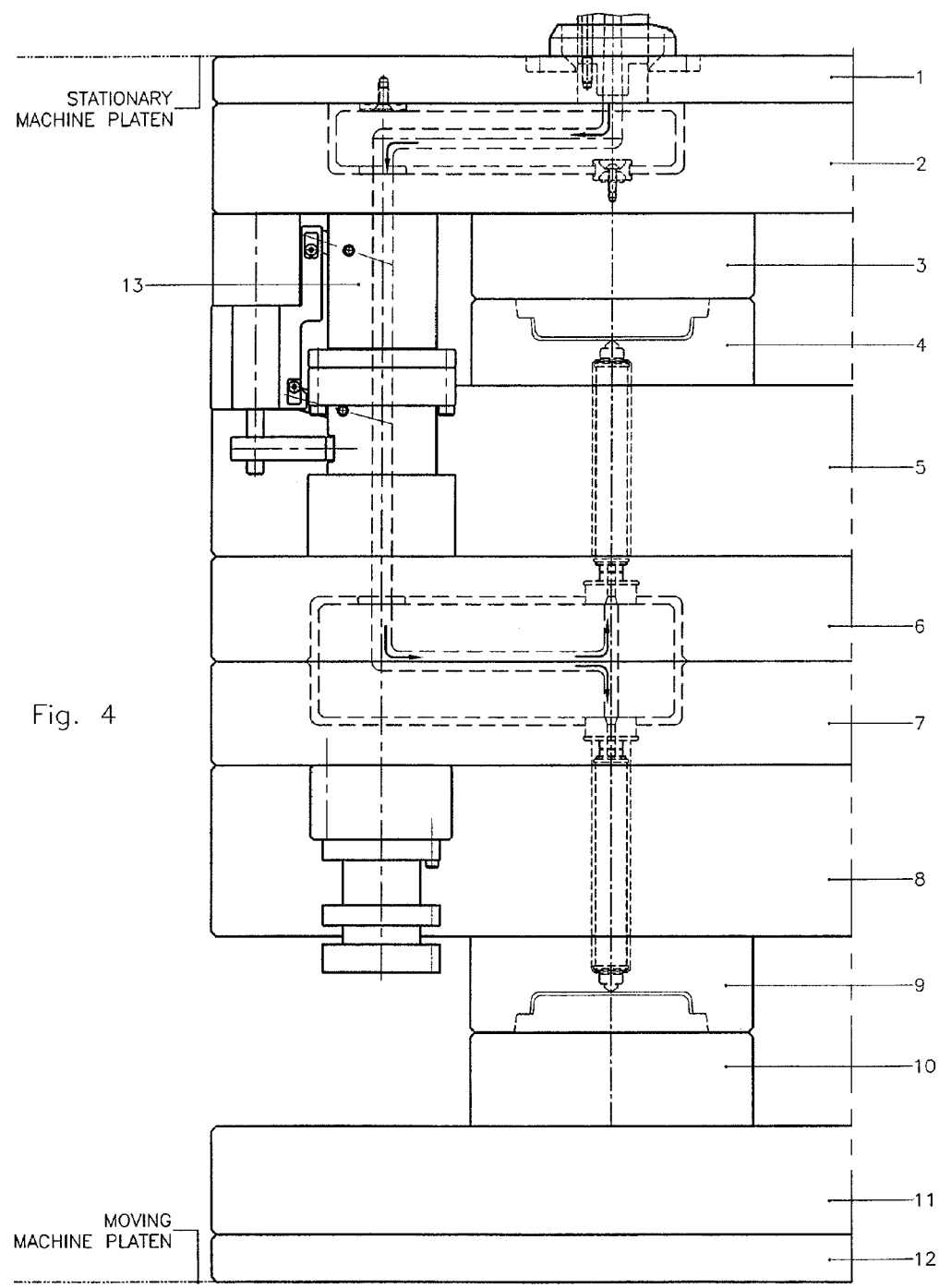
FIG. 4 is an exemplary partial view of one embodiment of a crossover nozzle system in accordance with the present invention, shown with the mold closed.

With reference to FIGS. 4 through 18, a stack mold that may be configured to use the crossover nozzle system in accordance with the embodiment of the present invention includes of a top plate 1, feeder plate/stationary core plate 2, stationary core 3, stationary cavity 4, stationary cavity plate 5, stationary manifold plate 6, moving manifold plate 7, moving cavity plate 8, moving cavity 9, moving core 10, moving core plate 11, bottom plate 12 and crossover nozzle system 13. It should be understood that fewer or more mold plates or blocks may be employed depending on specific design requirements.

Stationary core 3 is secured to feeder plate 2, which is secured to top plate 1. Top plate 1 is bolted to stationary machine platen. Similarly, moving core 10 is secured to moving core plate 11, which is secured to bottom plate 12. Bottom plate 12 is bolted to moving machine platen. Stationary cavity 4 is secured to stationary cavity plate 5, which is secured to stationary manifold plate 6. Moving cavity 9 is secured to moving cavity plate 8, which is secured to moving manifold plate 7. Stationary manifold plate 6 and moving manifold plate 7 are secured together. So, the mold has three main portions: a core side attached to the stationary machine platen (e.g., this portion is stationary), another core side attached to the moving machine platen (this portion opens for a double stroke, once for each mold cycle), and a central portion containing the cavity sides (which rides on the machine tie bars and opens for a full stroke, once for each mold cycle). At the end of each mold cycle, the mold opens equally on both sides to release the molded parts.

As used herein, the term "stack mold" refers to a two-level stack mold. However, the crossover nozzle design in accordance with the embodiments of the present invention can be used within a three-level or a four-level stack mold, with some alteration to its configuration, but using the same design concept as described herein. Furthermore, the crossover nozzle system may be used in the context of a reverse-gated stack mold, where the cores and cavities are reversed such that cavities are secured to machine platen portions and cores are secured to the central portion of the mold. In such cases, injection takes place from the core side, which is sometimes necessary, for example if the outer side (cavity side) of the molded article must be free of any bumps for aesthetic or functional reasons.

Figure 5:
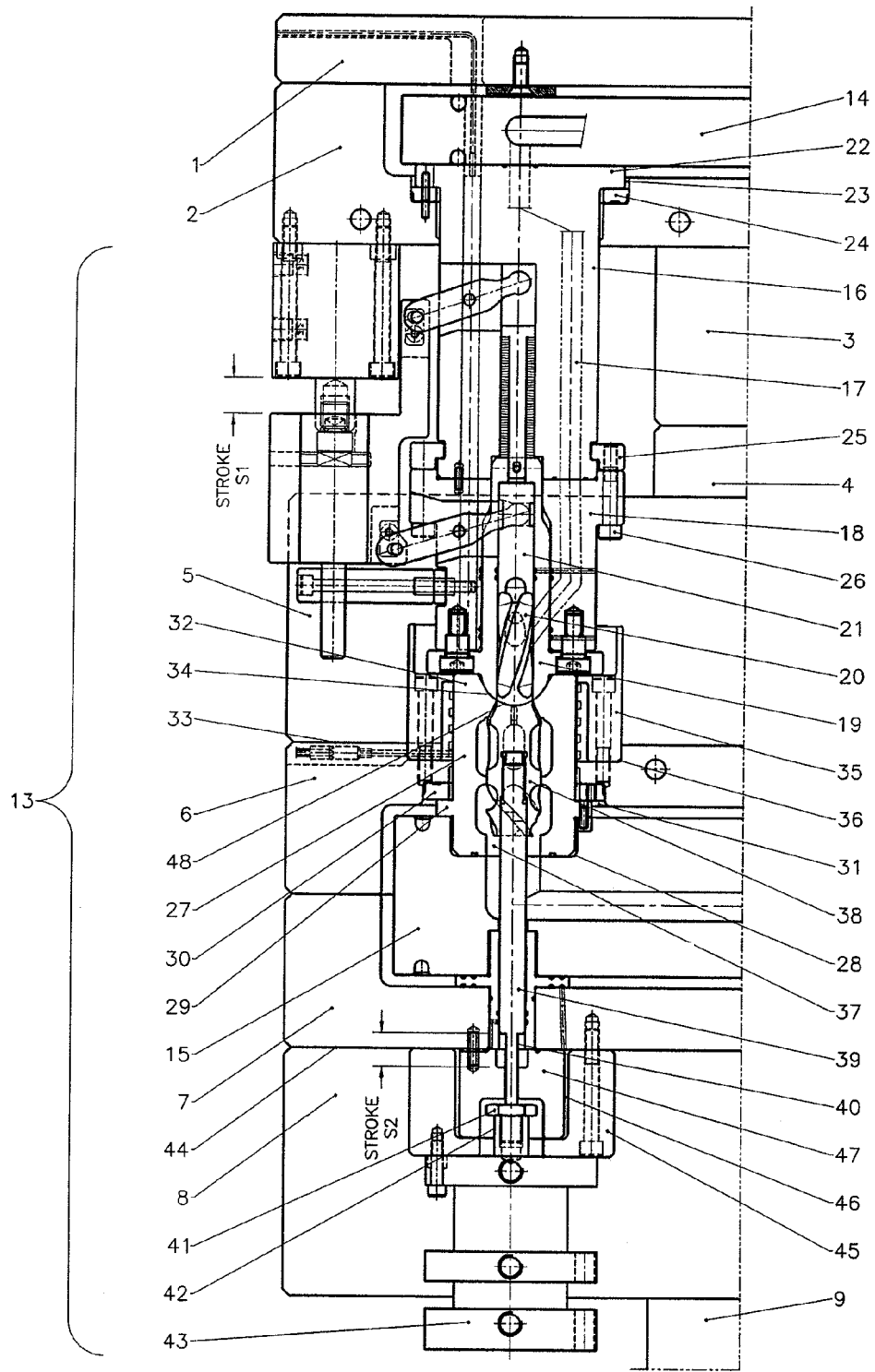
FIG. 5 is an exemplary partial cross-section view of one embodiment of a crossover nozzle system, shown with sprue valve closed and mold closed.

Shown in FIG. 5, one embodiment of the crossover nozzle system 13 transfers molten plastic from feeder manifold 14 to main manifold 15 through a succession of components. From feeder manifold 14, plastic enters the primary sprue bar 16 through holes 17. It continues on, through primary sprue bar extension 18, into a floating sprue 19. From here, plastic is transferred into a number of spiral grooves 20 of a primary sprue valve. Flange 22 of primary sprue bar 16, located in a pocket 23 in feeder plate 2, is pressed between feeder manifold 14 on one side, and a primary pressure ring 24, also located in pocket 23, on opposite side. A pressure pad is used as backing for the feeder manifold 14, in line with the crossover nozzle 13, to transfer the injection pressures to the top plate 1. This is a safety measure designed to avoid deflection of the manifold as can be caused by the high pressures of the crossover nozzle system 13. Split-ring connectors 25 and bolts 26 secure primary sprue bar extension 18 to primary sprue bar 16.

A secondary sprue 27 is installed in a pocket 28 in main manifold 15. Annular flange 29 of secondary sprue 27 is pressed between main manifold 15 on one side, and a secondary pressure ring 30 on opposite side, secondary pressure ring 30 being installed in a pocket 31 in stationary manifold plate 6. Opposite end 32 of secondary sprue 27 extends beyond surface 33 of stationary manifold plate 6, and comes in contact with floating sprue 19 along a spherical surface 34. A secondary sprue locating ring 35, secured in a pocket 36 on surface 33 of stationary manifold plate 6, surrounds end 32 of secondary sprue 27 and centers it into position. Beyond the spherical surface 34, secondary sprue 27 has a central hole 37 in which a secondary sprue valve 38 can slide. Secondary sprue valve 38 is activated by an extension rod 39. At the opposite end, extension rod 39 has two flat surfaces 40 and is in contact with a T-coupling 41, secured to the piston 42 of a pneumatic cylinder 43. Pneumatic cylinder 43 is connected to moving manifold plate 7 through a cylinder support 45, mounted onto surface 44 of moving manifold plate 7. Also mounted to moving manifold plate 7, and housed in a pocket 46 in cylinder support 45, is an extension rod stop 47. Piston 42 of pneumatic cylinder 43 is always activated forward. The functioning of this cylinder is explained below in further detail.

Figure 6:
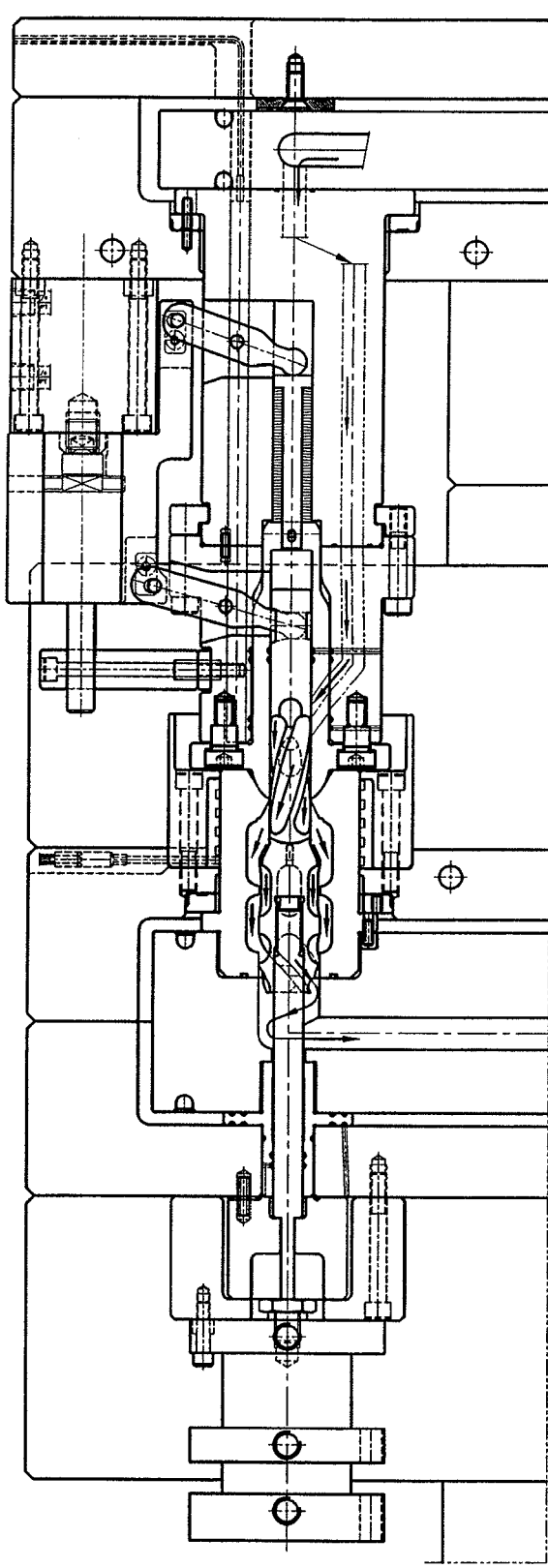
FIG. 6 is a partial cross-section view similar to FIG. 5, shown with sprue valve open and mold closed.

Primary sprue valve 21 and secondary sprue valve 38 have contact along a spherical surface 48, of equal radius as spherical surface 34. Primary sprue valve 21 and secondary sprue valve 38 are the main moving parts of the cross-over nozzle 13, extending/retracting once per mold cycle, to allow/restrict the flow of molten plastic from feeder manifold 14 to main manifold 15. FIG. 6 shows the crossover nozzle system with the sprue valve extended (open). The flow of molten plastic is shown with arrows, from feeder manifold 14, through primary sprue bar 16, primary sprue bar extension 18, floating sprue 19 and primary sprue valve 21, into secondary sprue 27 and secondary sprue valve 38, which transfer it into the main manifold 15.

Figure 7:
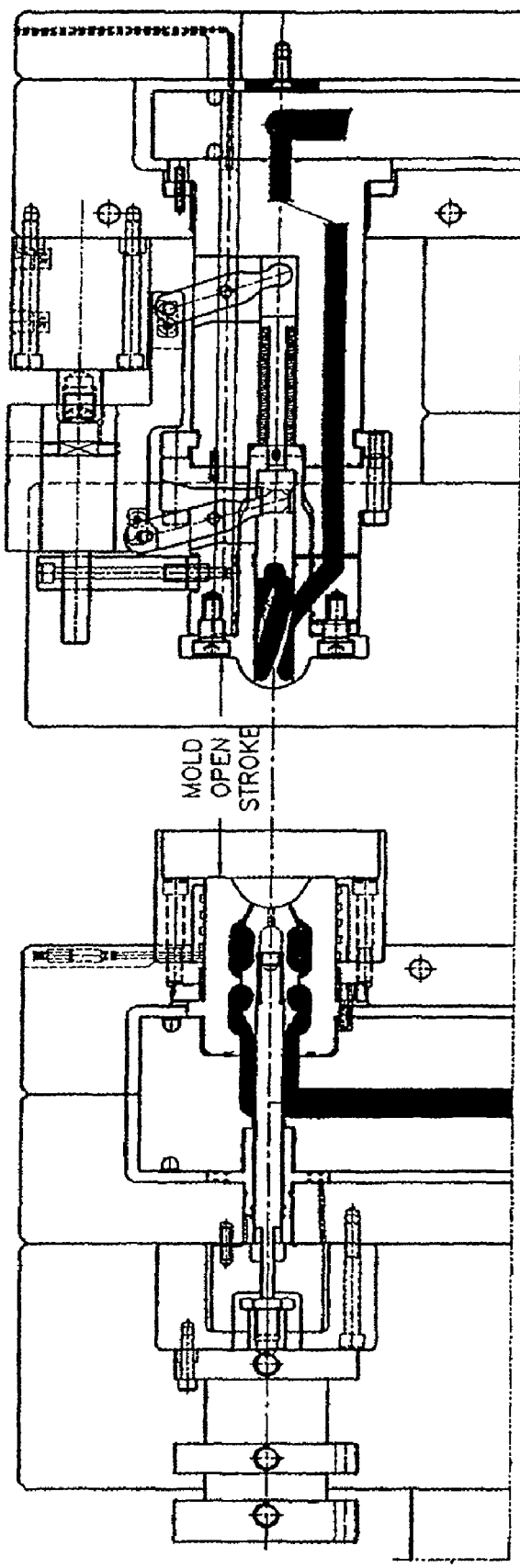
FIG. 7 is a partial cross-section view of the crossover nozzle system of FIG. 5, shown with mold open. Valves are closed on both sides, to prevent plastic leakage.

FIG. 7 shows the position of crossover nozzle components when the mold is open. Both primary sprue valve 21 and secondary sprue valve 38 are closed to prevent plastic leakage outside the system. Hatched (filled) areas represent molten plastic, present throughout the system in flow channels and linear/spiral grooves, but sealed inside the system.

Figure 8:
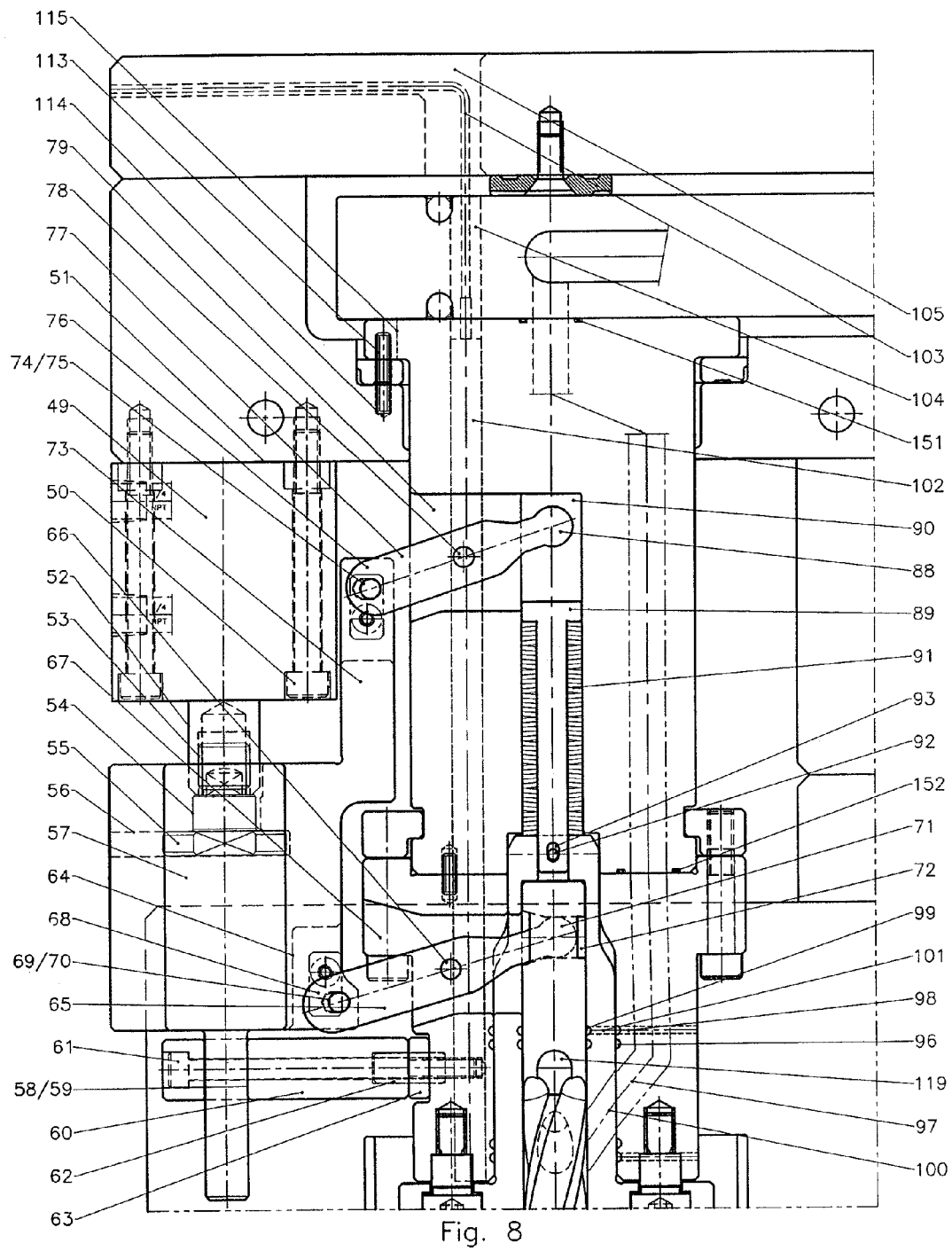
FIG. 8 is a cross-section detail of the top portion (primary side) of the crossover nozzle system of FIG. 5.

As shown in FIG. 8, the primary sprue valve 21 is activated by a hydraulic cylinder 49, mounted with bolts 50 onto surface 51 of feeder plate 2. Piston 52 of hydraulic cylinder 49 has a threaded engagement 53 with an activating T-coupling 54. Activating T-coupling 54 has a flanged end 55, slid into a slot 56 of an activating block 57. Extension and retraction movements of piston 52 of hydraulic cylinder 49 are transmitted to activating block 57 through the flat-surface contact between flanged end 55 of activating T-coupling 54 and slot 56 of activating block 57. At the opposite end, activating block 57 has an extension 58 in the shape of a peg, which rides in slot 59 of a guide 60. Guide 60 is secured to primary sprue bar extension 18 with bolts 61 and located with tubular dowels 62. Heat transfer from heated primary sprue bar extension 18 to unheated guide 60 is minimized by the use of an insulating plate 63 between these two components. Contact between extension 58 of activating block 57 and slot 59 of guide 60 helps guide the extend/retract movement of the activating block 57, as initiated by hydraulic cylinder 49.

The side of activating block 57 facing the primary sprue bar extension 18 has a slot 64. An activating lever 65, which can pivot about the axis of a dowel pin 66 secured in the body of primary sprue bar extension 18, passes through pocket 67 of primary sprue bar extension 18. End 68 of activating lever 65 is loosely situated in slot 64 of activating block 57, being held there by a dowel pin 69 that slides in an oval slot 70 of the activating block 57. Opposite end 71 of activating lever 65 is located in a matching slot 72 in the back end portion of primary sprue valve 21.

Activating block 57 has a forked extension 73 located in the space formed between the hydraulic cylinder 49 and primary sprue bar 16. Forked extension 73 has an oval slot 74 in which a dowel pin 75 can move. Dowel pin 75 is installed in loose engagement in end 76 of a compression lever 77. Compression lever 77, which can pivot about the axis of a dowel pin 78 secured in body of primary sprue bar 16, passes through pocket 79 of primary sprue bar 16.

Figure 9:
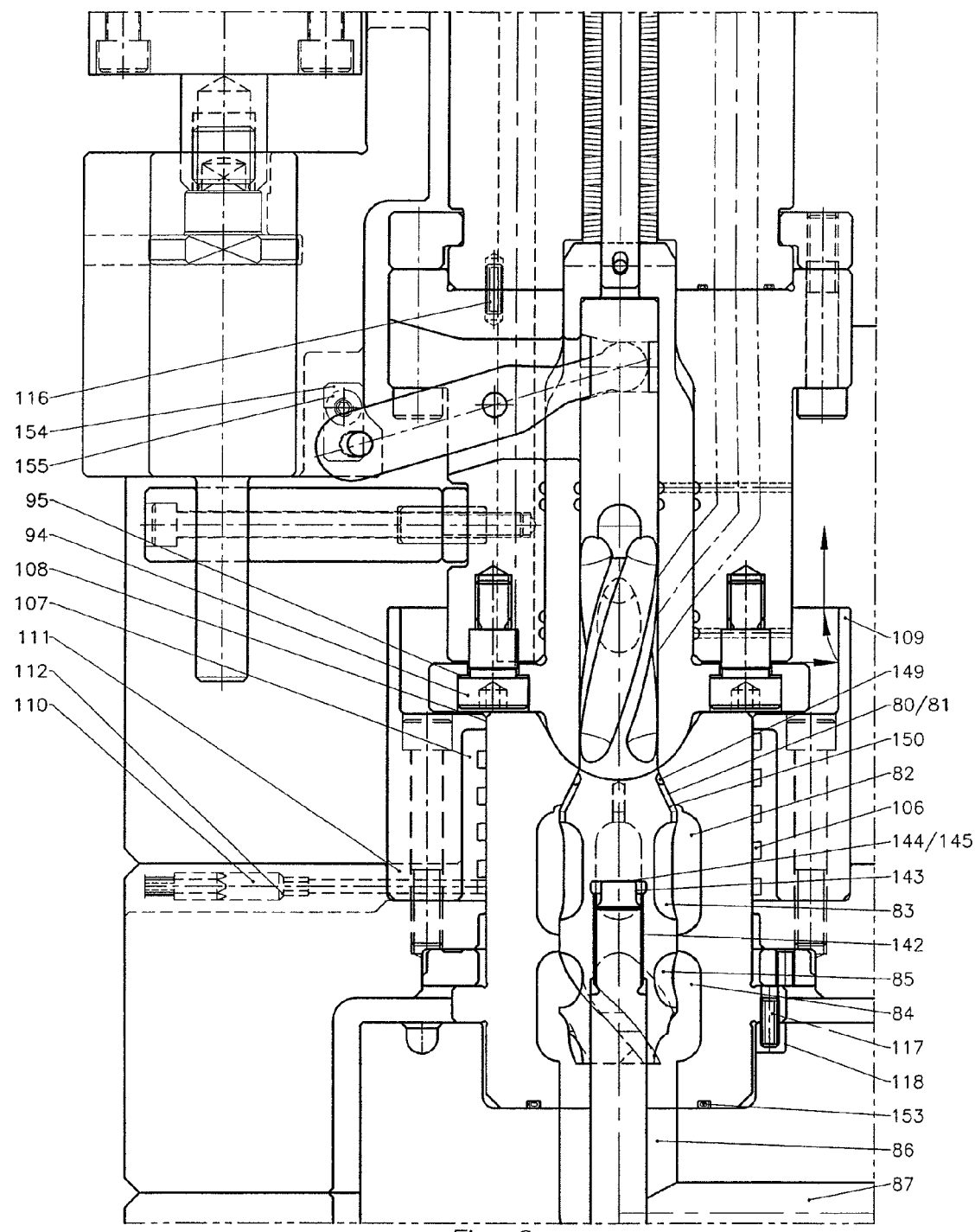
FIG. 9 is a cross-section detail of the central portion of the crossover nozzle system of FIG. 5.

When activating block 57 retracts, movement is transferred to both activating lever 65 and compression lever 77, causing them to pivot about dowel pins 66 and 78 respectively (see FIGS. 6 and 8 and open sprue valves as explained below):

With reference to FIGS. 8 and 9, end 71 of activating lever 65 pushes primary sprue valve 21 forward, which causes secondary sprue valve 38 to move back, while staying always in contact with primary sprue valve 21, through spherical surface 48, as activated by piston 42 of pneumatic cylinder 43. As secondary sprue valve 38 moves back, away from inner cone 80 of secondary sprue 27, molten plastic from spiral grooves 20 of primary sprue valve 21 is allowed to travel in the space formed between outer cone 81 of secondary sprue valve 38 and inner cone 80 of secondary sprue 27, and into linear grooves 82 of secondary sprue 27. Molten plastic then moves from grooves 82 of secondary sprue 27 plastic moves into linear grooves 83 of secondary sprue valve 38 and then into linear grooves 84 of secondary sprue 27. From there, plastic is transferred into spiral grooves 85 of secondary sprue valve 38, where it starts swirling and moves into the main manifold inlet 86. Flow line 87 of main manifold 15 distributes molten plastic to injection points. The reason plastic is passed through this succession of grooves is to create a pressure reducing position when secondary sprue valve 38 is closed. As secondary sprue valve 38 closes, its cylindrical portion located between grooves 83 and 85 comes in contact with cylindrical portion located between grooves 82 and 84 of the secondary sprue 27. The seal-off contact separates the high-pressure molten plastic of holes 86 and 87 from the low-pressure zone of grooves 82 and 83, thus protecting cones 80 and 81 from the high pressures existent in the flow channels of the mold.

End 88 of compression lever 77 pushes spring washer compression pin 89 forward. Spring washer compression pin 89 is installed in a central hole 90 in primary sprue bar 16, and can move forward by compressing spring washers 91, installed in series and in parallel in same hole 90. Spring washers 91 transfer the compression force to the back of floating sprue 19, to ensure contact of floating sprue 19 with secondary sprue 27 on spherical surface 34. Note: When end 88 of compression lever 77 releases contact with spring washer compression pin 89, spring-back of compression pin 89 is controlled by dowel pin 92 secured in back end of floating sprue 19. This dowel pin passes through on oval slot 93 in the front end of compression pin 89. Play of dowel pin 92 in slot 93 limits the stroke of compression pin 89.

Floating sprue 19 is loosely secured to primary sprue bar extension 18 with a number of shoulder bolts 94. There is a small clearance between bottom of holes 95 in floating sprue 19 and heads of shoulder bolts 94, so that heads of shoulder bolts 94 do not come in contact at the back with bottom of holes 95. This is a safety feature allowing some "floating provision" for floating sprue 19, working together with compression provided by spring washers 91 as activated by end 88 of compression lever 77 and compression pin 89. This floating provision is designed to compensate for manufacturing tolerances and heat expansions of the system's components.

Collector grooves and escape holes are provided in primary sprue bar extension 18 and floating sprue 19 for any leaks that might happen as molten plastic is transferred to primary sprue valve 21. Collector grooves 96 are provided on the inside of primary sprue bar extension 18, on both sides of inlets 97. Plastic collected by grooves 96 can be released through escape holes 98 connecting grooves 96 to outer wall of primary sprue bar extension 18. Collector grooves 99 are provided on one side of inlets 100 only, to seal back end of floating sprue 19. A similar escape hole 101 is provided through wall of floating sprue 19, connecting it to escape hole 98 of primary sprue bar extension 18.

On the primary side of the crossover nozzle system 13, long cartridge heaters 102 pass through holes in primary sprue bar 16 and primary sprue bar extension 18, to hold desired temperature of molten plastic as it travels through the crossover nozzle 13. Wires 103 from cartridge heaters 102 pass through holes 104 in feeder manifold 14 and through grooves 105 in top plate 1. Similarly, on secondary side, a coil heater 106 is installed around end 32 of secondary sprue 27, to keep the plastic at required melt temperature until it reaches the main manifold 15. A pocket 107 is provided inside secondary sprue locating ring 35 to house coil heater 106. Next to pocket 107, secondary sprue locating ring 35 has a small portion 108 in contact with end 32 of secondary sprue 27, for centering purpose. This is followed by a tubular shield 109, designed to direct the hot plastic towards the primary side, and prevent it from squirting towards the mold operator in case of accidental sealing failure of the crossover nozzle system 13. Wire 110 extends from coil heater 106, through a slot 111 at back of secondary sprue locating ring 35, into groove 112 on surface 33 of stationary manifold plate 6.

It is evident that components of the crossover nozzle 13 are precisely oriented radially, relative to one another, so that molten plastic can travel through the system without blockages. Dowel pin 113 locates primary sprue bar 16 radially in reference to feeder plate 2. Dowel pin 113 passes through primary pressure ring 24, having one end press-fit in a hole 114 in pocket 23 of feeder plate 2, while opposite end is housed in an open slot 115 in flange 22 of primary sprue bar 16. Dowel pin 116 orients primary sprue bar extension 18 relative to primary sprue bar 16. Shoulder bolts 94 orient floating sprue 19 relative to primary sprue bar extension 18. Slot 72 of primary sprue valve 21, holding end 71 of activating lever 65, orients primary sprue valve 21 relative to floating sprue 19. On opposite side, secondary sprue 27 is oriented radially, relative to main manifold 15, by dowel pin 117. One end of dowel pin 117 is press-fit into a matching hole in annular flange 29 of secondary sprue 27, while opposite end is housed in an open slot 118 in main manifold 15. Radial orientation of all these parts ensures that inlets 97 of primary sprue bar extension 18 communicate directly with inlets 100 of floating sprue 19, and that inlets 100 open into grooves 119 of primary sprue valve 21, which direct plastic to spiral grooves 20. Plastic is then pushed, swirling, further into grooves 82 of secondary sprue 27. Radial orientation explained before matches linear grooves 82 of secondary sprue 27 with linear grooves 83 of secondary sprue valve 38, and also end of linear grooves 84 of secondary sprue 27 with beginning of spiral grooves 85 of secondary sprue valve 38, so that plastic can flow through these channels without any restrictions.

Figure 10:
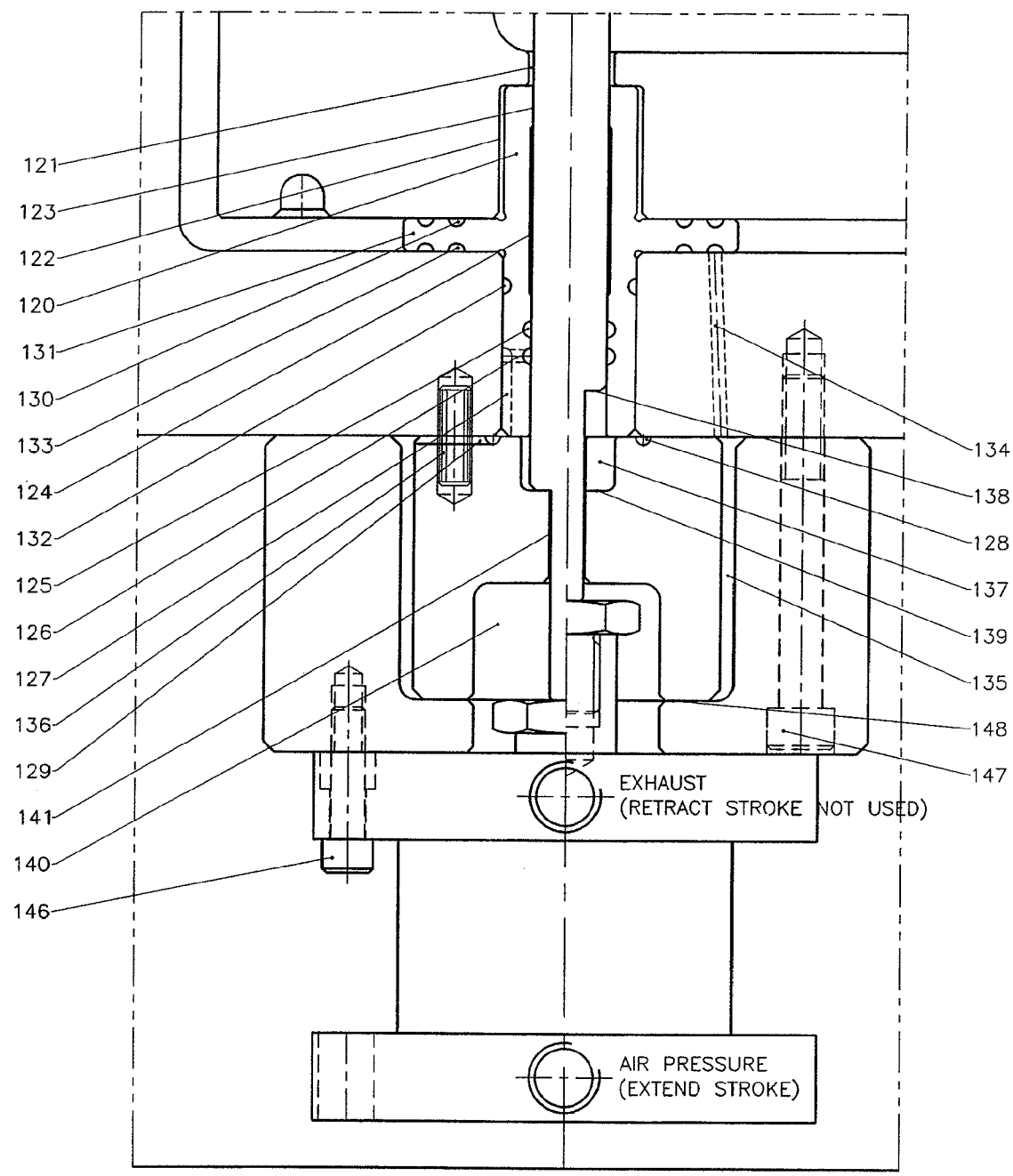
FIG. 10 is a cross-section detail of the bottom portion (secondary side) of the crossover nozzle system of FIG. 5.
Figure 11:
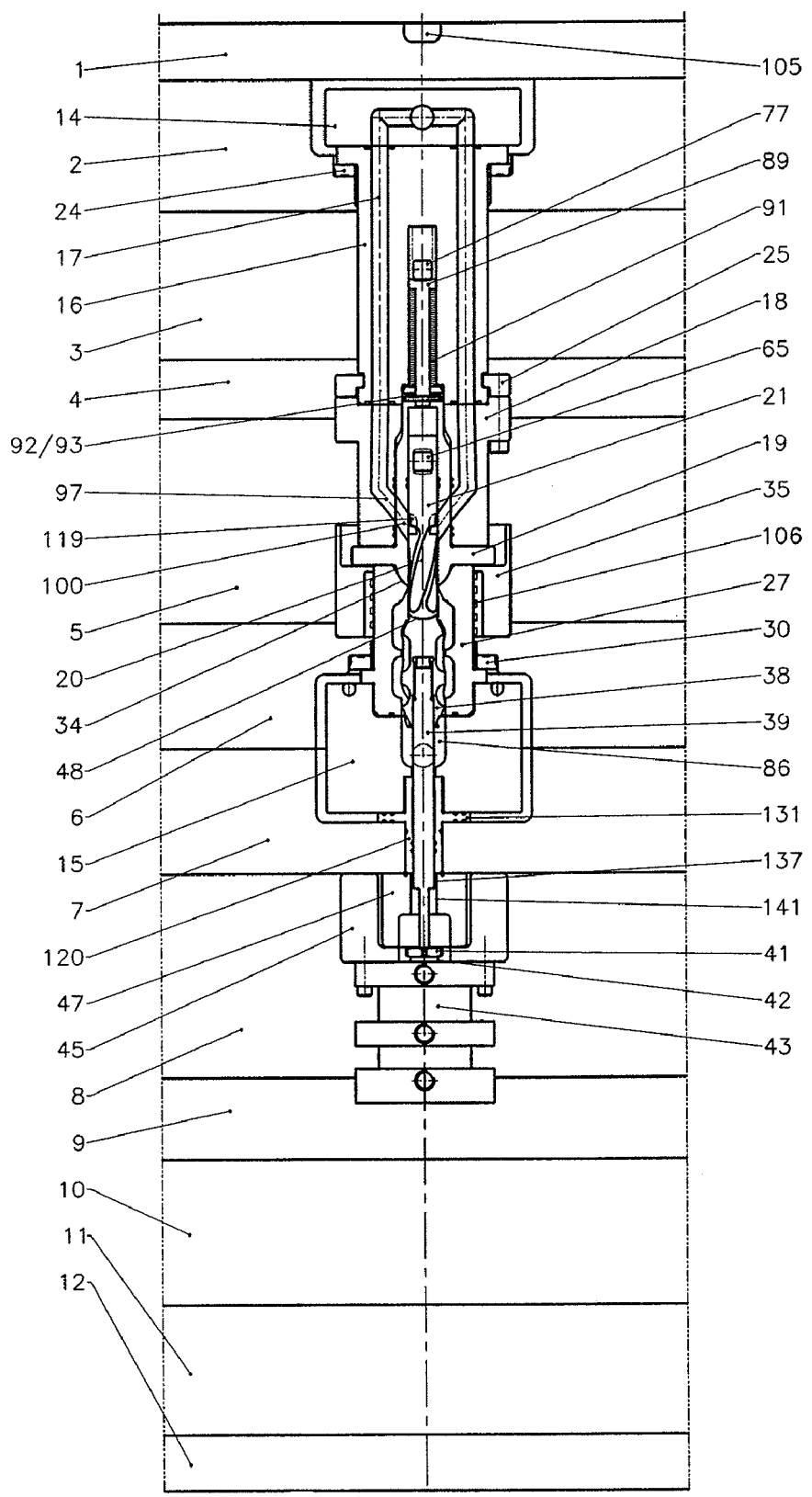
FIG. 11 is a partial cross-section through the centerline of the crossover nozzle system of FIG. 5, along a direction orthogonal to the one shown in FIGS. 5 through 10, shown with sprue valve open and mold closed.
Figure 12:
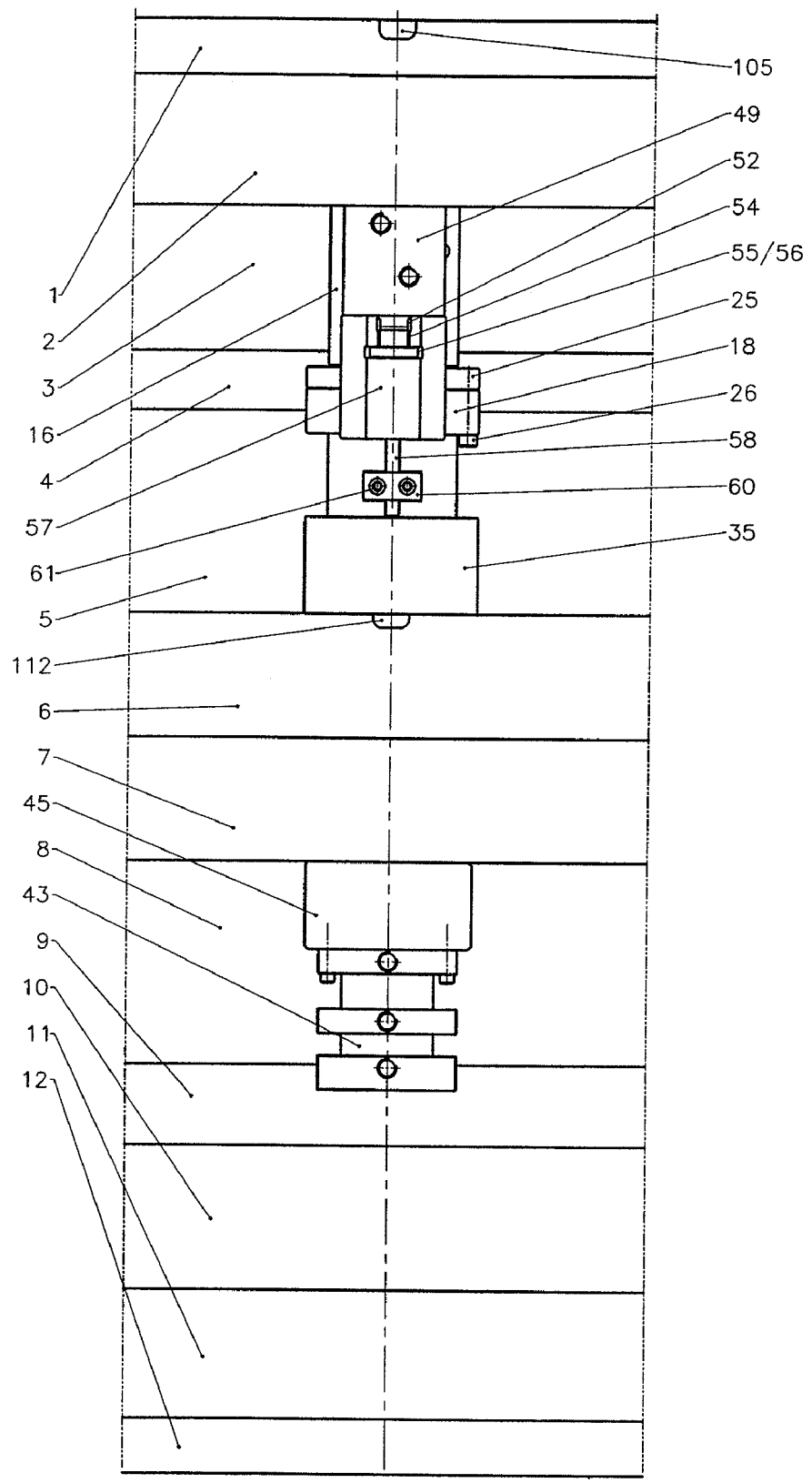
FIG. 12 is a side view of the crossover nozzle of FIG. 5, shown with mold closed.
Figure 13:
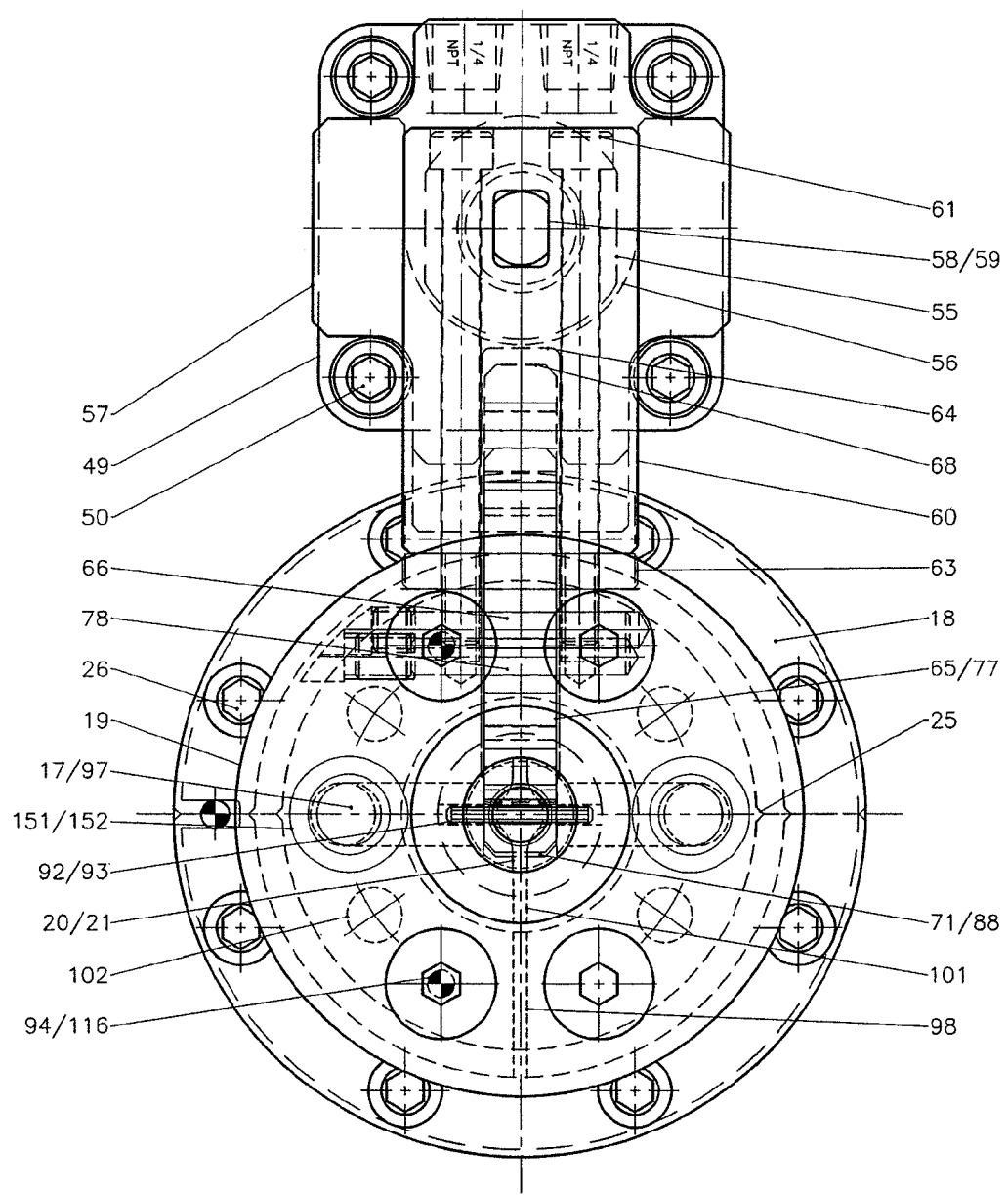
FIG. 13 is a detailed plan view of the primary side of the crossover nozzle system of FIG. 5.
Figure 14:
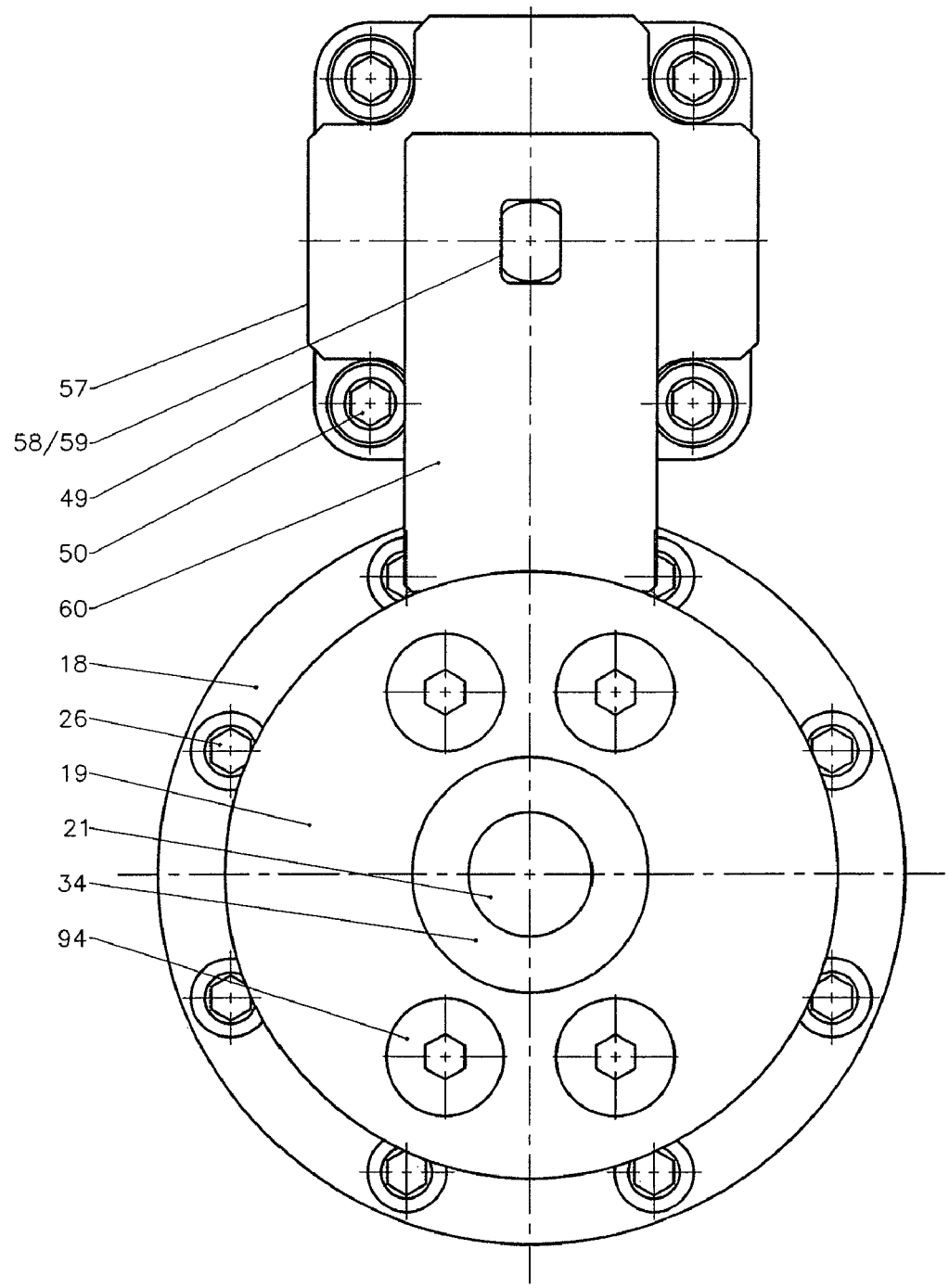
FIG. 14 is a simplified plan view of the primary side of the crossover nozzle system of FIG. 5.
Figure 15:
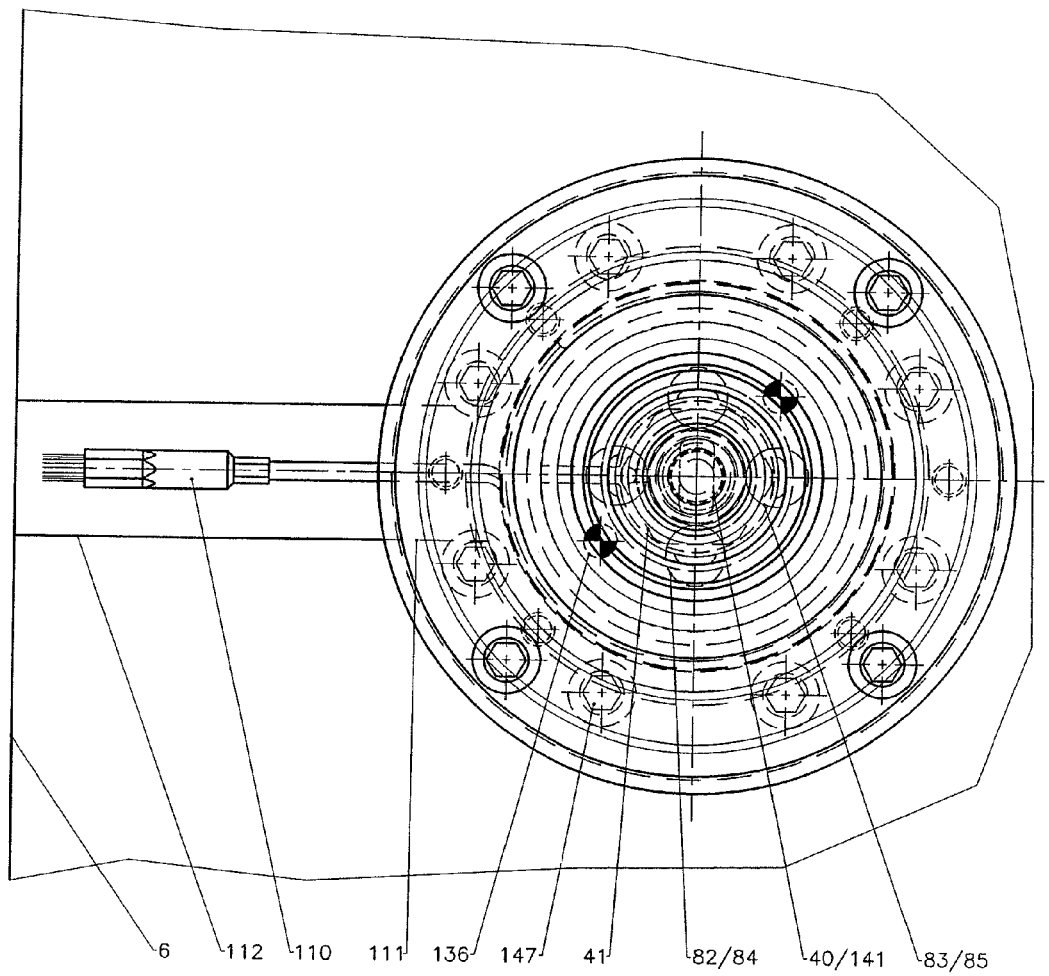
FIG. 15 is a detailed plan view of the secondary side of the crossover nozzle system of FIG. 5.
Figure 16:
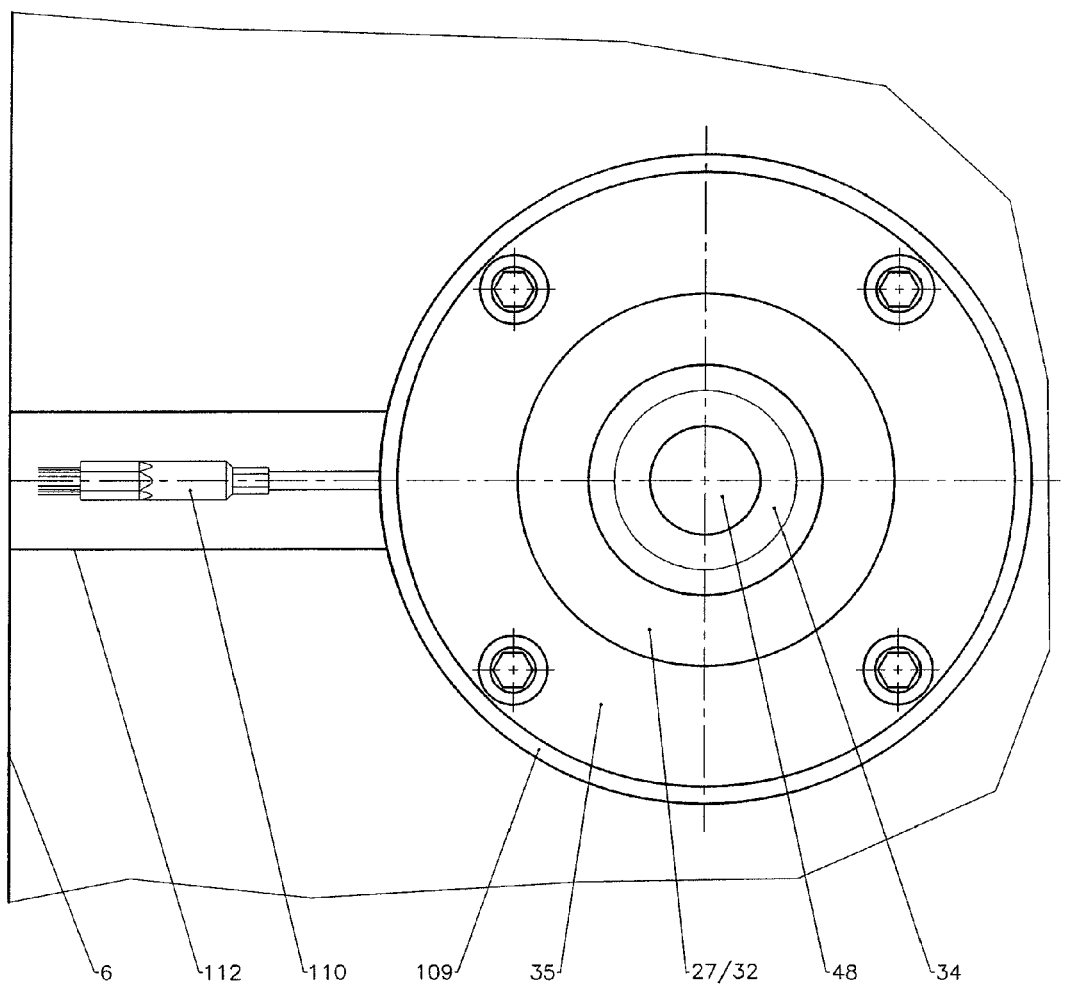
FIG. 16 is a simplified plan view of the secondary side of the crossover nozzle system of FIG. 5.

With reference to FIG. 10, at opposite end of crossover nozzle system 13, a manifold sealing sleeve 120 is installed between main manifold 15 and moving manifold plate 7. The purpose of this sleeve is to seal the back end of the crossover nozzle 13 from any plastic leakage from the main manifold 7. With reference to FIGS. 9 and 10, plastic from main manifold inlet 86 can leak through hole 121 in hole 122 around top end of manifold sealing sleeve 120, and also through the thermo-barrier access gap 123 inside manifold sealing sleeve 120, in groove 124 where it can form a thermo-barrier. Any leaks from the thermo-barrier can be caught by a pair of collector grooves 125, and transferred, through radial escape hole 126 and axial groove 127 of the manifold sealing sleeve 120, to annular groove 128 and radial escape groove 129 of extension rod stop 47. Any plastic leaks from hole 122 can be caught by a pair of annular collector grooves 130 provided on the side of flange portion 131 of manifold sealing sleeve 120 that faces the main manifold 15. Any plastic leaks from radial escape hole 126, that are not directed by axial groove 127 out of the moving manifold plate 7, can be caught by annular groove 132 of manifold sealing sleeve 120, located below flange portion 131. A pair of annular grooves 133 is provided on flange portion 131 of manifold sealing sleeve 120, opposite grooves 130, communicating, through escape hole 134, to back of moving manifold plate 7. Plastic leaks from escape hole 134 and also from radial groove 129 are therefore directed in the space 135 formed in pocket 46, between extension rod stop 47 and cylinder support 45.

Secondary sprue valve extension rod 39 is provided with two flat surfaces 40 on end that is connected to pneumatic cylinder 43. Extension rod stop 47 is held onto back of moving manifold plate 7 by cylinder support 45, and is oriented relative to moving manifold plate 7 by dowel pin 136. Extension rod stop 47 has a round pocket 137 housing the end of the cylindrical portion of secondary sprue valve extension rod 39. Flat surfaces 138 of extension rod 39 come in contact with bottom 139 of pocket 137 when primary sprue valve 21 and secondary sprue valve 38 are opened. Bottom 139 of pocket 137 thus acts as a stroke limiter for the two sprue valves. Opposite end of extension rod stop 47 has another round pocket 140, designed with clearance, for piston 42 of pneumatic cylinder 43, and for T-coupling 41 connected to piston 42. An oval slot 141 extends from pocket 137 to pocket 140 inside extension rod stop 47, guiding flat surfaces 40 of extension rod 39. With reference to FIG. 9, at opposite end, extension rod 39 has a threaded portion 142 and a cylindrical surface 143, ending with a flat surface 144. Extension rod 39 is threaded inside secondary sprue valve 38, and torqued until its flat end 144 presses against flat bottom 145 of hole in secondary sprue valve 38. Correct radial orientation of secondary sprue valve 38 relative to secondary sprue 27 is therefore achieved through dowel pin 136, flat surfaces 40 in slot 141 and contact between surface 144 and surface 145. It is this succession of radial orientations that locates grooves 83 and 85 of secondary sprue valve 38 directly in line with grooves 82 and 84 of secondary sprue 27.

Pneumatic cylinder 43 is secured to cylinder support 45 with bolts 146. Cylinder support is secured onto surface 44 of moving manifold plate 7 with bolts 147. Bottom surface 148 of pocket 46 presses onto back face of extension rod stop 47 for support.

Extension rod 39 and T-coupling 41 are in contact, but not rigidly connected together. When primary sprue valve 21 pushes secondary sprue valve 38 and extension rod 39 back, piston 42 is pushed further inside pneumatic cylinder 43, until surface 138 of extension rod 39 comes in contact with bottom 139 of pocket 137 of extension rod stop 47. Piston 42 of pneumatic cylinder 43 is constantly activated forward, to keep secondary sprue valve 38 in permanent contact with primary sprue valve 21. No retraction is necessary on the pneumatic cylinder; its "retract" inlet is used simply as an exhaust (FIG. 10). This means that pneumatic cylinder 43 actuates extension rod 39 and secondary sprue valve 38 only on the extend stroke of piston 42, until outer cone 81 of secondary sprue valve 38 is fully in contact with inner cone 80 of secondary sprue 27. The force of the hydraulic cylinder 49 being stronger than that of the pneumatic cylinder 43, it causes the succession of components previously described to push piston 42 further back in the pneumatic cylinder 43 when activating the sprue valves to open. When action of the hydraulic cylinder 49 is reversed, pneumatic cylinder 43 is relieved of this external force, and its own air pressure can extend piston 42 back out again. Note: Pneumatic cylinder 43 is not used at its maximum stroke. Less stroke is used, so that there is always an additional amount of stroke available for small adjustments that might become necessary. For example, after extended use of the crossover nozzle system 13, inner cone 80 of secondary sprue 27 or outer cone 81 of secondary sprue valve 38 might become slightly worn. Compensation of wear is then achieved by using additional stroke on the pneumatic cylinder 43. Such adjustment happens automatically, as piston 42 of pneumatic cylinder 43 always tries to extend for the full stroke, but will of course stop when inner cone 80 of secondary sprue 27 prevents outer cone 81 of secondary sprue valve 38 from going any further.

With reference to FIG. 9, secondary sprue valve 38 has a small annular groove 149 on outer cone 81, near spherical surface 48. From this, a number of small linear grooves 150 are provided on outer cone 81 of secondary sprue valve 38, extending to grooves 83. Grooves 149 and 150 are designed to allow plastic caught between conical surfaces 80 and 81 to escape to grooves 83 when sprue valve closes.

The crossover nozzle system 13 is synchronized with the mold cycles by use of two signals only. These are "open" and "close" on hydraulic cylinder 49. They cause an extend/retract stroke S1 on piston 52 of hydraulic cylinder 49, and a transferred motion/stroke S2 (equivalent to a "retract" stroke on piston 42 of pneumatic cylinder 43. The extend stroke of piston 42 is achieved by its own air pressure, which is constantly on, therefore not requiring an additional synchronizing control. An advantage of this design is that the injection machine can operate the crossover nozzle system 13 with only one valve control. Also, precise timing between the two cylinders is not necessary, since cylinder 43 is always pushing forward, piggybacking on the signal of the hydraulic cylinder 49. Another advantage, due to the piggyback effect, is that plastic has less chance to seep between primary sprue valve 21 and secondary sprue valve 38 at spherical surface 48.

Metal o-rings are used throughout the crossover nozzle system wherever necessary, as they can withstand high pressures and high temperatures. With reference to FIGS. 8 and 9, metal o-rings 151 are used to seal between primary sprue bar 16 and feeder manifold 14. Metal o-rings 152 are used to seal between primary sprue bar 16 and primary sprue bar extension 18. A metal o-ring 153 is also used to seal between back of secondary sprue 27 and pocket 28 of main manifold 15.

Dowel pins 69 and 75 are prevented from falling out of their respective oval slots 70 and 74 by cover plates 154 secured to the side of activating block 57 with button head cap screws 155.

Figure 17:
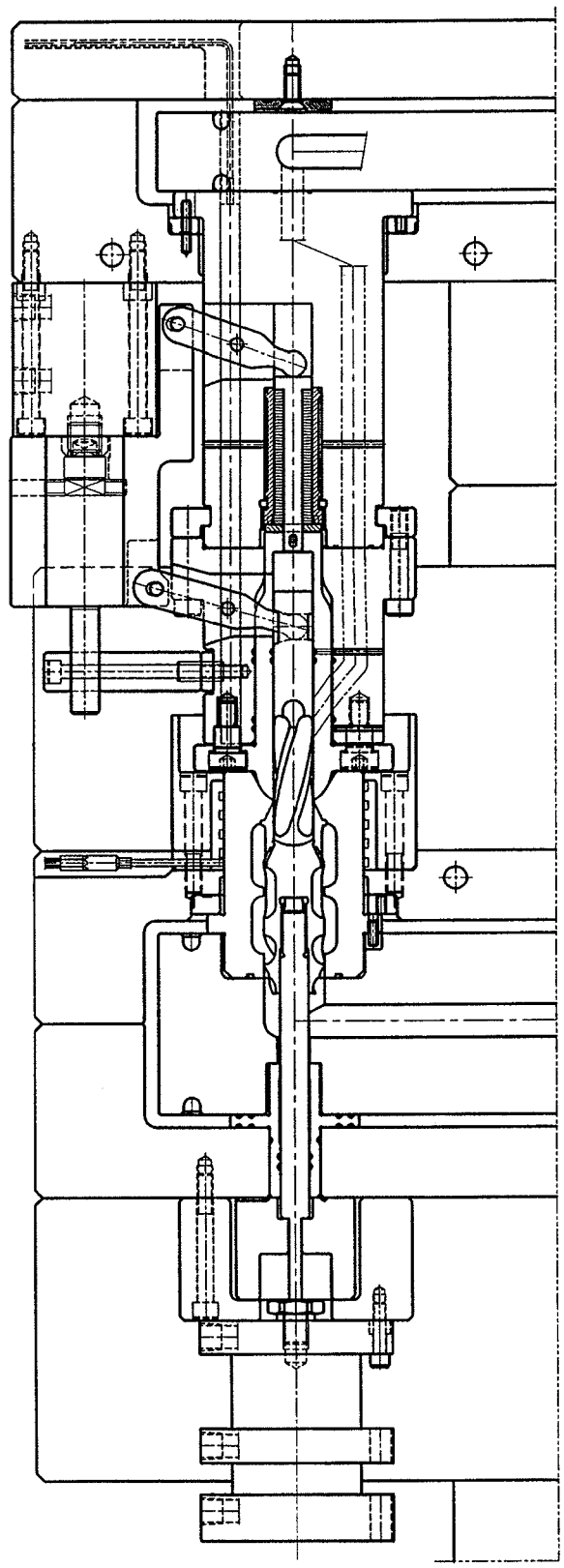
FIG. 17 is a partial cross-section view through the centerline of a first alternate embodiment of the crossover nozzle system, shown with sprue valve open and mold closed.
Figure 18:
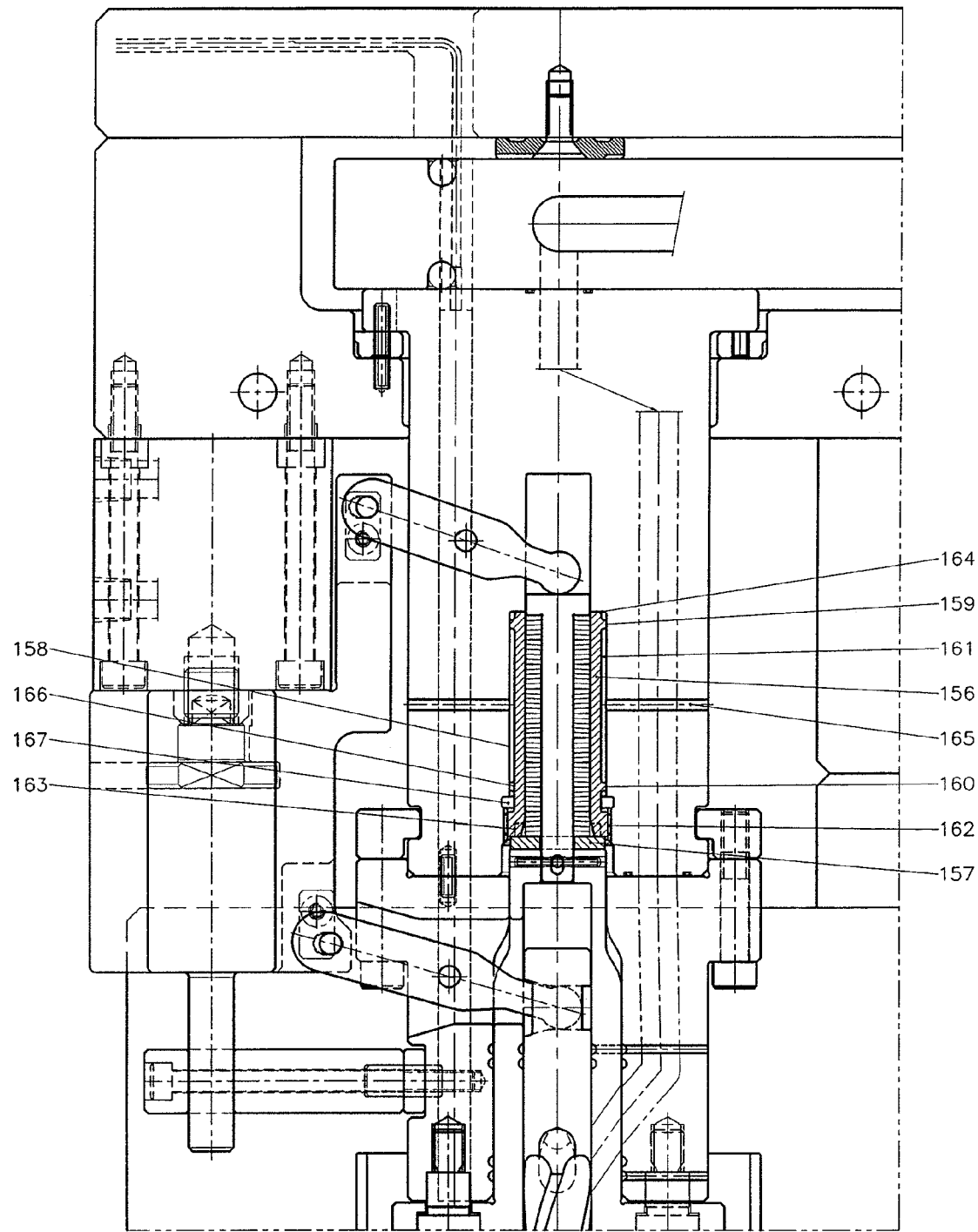
FIG. 18 is a cross-section detail of the central portion of the alternate embodiment shown in FIG. 17.
Figure 19:
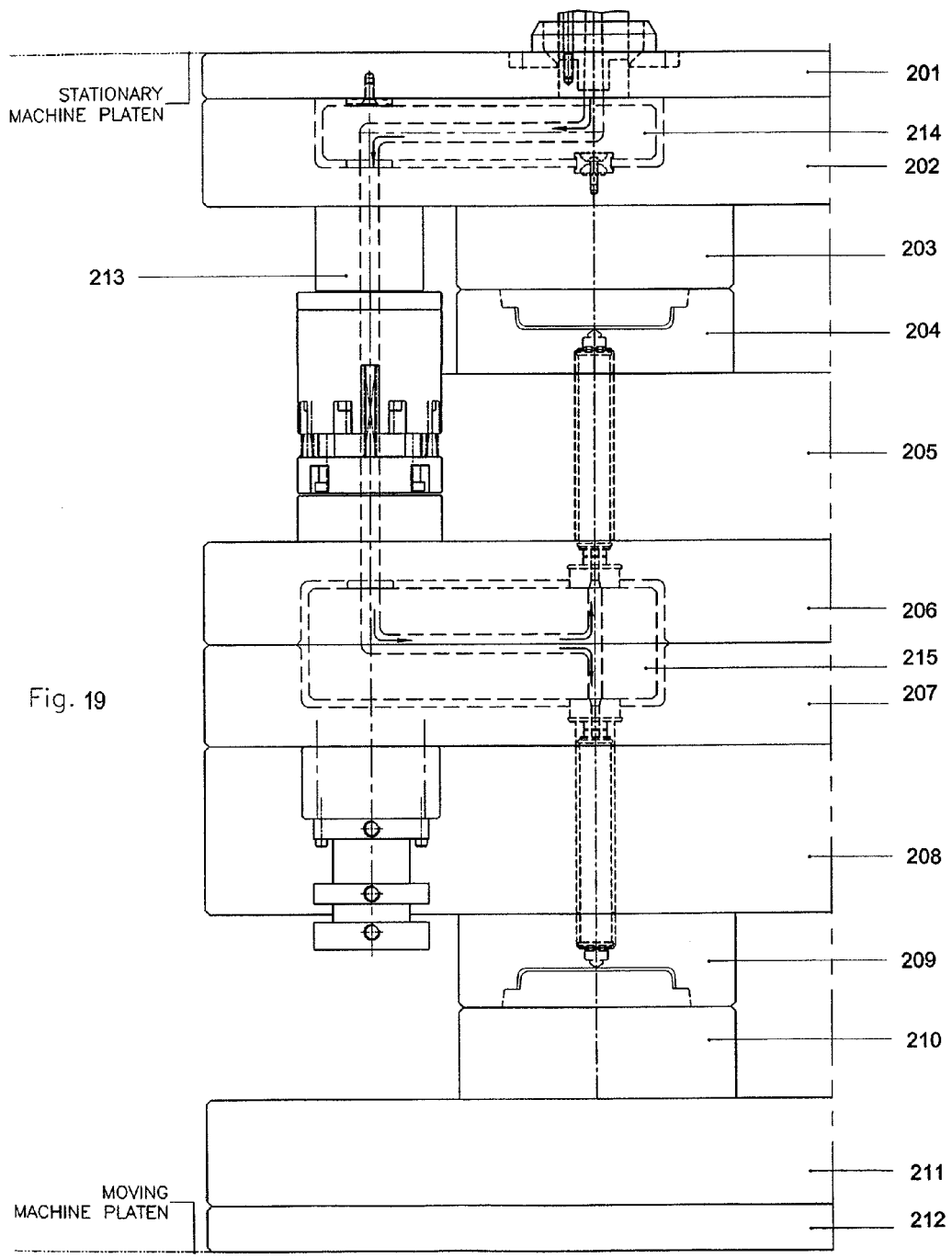
FIG. 19 is a partial view of a second alternative embodiment of the crossover nozzle system, shown with mold closed.

An alternate embodiment is presented in FIG. 17, and is shown in more detail in FIG. 18. It uses an insulating sleeve 156 and insulating washer 157 inserted into a central hole 158 in primary sprue bar 16, at the interface with primary sprue bar extension 18. Insulating sleeve 156 has two centering portions, 159 and 160, separated by a long relief 161. Insulating sleeve 156 is in threaded engagement 162 with body of primary sprue bar 16, and has an oval slot 163 on its front surface for torquing purpose. Insulating sleeve 156 is be torqued until its back surface comes in firm contact with bottom 164 of central hole 158 of primary sprue bar 16. Insulating washer 157 is centered on the spring washer compression pin 89, between insulating sleeve 156 and back end of floating sprue 19. The insulating sleeve 156 and insulating washer 157 are made of a material with low thermal conductivity, and they are employed to protect spring washers 91 from the high heat of the primary sprue bar 16 and floating sprue 19. Radial holes 165 allow air access to relief 161, providing air insulation all around insulating sleeve 156. A number of flat portions 166 are provided on centering portion 160, to allow air circulation from relief 161 into space 167 formed between centering portion 160 and threaded engagement 162. This measure increases length of air-cooled zone, protecting both spring washers 91 and spring washer compression pin 89 from the system's high heat.

A second alternate embodiment is shown described below in conjunction with FIGS. 19-25. This alternate embodiment provides a system that transfers molten plastic from the inlet at the center of stationary platen of injection machine, through a feeder manifold and an off-center crossover nozzle, to the main manifold of the stack mold.

With reference to FIGS. 19 through 25, the mold comprises a top plate 201, feeder plate/stationary core plate 202, stationary core 203, stationary cavity 204, stationary cavity plate 205, stationary manifold plate 206, moving manifold plate 207, moving cavity plate 208, moving cavity 209, moving core 210, moving core plate 211, bottom plate 212 and crossover nozzle system 213. It should be understood that fewer or more mold plates or blocks may be employed depending on specific design requirements.

Stationary core 203 is secured to feeder plate 202, which is secured to top plate 201. Top plate 201 is bolted to stationary machine platen. Similarly, moving core 210 is secured to moving core plate 211, which is secured to bottom plate 212. Bottom plate 212 is bolted to moving machine platen. Stationary cavity 204 is secured to stationary cavity plate 205, which is secured to stationary manifold plate 206. Moving cavity 209 is secured to moving cavity plate 208, which is secured to moving manifold plate 207. Stationary manifold plate 206 and moving manifold plate 207 are secured together, and supported at the center of the injection machine. As such, the mold has three main portions: a core side attached to the stationary machine platen (this portion is completely stationary), another core side attached to the moving machine platen (this portion opens for a double stroke, once for each mold cycle), and a central portion containing the cavity sides (which rides on the machine tie bars or guide ways and opens for a full stroke, once for each mold cycle). At the end of each mold cycle, the mold opens equally on both sides to release the molded parts.

Figure 20:
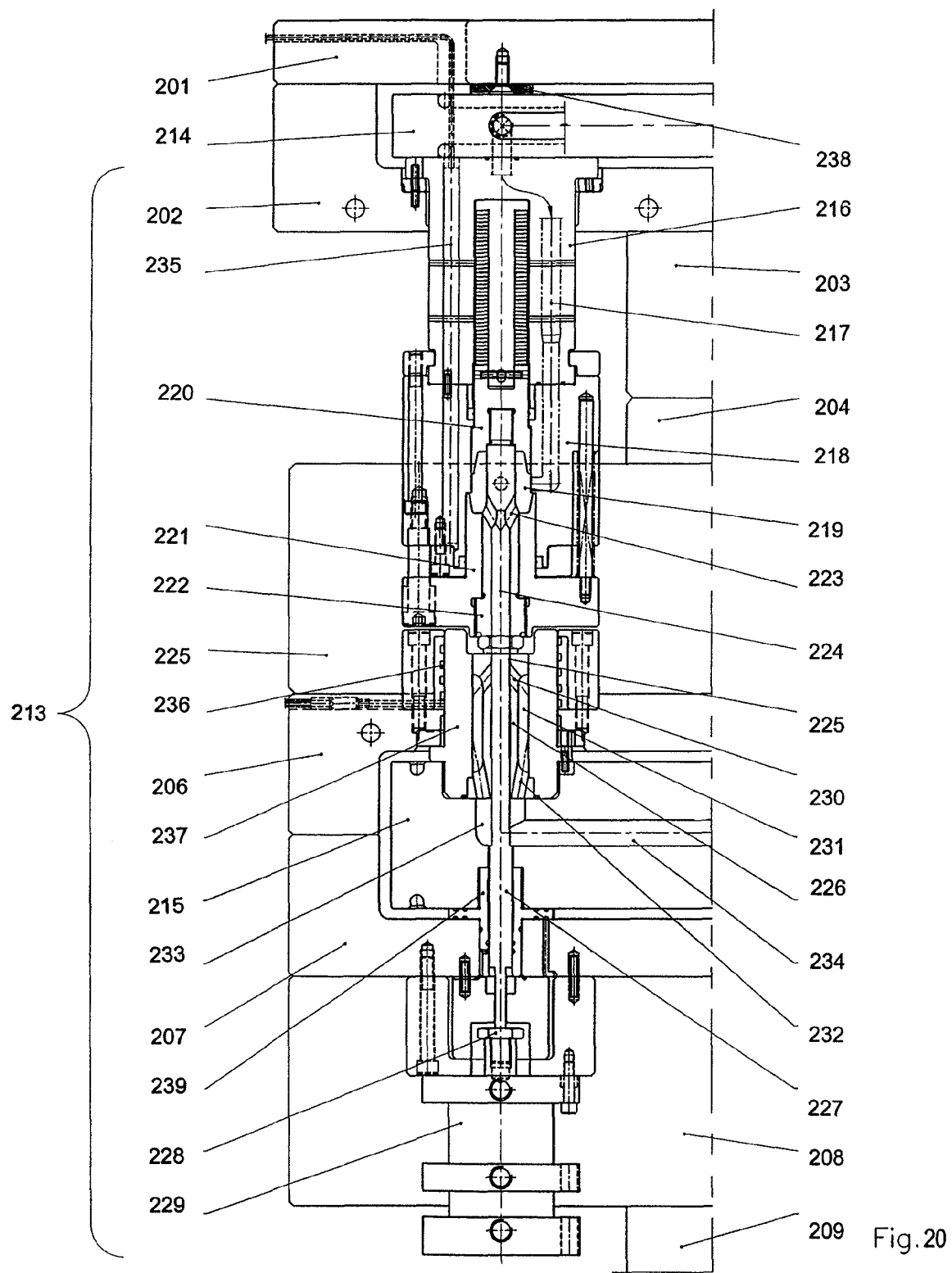
FIG. 20 is a section view of the crossover nozzle system of FIG. 19, shown with valve closed and mold closed.

With reference to FIG. 20, the crossover nozzle system 213 transfers molten plastic from feeder manifold 214 to main manifold 215 through a succession of components. From feeder manifold 214, plastic enters the primary sprue bar 216 through holes 217. It continues on, through primary sprue bar extension 218, into a transfer chamber 219 formed between a back floating sprue 220 and a front floating sprue 221. The two floating sprues are centered on and secured to a primary sprue shut-off valve 222. From transfer chamber 219, molten plastic travels through a number of radial holes 223 to a central hole 224 in the body of primary sprue shut-off valve 222. From here, plastic travels into central hole 225 of a secondary sprue shut-off insert 226, by pushing valve stem 227 back. Valve stem 227 is constantly activated forward, towards closing central hole 225, by a T-coupling 228, threadably secured to the piston of an activating cylinder 229 (e.g. pneumatic). When the mold is closed for a new cycle, the injection pressure of the molten plastic overcomes the forward pressure of the activating cylinder 229 and moves the valve stem 227 back. Molten plastic then gains access to central hole 225, and from there to a number of radial holes 230 extending to side grooves 231 of same secondary sprue shut-off insert 226. From side grooves 231, plastic is transferred, through radial holes 232, into the inlet hole 233 of the main manifold 215. Flow lines 234 of main manifold 215 allow transfer of molten plastic to all the molding chambers of the mold. As the mold cycle ends, injection pressure is stopped, which allows valve stem 227 to move forward as activated by cylinder 229, and seal the secondary side of the system. On the primary side, the floating assembly, formed by back floating sprue 220, front floating sprue 221 and primary sprue shut-off valve 222, moves away from primary sprue bar extension 218, in a manner that is described in more detail below. Forward motion of floating assembly causes decompression in transfer chamber 219, which results in a pullback of the molten plastic in central hole 224. This allows a drool-free opening of the crossover nozzle system, as the mold opens and molded parts are ejected.

Multiple heaters are used throughout the system in order to hold the required melt temperature of the flowing plastic. On the primary side, cartridge heaters 235 are used to heat up the primary sprue bar 216 and the primary sprue bar extension 218. On the secondary side, coil heater 236 is used around the secondary sprue 237 surrounding the secondary sprue shut-off insert 226. Further components will be described below as necessary.

The crossover nozzle system 213 is parallel to, and located at a fixed distance in reference to the mold centerline. As can be seen from FIG. 20, the main body of the crossover nozzle system 213 is stacked between feeder manifold 214 and main manifold 215. Behind the feeder manifold 214, in line with the crossover nozzle system 213, a pressure pad 238 transfers pressures from the system, through the top plate 201, to the machine platen (injection press). This is a safety measure designed to avoid deflection of the feeder manifold 214 as can be caused by the high pressures of the crossover nozzle system 213. On the opposite side, pressures from the system are transferred through main manifold 215 to flange of manifold sealing sleeve 239 and to moving manifold plate 207. While networks of waterlines cool the mold plates, the feeder manifold 214 and the main manifold 215 are heated and expand thermally. Components of the crossover nozzle system 213 are also heated and undergoing thermal expansion. The cumulation of all the individual thermal expansions along the length of the crossover nozzle system results in improved sealing between its components.

Aside from the slight thickness increase of the two manifolds, thermal expansion also causes an increase in length of the manifolds, the distance between centerline of mold and centerline of crossover nozzle being of special importance here. That is because this system crosses simultaneously through cooled mold plates, that have no meaningful thermal expansion, and through the heated main manifold 215, which expands significantly. A number of actions are taken to stabilize the crossover nozzle system 213 against the de-stabilizing influence of the expanding main manifold 215:

(a) A secondary sprue locating ring 240, centered in the stationary manifold plate 206, is employed to locate secondary sprue 273. Proper location/centering of secondary sprue 273 enables this component to be in contact simultaneously with the expanding main manifold 215 and the "static" secondary sprue shut-off insert 226 and valve stem 227. Any off-center deviation of the secondary sprue 237 would cause deflection of the valve stem 227, which could compromise the functioning of the entire crossover nozzle system.

(b) Pocket 241 in the main manifold 215, holding end of secondary sprue 237, is made with sufficient clearance to further prevent deviation of the secondary sprue 237 as would be caused by thermal expansion of the main manifold 215.

(c) Pocket 242 in main manifold 215, holding one end of manifold sealing sleeve 239 is also made with sufficient clearance, to prevent any deviation of the sealing sleeve 239, which could be transferred to valve stem 227.

By providing seal-offs and clearances as described, manifolds are allowed to expand or retract without putting stress onto components of the eccentric crossover nozzle system, all the while sealing on pairs of mating surfaces transversal to centerline of crossover nozzle system.

On the primary side, the cooled feeder plate 222 centers the primary sprue bar 216, which has only planar contact with the expanding feeder manifold 214.

Figure 21:
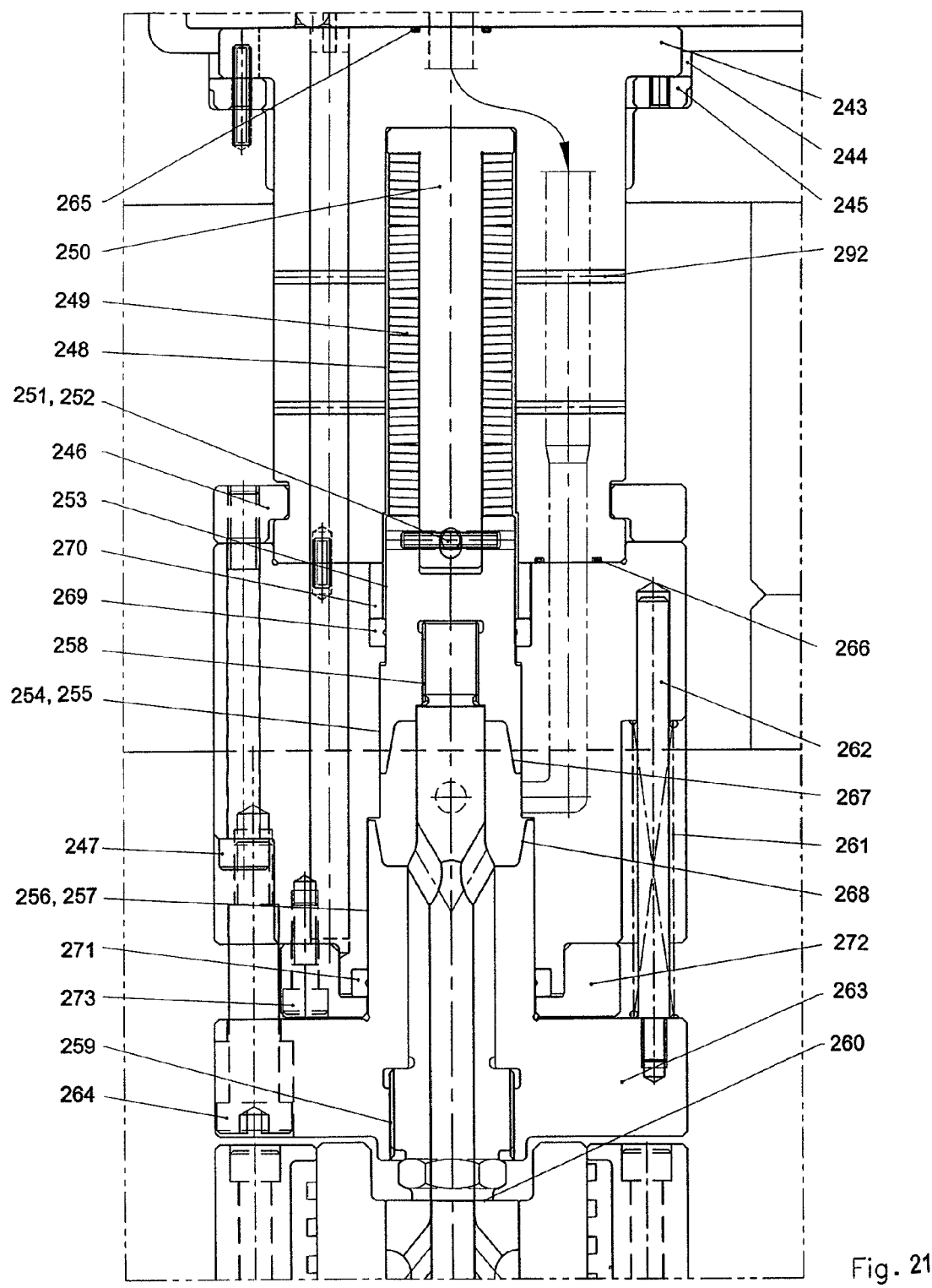
FIG. 21 is an enlarged detail of the primary side of embodiment of FIG. 20.
Figure 22:
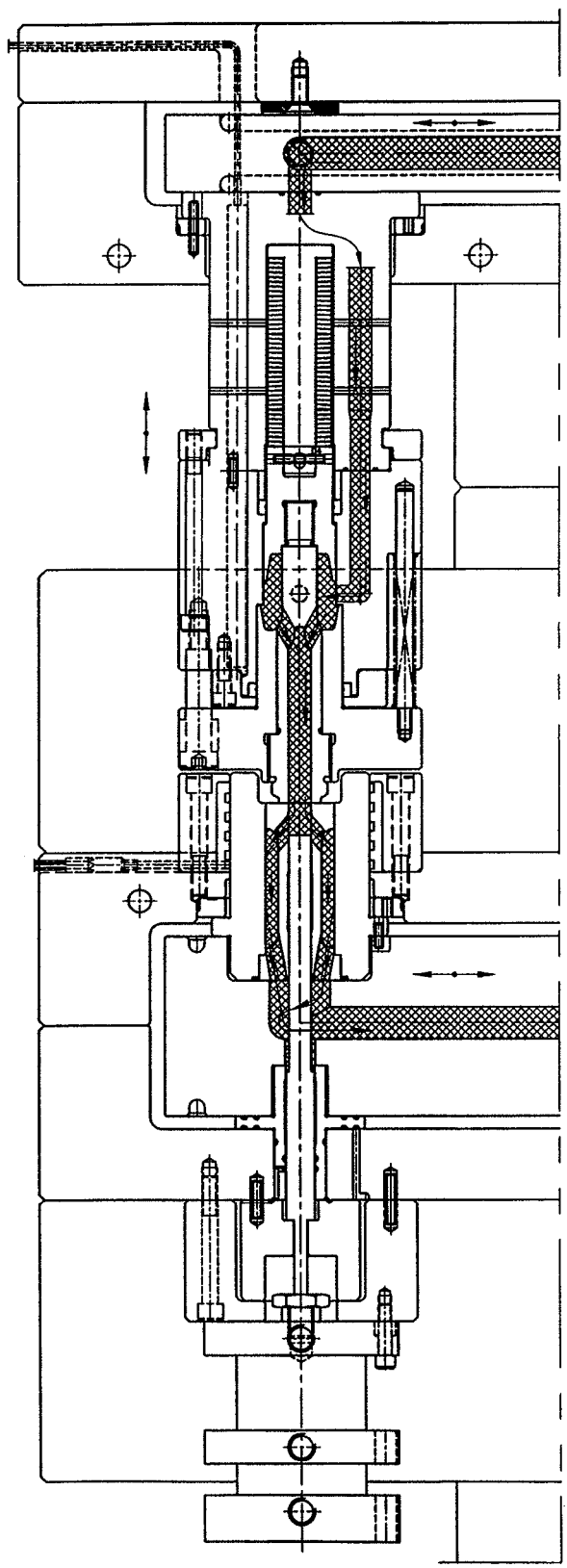
FIG. 22 is a section view of the embodiment of FIG. 20, shown with valve open and mold closed.
Figure 23:
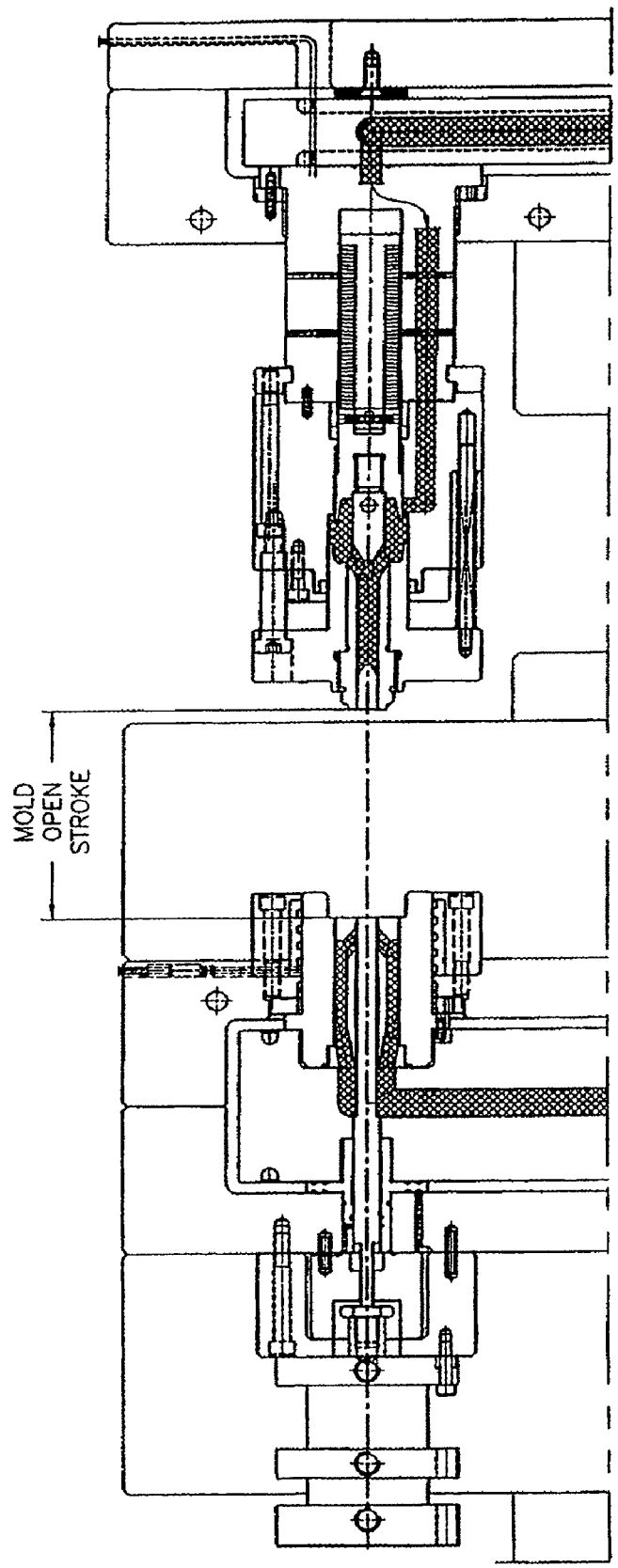
FIG. 23 is a section view of the embodiment of FIG. 19, shown with mold open for ejection of molded parts. Valve is closed on secondary side, floating portion of primary side is extended and molten plastic is retracted due to decompression of the system.
Figure 24:
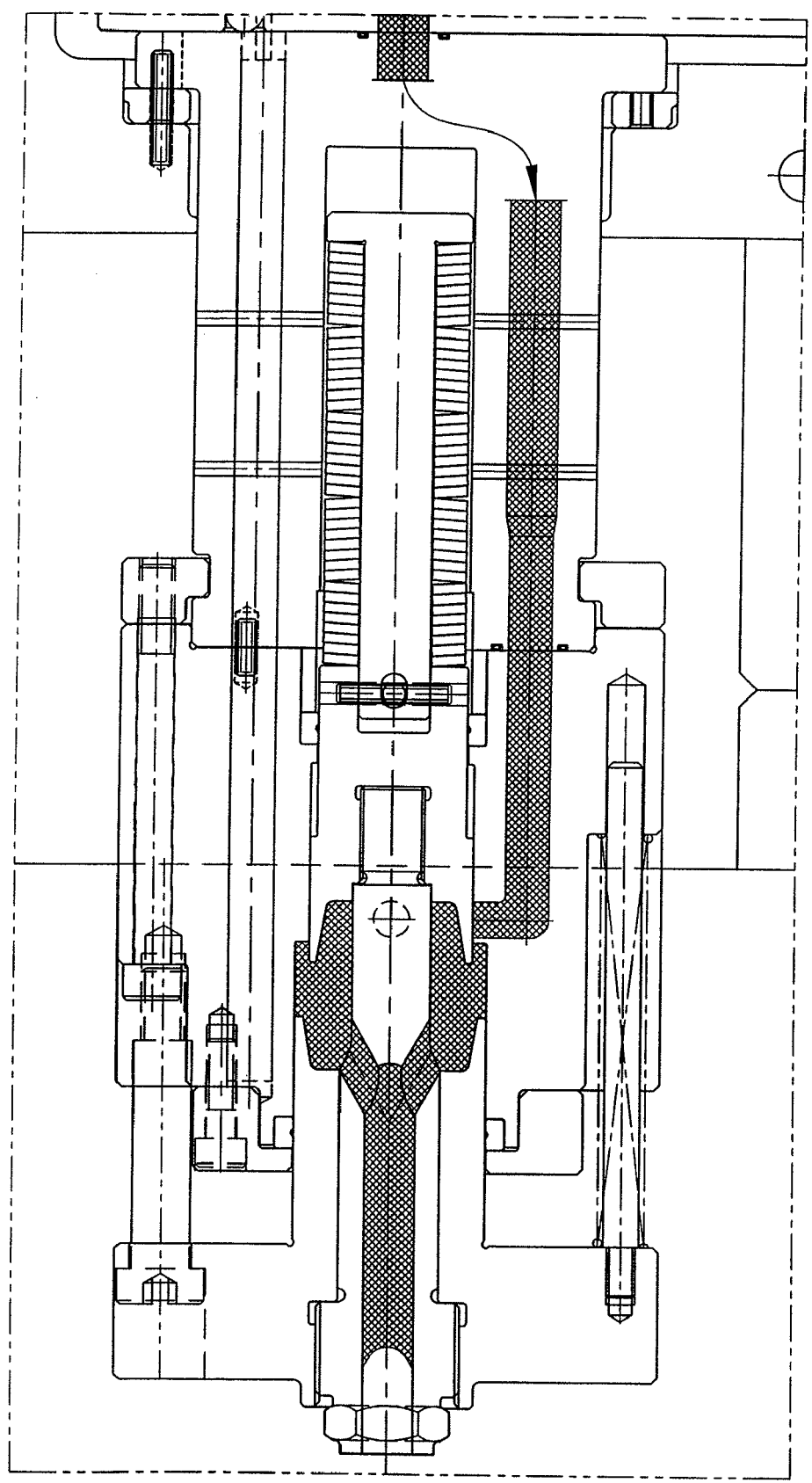
FIG. 24 is an enlarged detail of the primary side of FIG. 23.

With reference to FIG. 21, further components will now be described. On the primary side, flange 243 of the primary sprue bar 216, housed in a pocket 244 in feeder plate 202, is compressed between feeder manifold 214 on one side and a primary pressure ring 245, also housed in pocket 244, on opposite side. The primary sprue bar extension 218 is secured to primary sprue bar 216 with split-ring connectors 246 and bolts 247. A central hole 248 in body of primary sprue bar 216 houses stacks of spring washers 249, installed, with a controlled amount of compression, in parallel and in series, and centered by a spring washer compression pin 250, housed in same central hole 248. While flanged end of spring washer compression pin 250 is backed by bottom of hole 248, opposite end has a slot 251, shaped to allow sliding motion of a dowel pin 252, installed in fixed engagement, in back end of back floating sprue 220. Spring washers 249 are compressed between flanged end of compression pin 250 and back end of back floating sprue 220, constantly exerting pressure onto back floating sprue 220, which transfers it to contact surface between primary sprue shut-off valve 222 and secondary sprue shut-off insert 226. Back floating sprue 220 has two external portions: a back portion 253, in loose engagement in primary sprue bar 216, and a front portion 254, for centering in central hole 255 of primary sprue bar extension 218. Similarly, the front floating sprue 221 has a back portion 256, for centering in central hole 257 of primary sprue bar extension 218. Back portion 256 of front floating sprue 221 being larger than front portion 254 of back floating sprue 220, the injection pressures of transfer chamber 219 are pushing front floating sprue 221 forward when injection is process. Fine thread engagement 258 between back floating sprue 220 and primary sprue shut-off valve 222, and fine thread engagement 259 between front floating sprue 221 and primary sprue shut-off valve 222, transfer forward pressures of spring washers 249 and of transfer chamber 219 to the contact surface 260 between primary sprue shut-off valve 222 and secondary sprue shutoff insert 226. Also, a number of axial, peripherally acting forces are present around the system. These are provided by compression springs 261, installed with a controlled amount of compression, around spring guide pins 262, threadably engaged in the back of the flange portion 263 of front floating sprue 221. Compression springs 261, backed by fixed primary sprue bar extension 218, put constant pressure forward onto the back of the flange portion 263 of the front floating sprue 221. When mold opens to allow ejection of molded parts, the floating assembly is pushed away from the primary sprue bar extension (as previously mentioned) by compression springs 261. In conclusion, there are 3 sets of forward forces/pressures that transfer to surface of contact 260 between primary and secondary sides: the force of spring washers 249, the force of pressurized transfer chamber 219 (when plastic is injected), and the forces of compression springs 261. The axial motion freedom of the floating assembly is allowed by shoulder bolts 264, which connect flange portion 263 of the front floating sprue 221 in axial sliding contact with primary sprue bar extension 218.

Sealing means are provided throughout the system to prevent plastic leaks. On the primary side, metal seals 265 are installed in grooves around holes 217 at the contact surface between primary sprue bar 216 and feeder manifold 214. Metal seals 266 are also used to seal holes 217 between primary sprue bar 216 and primary sprue bar extension 218. Both back floating sprue 220 and front floating sprue 221 have thin annular profiles, 267 and 268 respectively, extending into transfer chamber 219. As transfer chamber 219 is filled, thin profiles deflect slightly under injection pressure, creating metal-to-metal sealing against holes 255 and 257. A back seal 269, held in place by a spacer 270, surrounds portion 253 of back floating sprue 220, to act as backup for seal of thin profile 267 against central hole 255. A front seal 271, held in place by a clamp ring 272 secured with bolts 273 to primary sprue bar extension 218, is used as backup seal between front floating sprue 221 and primary sprue bar extension 218. Both back seal 269 and front seal 271 can be made of a composite material, with high thermal resistance. On the secondary side, a metal seal 274 is used around inlet hole 233 of main manifold 215, to seal around secondary sprue 237 (see FIG. 25).

Figure 25:
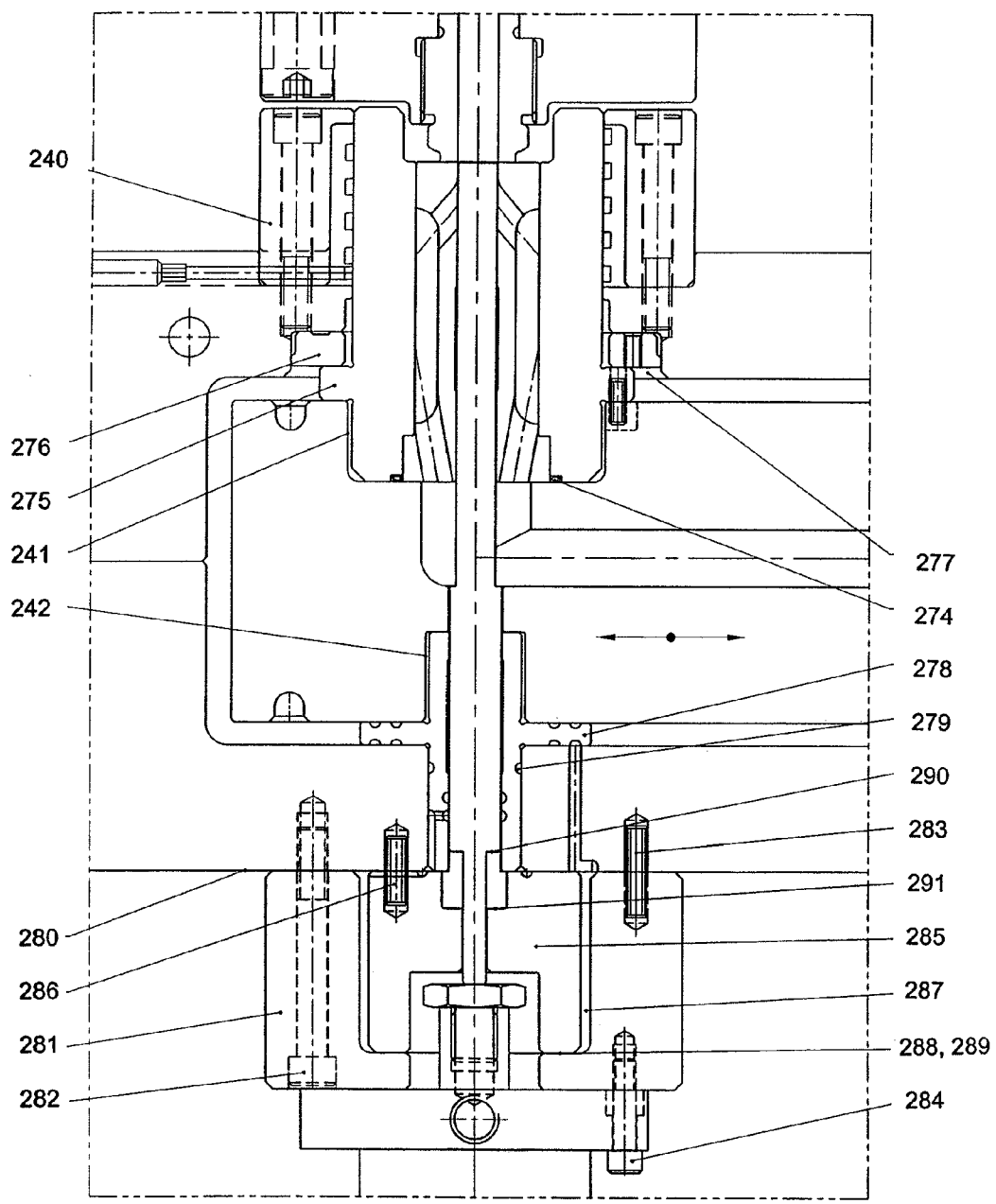
FIG. 25 is an enlarged detail of the secondary side of FIG. 20.

As shown in FIG. 25, on secondary side, flange 275 of secondary sprue 237 is pressed between main manifold 215 and a secondary pressure ring 276, installed in a pocket 277 in stationary manifold plate 206. On opposite side of main manifold 215, manifold sealing sleeve 239 having flange portion 278 pressed between main manifold 215 and moving manifold plate 207, seals against plastic leaks from the inlet hole 233, both at the bottom of pocket 242 and on both sides of flange 278. Manifold sealing sleeve 239 has a number of annular grooves 279 placed on the inside, outside, and on both sides of flange portion 278, which act as collector grooves for any leaks, directing them safely out of the system.

On surface 280 of moving manifold plate 207, a cylinder support 281 is secured with bolts 282 and located with dowel pins 283. Activating cylinder 229 is secured to cylinder support 281 with bolts 284. A valve stem stop 285 is located with dowel pins 286 in clearance pocket 287 inside cylinder support 281. Top surface 288 of valve stem stop 285 is pressed against surface 289 of cylinder support 281.

As previously mentioned, molten plastic flows through central hole 225 of secondary sprue shut-off insert 226, to reach radial holes 230, by pushing valve stem 227 back. Valve stem 227 is pushed back until flat surfaces 290 machined close to its back end (end which is in contact with T-coupling 228) come in contact with flat surfaces 291 of valve stem stop 285. A safety feature designed to protect the activating cylinder 229 from repeated shocks is provided by the positive stop of surfaces 290 on 291 takes place before piston of cylinder 229 reaches the end of its stroke. The shocks caused by injection pressures on valve stem 227 are transferred to surfaces 291 and not to activating cylinder 229. Furthermore, no retraction signal is necessary on activating cylinder 229; its "retract" inlet is used only as an exhaust. An advantage of the embodiment of FIGS. 19-25 is that it doesn't require synchronization with mold cycles.

With reference to FIG. 21, radial cooling holes 292 are provided through primary sprue bar 216, to allow air cooling of spring washers 249 in order to extend the life of these components.

The crossover nozzle system in accordance with the embodiments of the present invention has the following unique and advantageous features:

1. The crossover nozzle system is provided with two, symmetrically placed, inlet holes in the primary sprue bar, which are connected centrally to the transfer chamber in the primary sprue bar extension. Such symmetry allows central placement, around a singular axis, of all the components of the crossover nozzle system.

2. By removing shoulder bolts at the front of the primary side, the entire floating assembly, complete with spring washers and compression pin, can be removed from the crossover nozzle system for servicing, while mold in still in the injection press. This feature allows adjustments of the spring washers, alterations of their configuration, and modifications of the spring washer compression pin in order to modify the force output, without requiring removal of the entire crossover nozzle system from the mold. It is possible to increase or decrease the force output and deflection of the spring washers by altering their configuration. For example, stacking spring washers in parallel increases the force output, while stacking them in series increases the deflection.

3. During plastic injection, a substantial increase to the force output of spring washers is provided by the injection pressure of molten plastic in the transfer chamber between back floating sprue and front floating sprue, due to the outer size differential between back floating sprue and front floating sprue.

4. The thin annular profiles of the back floating sprue and the front floating sprue extending into the transfer chamber use the very force of injection as sealing means. These profiles are sufficiently thin to allow deflection and create metal-to-metal sealing all around walls of central holes of primary sprue bar extension.

5. A back seal and a front seal, which can be made of a different material (non-metal), are provided as backup for the metal-to-metal seals around transfer chamber.

6. The crossover nozzle system as described is adaptable to various mold heights. Adaptability is achieved by altering the length of the primary sprue bar. The primary sprue bar extension and the rest of the components of the crossover nozzle system will not need alterations.

7. When the mold opens and the floating assembly extends from the primary side, the thin annular profile of the back floating sprue acts as a shut-off surface against inlet holes opening into the transfer chamber. The transfer chamber is thus sealed from the inlet holes, to further prevent drooling until the system closes for a new mold cycle.

8. Being made of three main components, the floating assembly has the advantage of bringing different material characteristics to different requirement areas. The back floating sprue can be made of an alloy hard enough to withstand the forces of the spring washers, but soft enough not to score the inner walls of the primary sprue bar extension. The front floating sprue can be made of an alloy soft enough to avoid scoring the inner walls of the primary sprue bar extension, but having high thermal conductivity to allow proper heat transfer from cartridge heaters of the primary sprue bar extension to the front end of the primary sprue shut-off valve. The primary sprue shut-off valve is made of a high-hardened alloy, to withstand the constant beating at the contact surface with secondary sprue shut-off insert.

9. By unclamping the top plate from the stationary platen, with assistance of a hoist, the entire mold can be moved over (attached to the moving platen) for servicing the heaters in the injection machine.

10. Secondary side shut-off valve does not require a synchronizing signal from the mold, due to the constant forward action of the pneumatic cylinder. Such a design simplifies the construction and functionality of the system considerably, as the valve stem seals the opening on the secondary side automatically when decompression takes place, before the mold opens.

11. The secondary sprue shut-off insert separates the flow of molten plastic into multiple channels, then re-connects them as they enter the inlet of main manifold. Such a design creates a swirling motion of the molten plastic, washing off the inlet hole of the main manifold to prevent formation of dead spots (stale plastic).

12. The valve stem and the entire secondary side of crossover nozzle system can also be serviced while the mold is in the injection press.

A third alternate embodiment is shown described below in connection with FIGS. 26-32. According to one aspect of the third alternative embodiment of the present invention, the crossover nozzle system is a leak-proof mechanism that transfers molten plastic from the inlet at the center of the stationary platen of an injection machine, through a feeder manifold, to a main manifold of the stack mold, utilizing the injection pressures existent throughout the system and the thermal expansion of its various components to create a leak-proof seal.

Furthermore, according to another aspect of the third alternative embodiment of the present invention, the off-center crossover nozzle system has a primary side (attached to the stationary portion of the stack mold) and a secondary side (attached to the central portion of the stack mold), both sides of the system having movable components activated to close off the flow of molten plastic after each injection cycle. Activation of movable components is automatically timed in relation to the mold cycles without the use of dedicated synchronizing equipment, by way of preloaded springs and internal and external cylinders actuated continuously towards extending the movable components.

Yet another feature of this third alternative embodiment of the present invention, provides an hourglass portion (or other convergent-divergent profile) on both the primary and secondary sides of the crossover nozzle system, adjacent to their contact surface. Both hourglass portions are cooled by way of surrounding cooling circuits fed from the mold or externally from the machine. Cooling causes formation of skins of solidified plastic inside hourglass portions after each injection cycle. These skins substantially reduce the size of hourglass holes prior to mold opening to prevent drooling. Upon start of new cycle, newly injected plastic melts the skins on both sides of the opening, so that both hourglass portions are restored to their real sizes and flow of molten plastic goes on unrestricted.

These feature enable the crossover system to provide a leak-proof, off-center system that transfers molten plastic from the inlet at the center of the stationary platen of an injection machine to the main manifold located in the central portion of the stack mold. Furthermore, these features provide a crossover nozzle system having a drool-free opening to avoid spills and waste. In addition, these features provide a crossover nozzle system that achieves effective sealing of its opening from the pressurized flow channels to prevent plastic leaks.

Figure 26:
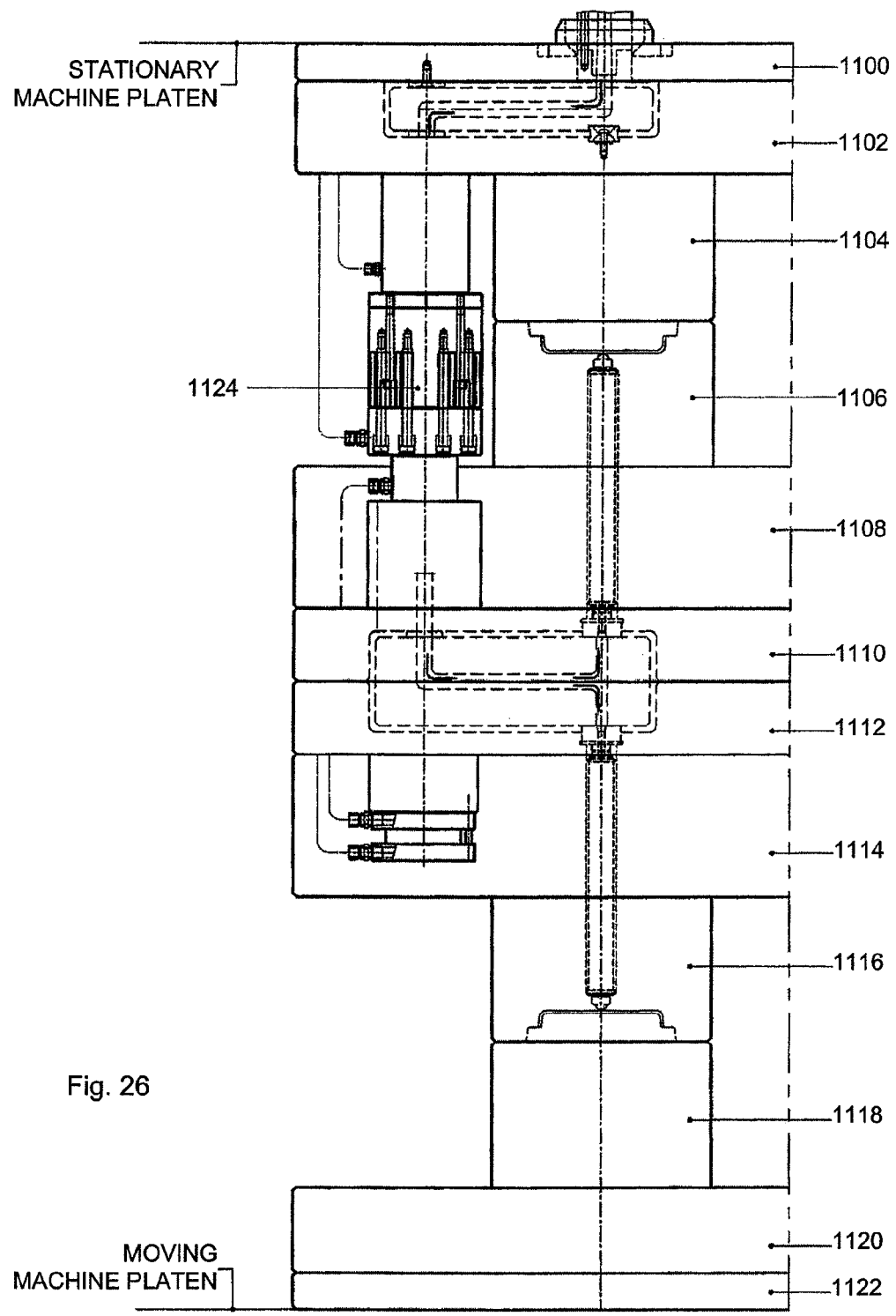
FIG. 26 is an exemplary partial view of a crossover nozzle system in accordance with a third alternative embodiment of the invention, shown within a closed stack mold.

Referring to FIG. 26, a stack mold in accordance with the invention comprises a top plate 1100, feeder plate/stationary core plate 1102, stationary core 1104, stationary cavity 1106, stationary cavity plate 1108, stationary manifold plate 1110, moving manifold plate 1112, moving cavity plate 1114, moving cavity 1116, moving core 1118, moving core plate 1120, a bottom plate 1122 and a crossover nozzle system 1124. It should be understood that fewer or more mold plates or blocks may be employed depending on specific design requirements.

As is typical of stack molds, the embodiment shown in FIG. 26 presents three main mold portions. A stationary core portion, secured onto the stationary machine platen, comprises top plate 1100, feeder plate 1102 and stationary core 1104. Similarly, a moving core portion, secured onto the moving machine platen, comprises bottom plate 1122, moving core plate 120 and moving core 1118. A central mold portion comprises stationary cavity 1106, stationary cavity plate 1108, stationary manifold plate 1110, moving manifold plate 1112, moving cavity plate 1114, moving cavity 1116 and all connecting components therein. The stationary core portion is completely stationary; the moving core portion opens for a double stroke, once per mold cycle, and the central portion, which rides on the machine tie bars or guide ways, opens for a full stroke, once per mold cycle. After each mold cycle, the mold portions move as described to release the molded parts, resulting in equal opening strokes on both sides of the central portion.

Figure 27:
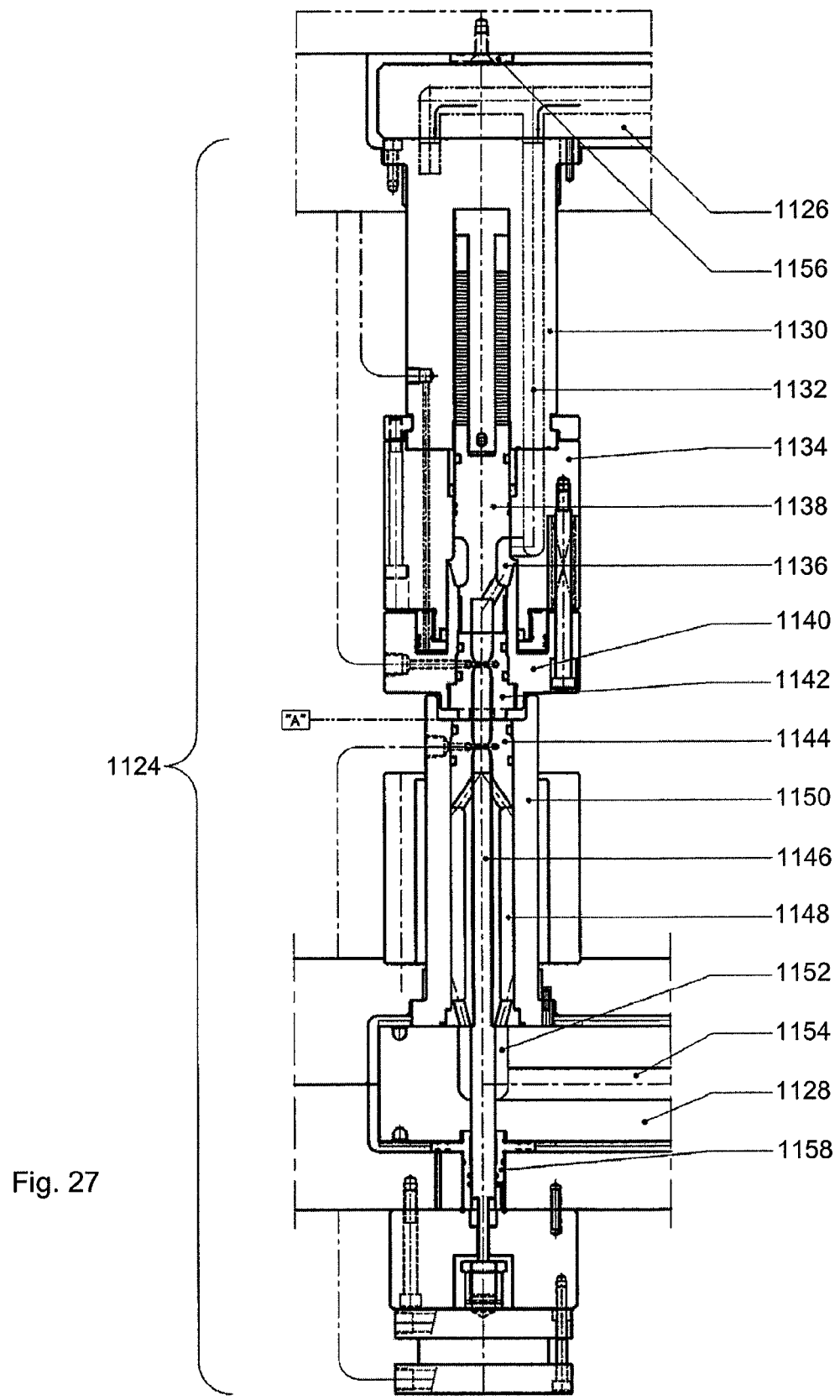
FIG. 27 is a section view of the crossover nozzle system of FIG. 26, shown with mold closed and ready for injection.
Figure 30:
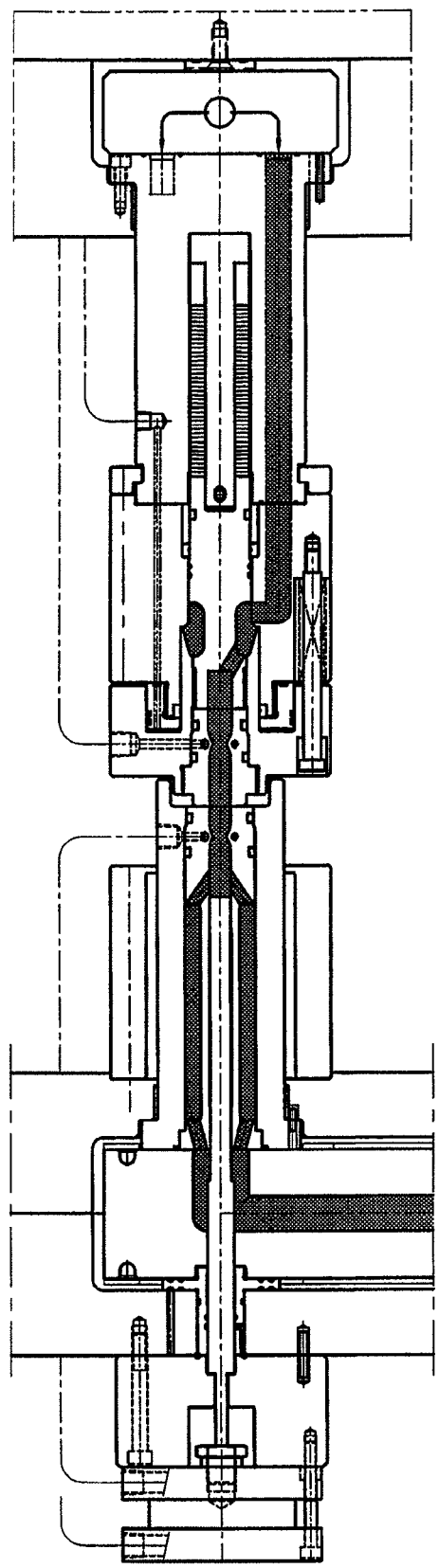
FIG. 30 is a section view of the crossover nozzle system of FIG. 27, shown during injection. Valve stem is retracted (valve is open) on the secondary side, allowing transfer of molten plastic to the main manifold.
Figure 31:
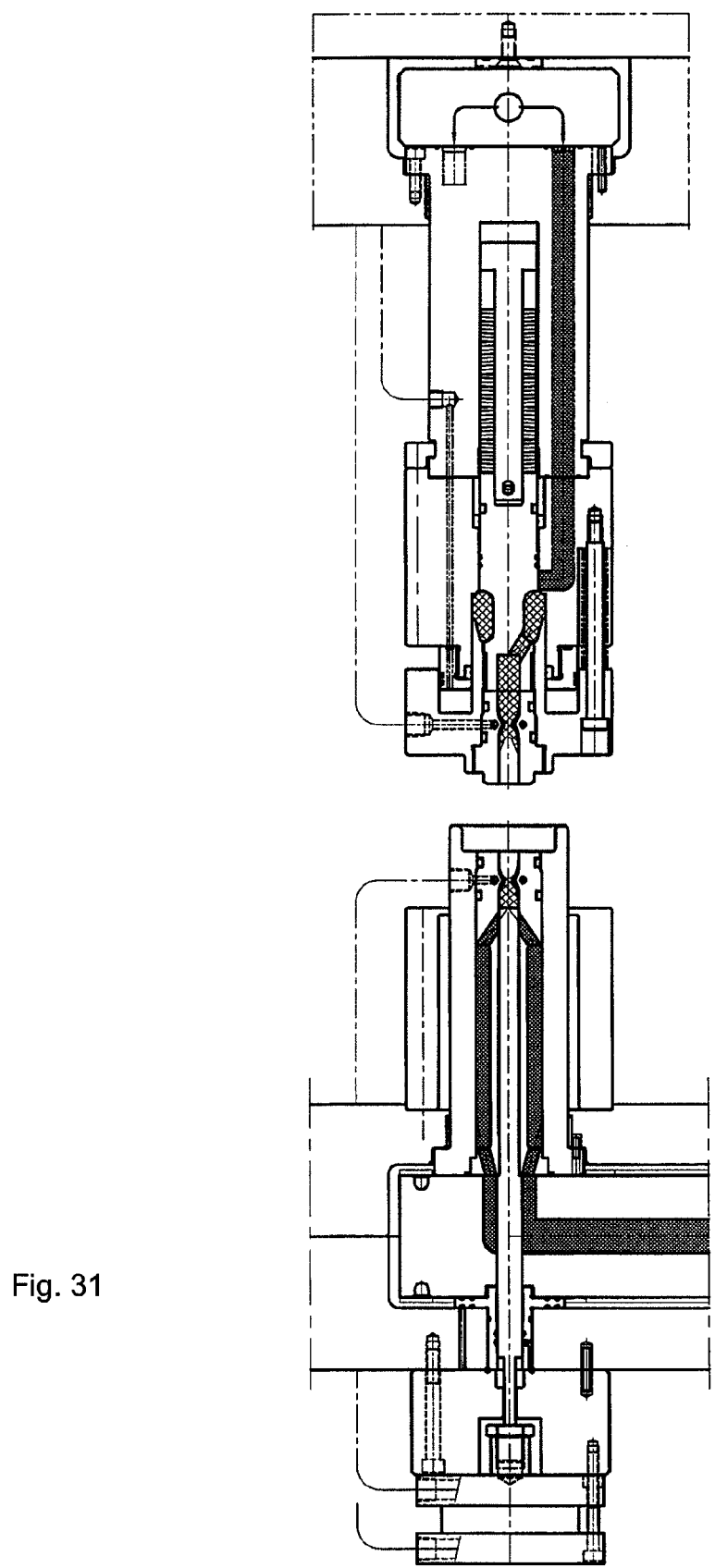
FIG. 31 is a section view of the crossover nozzle system of FIG. 27, shown with the mold open (between injection cycles). Valve stem is extended (valve is closed) on the secondary side, and molten plastic left on both sides of the opening is separated from the pressurized plastic in the flow channels.

With reference to FIG. 27, crossover nozzle system 1124 transfers molten plastic from a feeder manifold 1126 to a main manifold 1128 through a succession of components. From feeder manifold 1126, plastic enters a primary sprue bar 1130 through a number of symmetrically placed holes 1132. It continues on, through primary sprue bar extension 1134, into a transfer chamber 1136 formed between a back floating sprue 1138 and the back portion of a front floating sprue 1140, connected by threaded engagement. A primary sprue shutoff insert (or valve) 1142, installed in threaded engagement at the front end of the front floating sprue 1140, directs molten plastic into a secondary sprue shutoff valve (or insert) 1144 of the secondary side of the crossover nozzle system 124, by pushing back a valve stem 1146. When valve stem 1146 is pushed back fully (as shown in FIG. 30), molten plastic gains access to a number of side grooves 1148 formed between secondary sprue shutoff valve 1144 and a surrounding secondary sprue 1150, and is directed to an inlet hole 1152 of main manifold 1128, and to flow channels 1154 thereon, to reach all the injection chambers of the mold. Further components and features are presented below.

When the mold is closed and injection is in process, the crossover nozzle system is pressed between feeder manifold 1126 and main manifold 1128. A pressure pad 1156, located behind the feeder manifold 1126, in line with crossover nozzle system 1124, and a manifold sealing sleeve 1158, located behind the main manifold 1128 in surrounding relation to the valve stem 1146, allow transfer of injection pressures of the crossover nozzle system 1124 back to the mold plates and to the injection machine. The injection pressures present in the system and the thermal expansions of the various components work together to achieve an improved seal throughout the system and at the contact surface "A" between the primary and the secondary sides of the crossover nozzle system 1124. In addition, several other features are provided to achieve an improved seal and a drool-free opening at the end of each mold cycle, as described in detail below.

Figure 28:
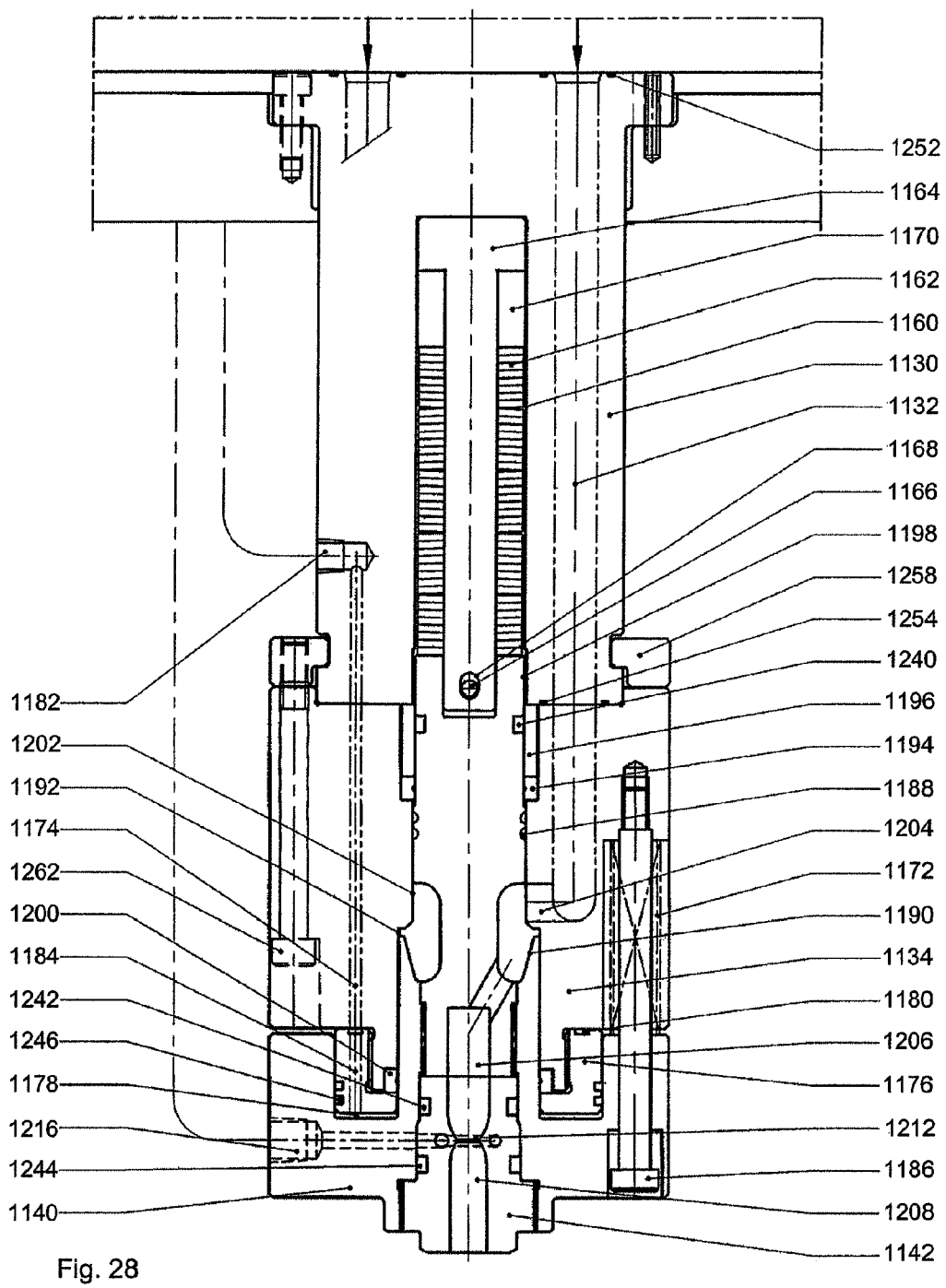
FIG. 28 is an enlarged section detail of the primary side of the crossover nozzle system of FIG. 27.

Referring to FIG. 27 and FIG. 28, in a central pocket 1160 of the primary sprue bar 1130 are stacked several sets of spring washers 1162. Spring washers shown are Belleville type, which are especially suited for high loads in small spaces. They are installed in a sequence of series and parallel, and are centered on a spring washer compression pin 1164. During injection, head of compression pin 1164 rests against bottom of pocket 1160, transferring injection pressures back to the injection machine. The opposite end of compression pin 1164 is secured to back end of back floating sprue 1138 in a loose connection, slidable for a short distance by way of a dowel pin 1166 and slot 1168. Spring washers 1162 are installed with a controlled amount of preload, to urge the floating assembly (formed by back floating sprue 1138, front floating sprue 1140, primary sprue shutoff insert 1142 and all their connecting components therein) against the secondary sprue shutoff valve 1144 at contact surface "A". The number of spring washers 1162 and their installation sequence can be varied to modify their force output or their deflection as desired (optionally, a spacer 1170 can be installed behind the spring packs). The stacking of spring washers in series increases the deflection in proportion to the number of washers, the load remaining the same as with a single washer. Stacking of spring washers in parallel increases the load (the force output), theoretically in proportion to the number of washers; however, practically this is not entirely true, since friction between washers creates an apparent hysteresis in the load-deflection curve. More information on spring washers is provided in technical catalogues of various manufacturers, which are commercially available.

Another extension force urging the floating assembly against the secondary side at contact surface "A" is provided by a number of compression springs 1172, installed circumferentially between primary sprue bar extension 134 and back of front floating sprue 1140. Compression springs 1172 are installed with a controlled amount of pre-compression, to automatically activate the floating assembly forward as soon as the mold starts to open, similar to spring washers 1162.

A built-in pneumatic cylinder 1174, located behind the floating assembly, provides yet another extension force urging the floating assembly against the secondary side. A clamp ring 1176, threadably secured to primary sprue bar extension 1134, is located in pocket 1178 formed at the back of front floating sprue 1140. An annular groove 1180 at the back of clamp ring 1176 directs pressurized air from an air supply 1182 to a number of circumferential holes 1184 connecting to bottom of pocket 1178. A combination of inner and outer seals prevents air escape from pocket 1178. Pressurized air is supplied continuously to pneumatic cylinder 1174, such that it automatically activates the floating assembly to extend as soon as mold starts to open. A benefit of such a design is that no additional system is required to synchronize the pneumatic cylinder with the mold cycles. Shoulder bolts 1186 limit the stroke of the floating assembly, while also acting as guide pins for compression springs 1172.

As soon as injection stops and mold starts to open, the floating assembly extends under the combined influence of the spring washers 1162, compression springs 1172 and built-in pneumatic cylinder 1174. These three features have a double role: to hold the floating assembly firmly pressed against the secondary side of the system during injection for a leak-proof process and to automatically extend the floating assembly as soon as the mold start to open, to seal flow channels and prevent drooling.

As can be seen in FIG. 28, back floating sprue 1138 has a pair of annular grooves 1188 behind transfer chamber 1136, while back end of front floating sprue 1140 has a thin annular extension 1190. Annular grooves 1188 collect any plastic leaks behind the transfer chamber 1136, while thin annular extension 1190 can flex slightly under injection pressure to achieve circumferential contact with front central hole 1192 of primary sprue bar extension 1134, creating a metal-to-metal seal at the front of transfer chamber 1136. A back seal 1194, held in place by a spacer 1196, surrounds the back end 1198 of back floating sprue 1138, to act as backup for seal of annular grooves 1188. A front seal 1200, held in place by clamp ring 1176, is used as backup for metal-to-metal seal of thin annular extension 1190.

Front central hole 1192 is larger than back central hole 1202 of primary sprue bar extension 1134, as can be seen clearly in FIG. 28. This diametric difference uses the injection pressure to further push the floating assembly forward for a leak-proof seal at contact surface "A".

The floating assembly stroke allowed by shoulder bolts 1186 is designed such that, when floating assembly is fully extended, the back end 1198 of back floating sprue 1138 completely covers inlet holes 1204 connecting to transfer chamber 1136. This separates the plastic left in the transfer chamber 1136 and in the front central holes 1206 (of back floating sprue 1138) and 1208 (of front floating sprue 1142) from the pressurized plastic of inlet holes 1132 and 1204, achieving a pressure reduction at the front of the primary side of the system. Extension of floating assembly also achieves a pullback of the plastic left in central holes 1206 and 1208, to reduce drool as the system opens.

With reference to FIGS. 28 and 30, primary sprue shutoff insert 1142 and secondary sprue shutoff valve 1144 have yet another feature designed to reduce drool of molten plastic during mold opening. Central hole 1208 of primary sprue shutoff insert 1142 and central hole 1210 of secondary sprue shutoff valve 1144 are provided with hourglass (or other convergent-divergent profiles) portions 1212 and 1214 respectively. Cooling circuits 1216 and 1218, fed externally from the mold or the injection machine, surround the hourglass portions to achieve cooling of the plastic left in holes 1208 and 1210 during mold opening. This plastic solidifies partially, forming skins 1220 and 1222 inside the hourglass portions, as shown in FIG. 32. The skins reduce the hourglass holes considerably, which further helps prevent drooling. As molten plastic is forced through the system for a new cycle, its high temperature helps melt the solidified skins, which are then reused, preventing formation of stale plastic in the system.

On the secondary side of the crossover nozzle system 1124, an activating cylinder 1224 (e.g. pneumatic) is secured onto a cylinder support 1226, itself mounted onto the stationary manifold plate 1112. Piston 1228 of activating cylinder 1224 is continuously activated to extend (the "extend" function is always on). The "retract" function of the cylinder is not used; the "retract" inlet works only as an exhaust. A T-coupling 1230, threadably engaged to piston 1228, is in loose connection with back end of valve stem 1146. T-coupling 230 and valve stem 1146 are not mechanically secured; that is not necessary since the "retract" function of the cylinder is not used and piston 1228 does not retract valve stem 1146. They are however maintained in contact, either by piston 1228 extending to close the valve, or by injection pressure pushing valve stem 1146 back to open the valve. Valve stem 1146 is pushed back until it bottoms out in pocket 1232 of cylinder support 1226. To protect the activating cylinder 1224 from damage due to repeated shocks, valve stem 1146 bottoms out in pocket 1232 before piston 1228 reaches the end of its stroke.

When injection pressures push valve stem 1146 back, molten plastic transferred through central holes 1208 and 1210 gains access to radial holes 1234, then to side grooves 1148 and, through radial holes 1236, to inlet hole 1152 of main manifold 1128. Any plastic leaks from inlet hole 1152 are collected by a number of annular grooves 1238 located on both sides of flange portion and on the inside and outside of manifold sealing sleeve 1158, and are drained externally.

Back seal 1194 and front seal 1200 can be made of a composite material, with high thermal resistance. Furthermore, a high-temperature seal 1240 is provided on back end 1198 of back floating sprue 1138, to act as backup for back seal 1194. On the primary side, high-temperature seals 1242 and 1244 seal around cooling circuit 1216, and a pair of high-temperature seals 1246 prevents air escape between front floating sprue 1140 and clamp ring 1176 from built-in pneumatic cylinder 1174. On the secondary side, high-temperature seals 1248 and 1250 seal around cooling circuit 1218.

Figure 29:
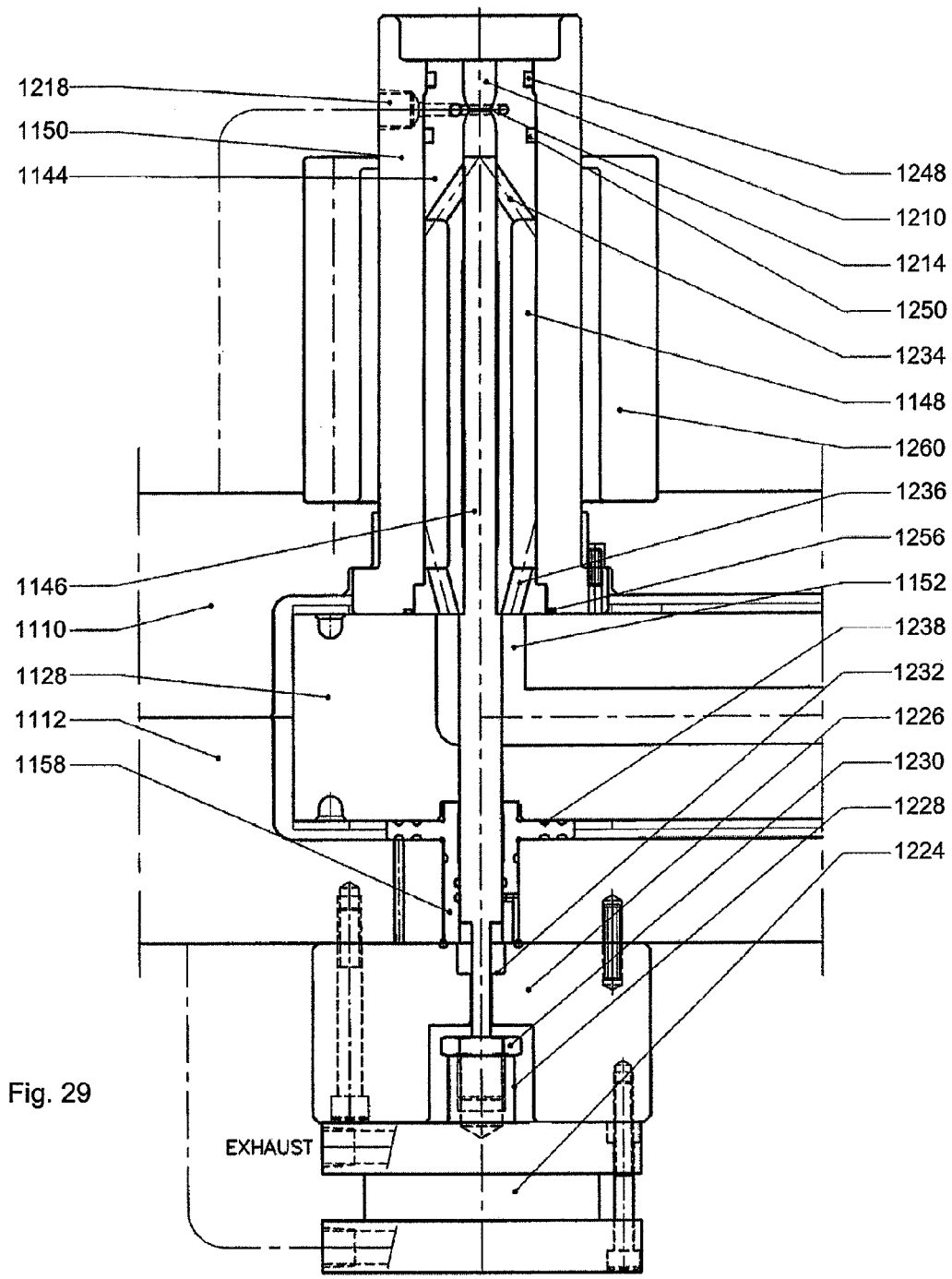
FIG. 29 is an enlarged section detail of the secondary side of the crossover nozzle system of FIG. 27.

Flow of molten plastic through the various components of the crossover nozzle system 1124 is sealed with metal o-rings, which are resistant to both high temperatures and high-pressures. With reference to FIG. 28, on the primary side holes 1132 are sealed by metal o-rings 1252 (between feeder manifold 1126 and primary sprue bar 1130) and metal o-rings 1254 (between primary sprue bar 1130 and primary sprue bar extension 1134). With reference to FIG. 29, on the secondary side metal o-ring 1256, located between secondary sprue 1150 and main manifold 1128, seals around inlet hole 1152.

An advantage of the embodiments of the present invention, from a mold operator's point of view, is that it allows servicing of the crossover nozzle system with little effort, while the mold remains in the machine. Removal of shoulder bolts 1186 allows the operator to simply pull out the entire floating assembly, complete with spring washers 1162 and compression pin 1164, while the primary sprue bar extension 1134 remains attached to the primary sprue bar 1130; this is useful since it gives the operator quick access to spring washers 1162 for any desired adjustments. Another advantage is that the length of the crossover nozzle system can be varied depending on mold stack height, without replacing the entire crossover nozzle system. As an example, the primary sprue bar extension 1134, floating assembly and secondary side can stay unchanged, while only the length of primary sprue bar 1130 can be varied. This is made possible by split-ring connectors 1258, which in the example shown are two halves of a connector ring; removal of bolts 1262 allows detachment of primary sprue bar extension 1134 from primary sprue bar 1130.

The primary side of the crossover nozzle system is heated by way of cartridge heaters (not shown in the drawings), as described above. The secondary side of the system is heated by a coil heater (not shown in the drawings), which is housed in a secondary sprue locating ring 1260, found in surrounding relation to secondary sprue 1150, similar to that described above.

The crossover nozzle system in general and that of the third alternative embodiment described above provides the following advantageous features:

1. The built-in pneumatic cylinder of the primary side of crossover nozzle system provides a positive extension force urging the floating assembly to extend as soon as secondary side is retracted from contact at surface "A".

2. Continuous supply of pressurized air to built-in pneumatic cylinder (described at 1 above) achieves appropriate release (extension) of the floating assembly after each mold cycle, without use of any additional timing systems to synchronize the extension of floating assembly with the opening of the mold.

3. Extension of the floating assembly to its full stroke achieves sealing between the transfer chamber and the inlet holes, resulting in a pressure reduction at the front of the primary side of the system.

4. Extension motion of the floating assembly causes a pullback of the plastic left in the central hole of the primary sprue shutoff insert, to prevent plastic drool.

5. The design of primary side of the crossover nozzle system allows quick and easy removal of the floating assembly for service, while mold remains in the injection machine.

6. The two-piece design, having a back floating sprue and primary sprue shutoff insert, allows machining of hourglass portion (or other convergent-divergent profiles) at the front of the primary side of the system.

7. Cooling around the hourglass portion (or other convergent-divergent profiles) of the central hole of primary sprue shutoff insert causes formation of a skin that reduces size of hourglass hole, thus helping prevent plastic drool. Furthermore, with each new mold cycle, the newly injected plastic melts the existing skin and reuses it, to prevent formation of stale plastic.

8. The activating cylinder of the secondary side of the crossover nozzle system provides a continuous extension force urging the valve stem to close the valve as soon as injection stops.

9. The continuous supply to the "extend" inlet of the activating cylinder (described at 8 above) achieves appropriate release (extension) of the valve stem at the end of each mold cycle, without use of an additional timing systems to synchronize the extension of valve stem with the opening of the mold.

10. The extension of the valve stem separates the central hole of the secondary sprue shutoff valve from the pressurized plastic of the side grooves and the radial holes, achieving a pressure reduction at the front central hole to reduce plastic drool during opening of mold.

11. Cooling around the hourglass portion (or other convergent-divergent profiles) of the central hole of secondary sprue shutoff valve causes formation of a skin that reduces size of hourglass hole, thus helping reduce plastic drool. Furthermore, with each new mold cycle, the newly injected plastic melts the existing skin and reuses it, to prevent formation of stale plastic.

12. The crossover nozzle system as described is adaptable to various mold heights. Adaptability is achieved by altering the length of the primary sprue bar. The primary sprue bar extension, the floating assembly and the secondary side of the crossover nozzle system may not need to be altered.

13. The crossover nozzle system described is not limited to a 2-level stack mold. It can be adapted to 3-level and 4-level stack molds by utilizing different design configurations, while maintaining the overall concept of crossover nozzle system.

A fourth alternate embodiment of the invention is described below in connection with FIGS. 33-35. According to one aspect of the fourth alternative embodiment, the crossover nozzle system relies on molten plastic pressure within the system to actuate the primary sprue shut-off valve, and thus to open and close the flow of molten plastic to the molds. The primary sprue shut-off valve (hereinafter the shut-off valve) moves to an open position when the molten plastic pressure is high enough to overcome the biasing force of a spring or other urging means which biases the shut-off valve toward the closed position. When the molten plastic pressure drops, the biasing force overcomes the pressure force, and the shut-off valve moves to the closed position, i.e. the tip of the valve closes the opening on the primary sprue shut-off insert. Therefore, a drool-free valve mechanism is created without needing an external actuation of the shut-off valve like, for instance, a hydraulic or a pneumatic cylinder.

Furthermore, an effective sealing is provided by the high pressure of the molten plastic against the tapered extension of the back floating sprue sleeve and the tapered extension of the front floating sprue. When subjected to the high pressure of the molten plastic, the tapered extensions attempt to deform outwards, but their deformation is arrested by the adjacent primary sprue bar, thus creating a metal-to-metal sealing when a good sealing is needed the most, i.e. when the molten plastic pressure inside the crossover nozzle system is high. A back seal, which may be a wiper seal, is provided between the back floating sprue sleeve and the primary sprue bar to further reduce leaks of the molten plastic between these parts. The molten plastic that still leaks past the seals is drained out of the crossover nozzle system through the weep holes.

Yet another feature of this fourth alternative embodiment of the present invention is a reduced recirculation flow of the molten plastic in the space between the front floating sprue insert and back floating sprue sleeve, because the larger diameter of the front floating sprue insert reduces the space available for the molten plastic recirculation.

Moreover, the disassembly of the crossover nozzle system is simplified by using a two-part "C" clamp design. The clamp attaches with the front floating sprue using one securing screw per each part of the "C" clamp. Removal of the "C" clamp enables easy removal of the front floating sprue insert, front floating sprue, and primary sprue shut-off insert together with the shut-off valve, thus providing an easy access to the parts that tend to be the most exposed to a wearout. Additionally, the system has a single sprue bar, i.e. the primary sprue bar, which may be an improvement compared to the systems that require both a primary sprue bar and an extension sprue bar.

These features enable the crossover nozzle system to transfer molten plastic to the molds using a single sprue bar. The system does not require an external source of the shut-off valve actuation, while providing a drool-free opening to avoid spills and waste. The undesirable recirculation flow area is also reduced. Furthermore, the system is easy to assemble and disassemble using a two-part "C" clamp. In addition, the system reduces plastic leaks using the metal-to-metal seals and wiper seals.

Figure 33:
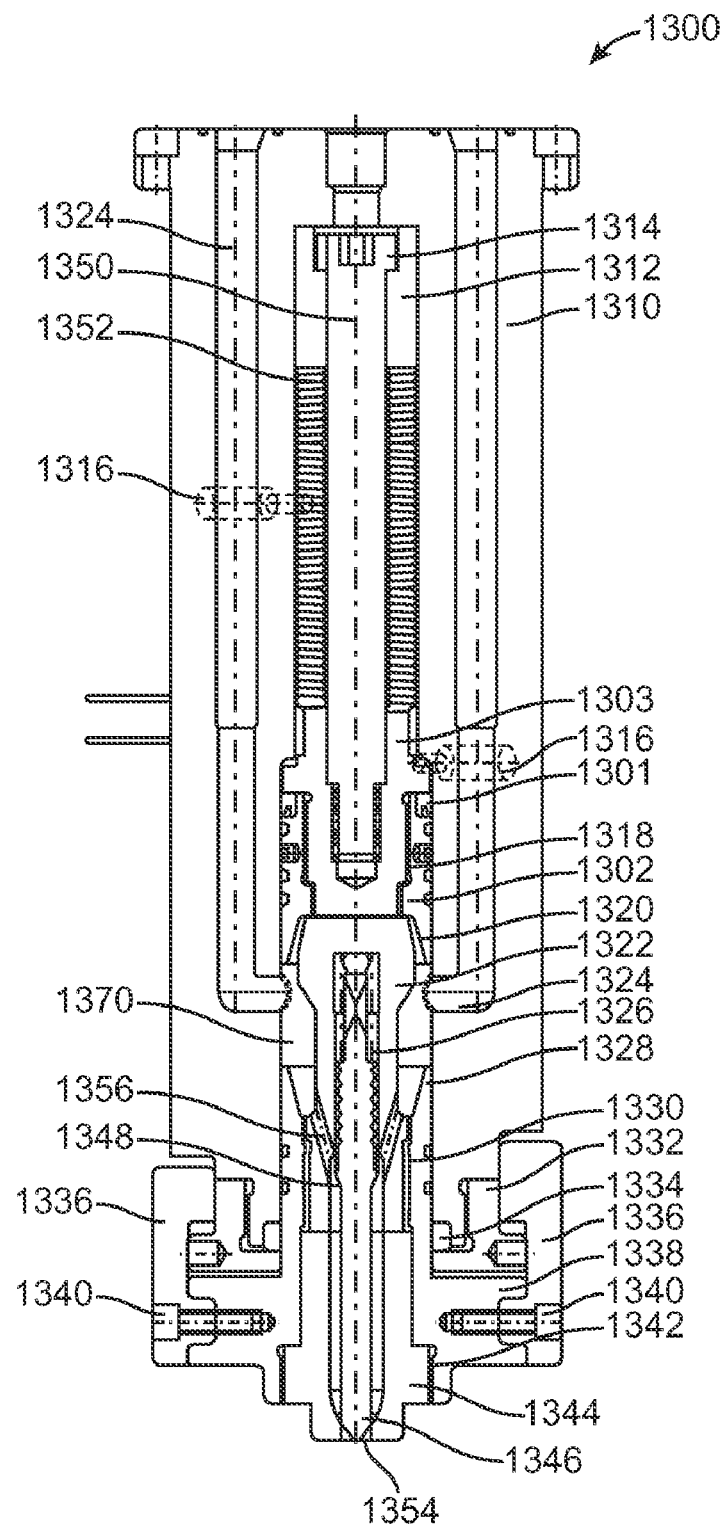
FIG. 33 is a section view of a crossover nozzle system in accordance with the fourth alternative embodiment of the invention.

FIG. 33 shows crossover nozzle system 1300 in accordance with the fourth embodiment of the invention. Other parts of the molds, like the top plate, feeder plate/stationary core plate, stationary core, mold cavities, manifold plates, cavity plates, core plates, bottom plates, etc., are described in connection with the other embodiments disclosed in this application, and are not shown in FIG. 33. Furthermore, while a single crossover nozzle assembly is shown in FIG. 33, it would be clear to a person skilled in the art of injection molding that multiple crossover nozzle assemblies may be used, both in a central and the off-center positions.

Referring to FIG. 33, molten plastic enters crossover nozzle system through holes 1324 on primary sprue bar 1310. Compression pin 1350 is positioned in a central hole of a one-piece primary sprue bar 1310. Shoulder bolt 1314 connects compression pin 1350 with primary sprue bar 1310. Spring washers 1352 are installed with a controlled amount of preload, to urge the floating assembly (formed by back floating sprue 1303, front floating sprue insert 1322, primary sprue shut-off insert 1344, and all their connecting components) against spring 1326, which, in turn, biases shut-off valve 1346 towards opening 1354 in primary sprue shut-off insert 1344. When the tip of shut-off valve 1346 presses against opening 1354, the flow of molten plastic toward the molds is closed. This is the position shown in FIG. 33. The counter-force that biases shut-off valve 1346 away from opening 1354, thus opening the flow of molten plastic toward the molds, can be provided by the pressure of the molten plastic itself, as explained below with reference to FIG. 35.

Referring still to FIG. 33, the molten plastic which passes through inlet holes 1324 enters transfer chamber 1370 disposed between front floating sprue insert 1322 and primary sprue bar 1310, and further enters radial holes 1356 and the space between shut-off valve 1346 and primary sprue shut-off insert 1344. Back tapered extension 1320 on back floating sprue sleeve 1302 prevents molten plastic from leaking in the direction of compression pin 1350, while front tapered extension 1328 on front floating sprue 1338 prevents molten plastic from leaking in the direction of primary sprue shut-off insert 1344. Due to the high pressure of molten plastic, front tapered extension 1328 and back tapered extension 1320 bend outwardly radially, i.e. away from the molten plastic and in the direction of primary sprue bar 1310. However, due to the mechanical strength of primary sprue bar 1310, the bending is arrested and a metal-to-metal seal is created, thus preventing molten plastic leakage between back floating sprue sleeve 1302 and primary sprue bar 1310 (in the direction of compression pin 1350) or front floating sprue 1338 and primary sprue bar 1310 (in the direction of primary sprue shut-off insert 1344). Back seal 1301 may be disposed between primary sprue bar 1310 and back floating sprue sleeve 1302 to further reduce any molten plastic leaks past the metal-to-metal seal. Back seal 1301 may be a wiper seal having an advantage of expanding outwardly when subjected to high temperature, thus further increasing the pressure between the seal and surrounding material, which, in turn, decreases the leakage of molten plastic. The molten plastic that still leaks past back seal 1301, and enters the space between back floating sprue 1303 and primary sprue bar 1310 or the space around spring washers 1352, may be discharged out of the system by one or more weep holes 1316. Additionally, molten plastic that leaks past the metal-to-metal seal between front floating sprue 1338 and primary sprue bar 1310 is further sealed off by front seal 1334.

FIG. 33 also shows a two-part "C" clamp 1336, which is attached with front floating sprue 1338 by fasteners 1340, which may be securing screws. Removal of "C" clamp 1336 enables an easy access to primary sprue shut-off insert 1344 and further to shut-off valve 1346. Those parts may be susceptible to wearout and, therefore, may require more frequent servicing or replacement.

Figure 34:
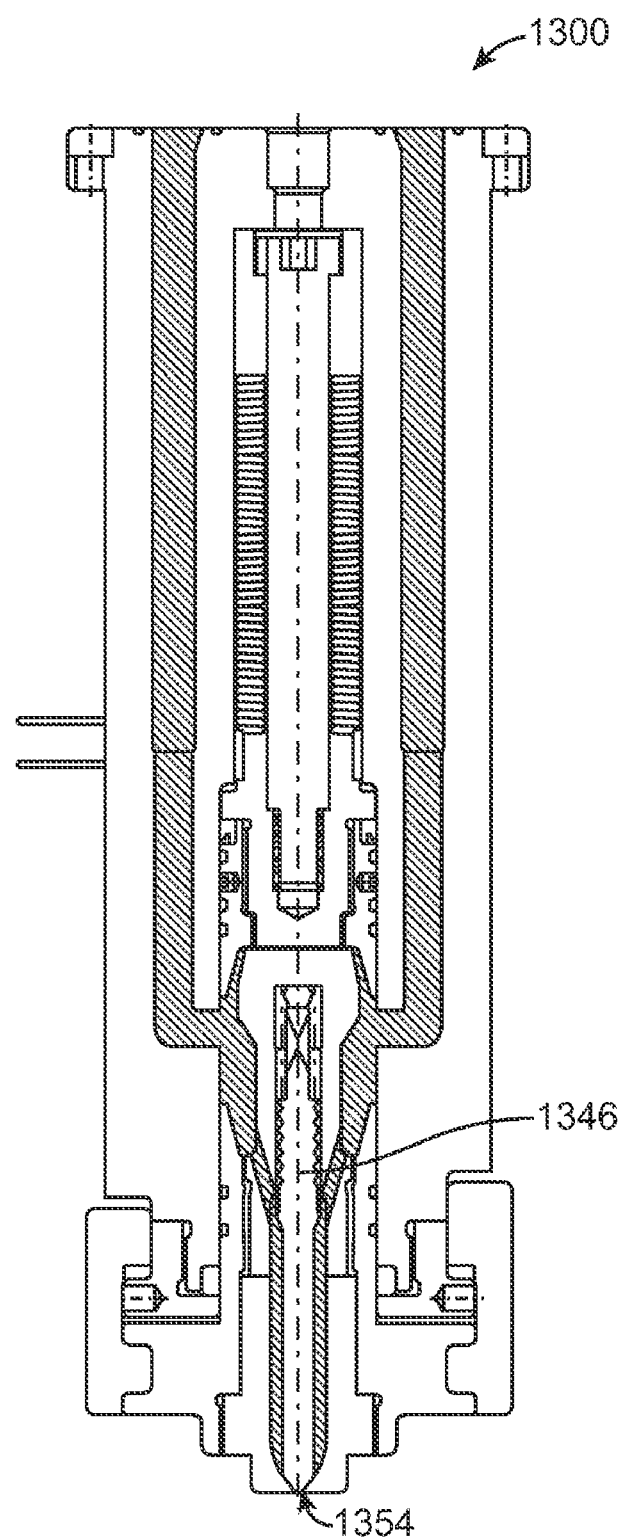
FIG. 34 is a section view of the crossover nozzle system of FIG. 33. The shut-off valve closes the hole on the primary sprue shut-off insert, thus not allowing transfer of molten plastic to the molds.
Figure 35:
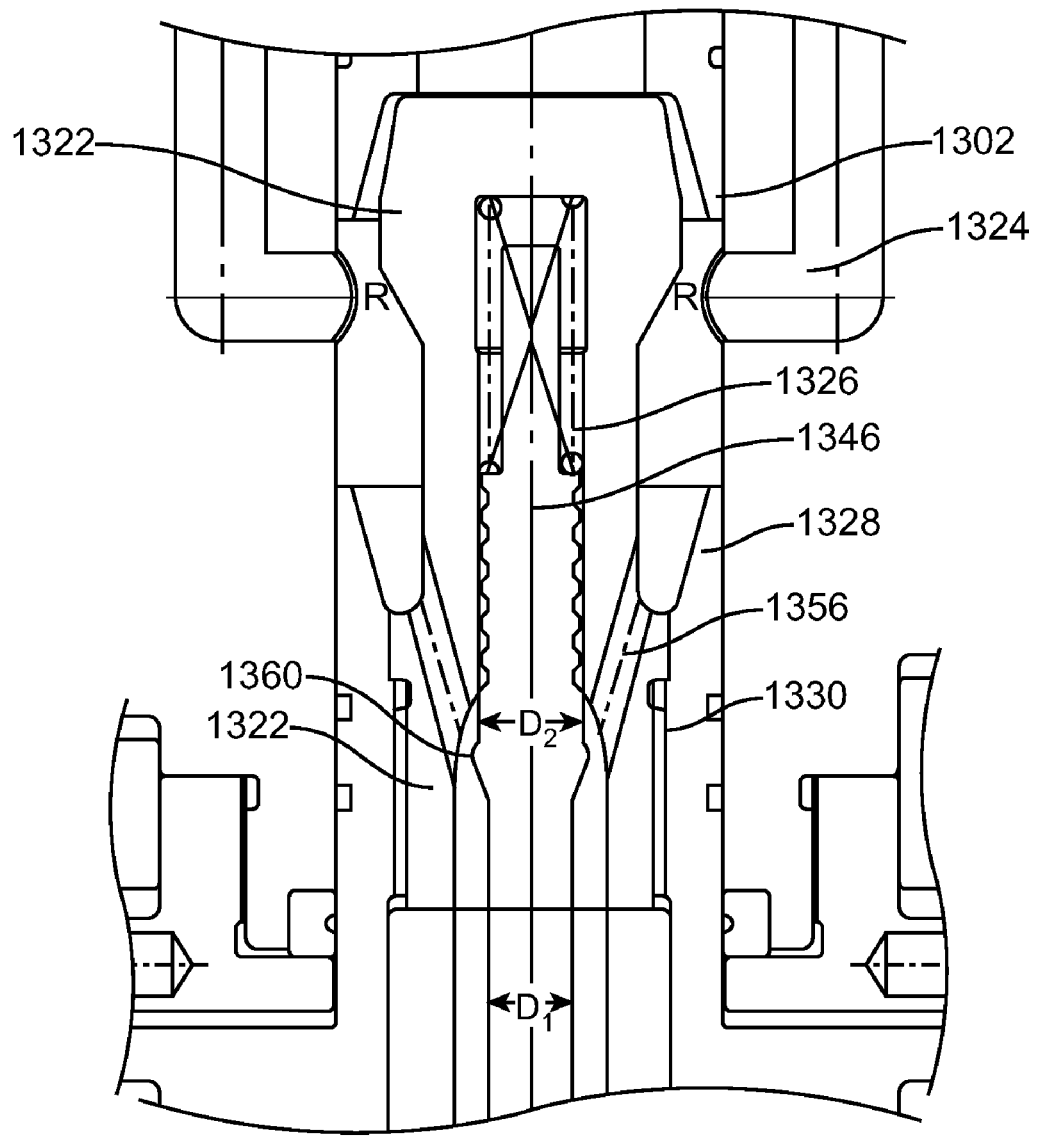
FIG. 35 is an enlarged section detail of the central portion of FIG. 33, showing the different diameters on the shut-off valve.

The actuation of shut-off valve 1346 is shown with reference to FIGS. 34 and 35. FIG. 34 shows the path of molten plastic (depicted by the shading) through crossover nozzle system 1300. A second end of shut-off valve 1346 is engaged against opening 1354 on primary sprue shut-off insert 1344, thus preventing molten plastic from escaping toward the molds. FIG. 35 shows a detail of crossover nozzle system 1300. Biasing means 1326, which may be a spring, may be housed in a central opening of front floating sprue insert 1322. Biasing means (hereinafter spring) 1326 are configured to engage with a first end of shut-off valve 1346, and to bias the valve toward opening 1354 (not shown) on primary sprue shut-off insert 1344. Shut-off valve 1346 has a non-uniform diameter: bigger diameter $D_2$ on the side closer to spring 1326 (the first end), and a smaller diameter $D_1$ on the side closer to opening 1354 (the second end). As the high pressure molten plastic enters the space between shut-off valve 1346 and front floating sprue insert 1322, the difference between shut-off valve 1346 diameters $D_2$ and $D_1$ results in a projection area for the upwardly pushing pressure of molten plastic (in the direction of spring 1326). This projection area, when multiplied with the high pressure of molten plastic, is enough to overcome the biasing force of spring 1326 and to move shut-off valve 1346 toward spring 1326. The movement of shut-off valve 1346 toward spring 1326 removes the second end of shut-off valve 1346 from opening 1354, thus allowing molten plastic to flow toward the molds. The compression of spring 1326 may stop when shank 1360 on shut-off valve 1346 makes contact with front floating sprue insert 1322, thus creating a metal-to-metal seal which protects spring 1326 from molten plastic. When the pressure of the molten plastic is reduced by, for example, stopping the molten plastic feed drive (not shown), the biasing force of spring 1326 becomes higher than the opposing pressure force. Consequently, spring 1326 now moves shut-off valve 1346 to contact hole 1354, thus shutting off the flow of molten plastic to the molds. Therefore, shut-off valve 1346 is actuated based on the pressure of molten plastic. No external actuator, like, for example a pneumatic or hydraulic cylinder, is needed for opening and closing of the flow of molten plastic to the molds.

Referring still to FIG. 35, as molten plastic leaves inlet holes 1324, a recirculation zone R may be created in the space between front floating sprue insert 1322 and back floating sprue sleeve 1302. A recirculation flow is undesirable, because molten plastics may cool inside the zone, and may start solidifying. The size of the recirculation zone is reduced in crossover nozzle system 1300 by increasing the diameter of front floating sprue insert 1322 in the area of back tapered extension 1320.

The crossover nozzle system in general and that of the fourth alternative embodiment described above provides the following advantageous features:

1. Primary sprue bar is one-piece. Primary sprue bar extension is not used, thus a design simplification is achieved.

2. The shut-off valve actuation is achieved by molten plastic pressure and the non-uniform diameter of the shut-off valve, thus not requiring an external actuator like, for example, a pneumatic or hydraulic cylinder.

3. When the pressure of molten plastic is reduced, the spring that biases the shut-off valve pushes the shut-off valve into contact with the hole on the primary sprue shut-off insert, thus preventing plastic drooling.

4. Metal-to-metal seals based on high molten plastic pressure are used between back tapered extensions and primary sprue bar, front tapered extensions and primary sprue bar, and the front floating sprue insert and the shank on the shut-off valve. The sealing ability of the metal-to-metal seals improves with the higher pressure of the molten plastic, coinciding with the need for an improved sealing to limit the leaks of the molten plastic.

5. Wiper seal which improves its sealing performance with increased temperature is used to further limit molten plastic leaks.

6. Weep holes are provided to discharge the molten plastic which leaked past the metal-to-metal seals and the wiper seal.

7. Recirculation area is reduced by increasing the diameter of front floating sprue insert in the vicinity of the back tapered extension.

8. Two-part "C" clamp uses one fastener only to attach each part with the front floating sprue. The removal of the "C" clamp provides an easy access to the front floating sprue insert, primary sprue shut-off insert and the parts attached thereto.

A fifth alternate embodiment of the invention is shown in connection with FIGS. 36-37, and is described below. According to one aspect of the fifth alternative embodiment, the crossover nozzle system does not have a primary sprue shut-off valve. The molten plastic has an uninterrupted path from the inlet hole in the primary sprue bar to the hole in the primary sprue shut-off insert. Some level of the molten plastic drool is tolerated at the hole in the primary sprue shut-off insert. Therefore, the crossover nozzle system of this embodiment may be well suited for the molten plastics having high viscosity and high surface tension, because those properties reduce the leaks. The pressure of the molten plastic is regulated by, for instance, turning the molten plastic feed drive on and off, and by opening and closing the molds.

Furthermore, the fifth alternative embodiment incorporates the advantages of the metal-to-metal sealing, the wiper seal, a reduced recirculation flow, easily removable "C" clamp design, and a single sprue bar. These advantages are explained in detail with the fourth embodiment shown in FIGS. 33-35, and are not repeated here for the sake of brevity.

Figure 36:
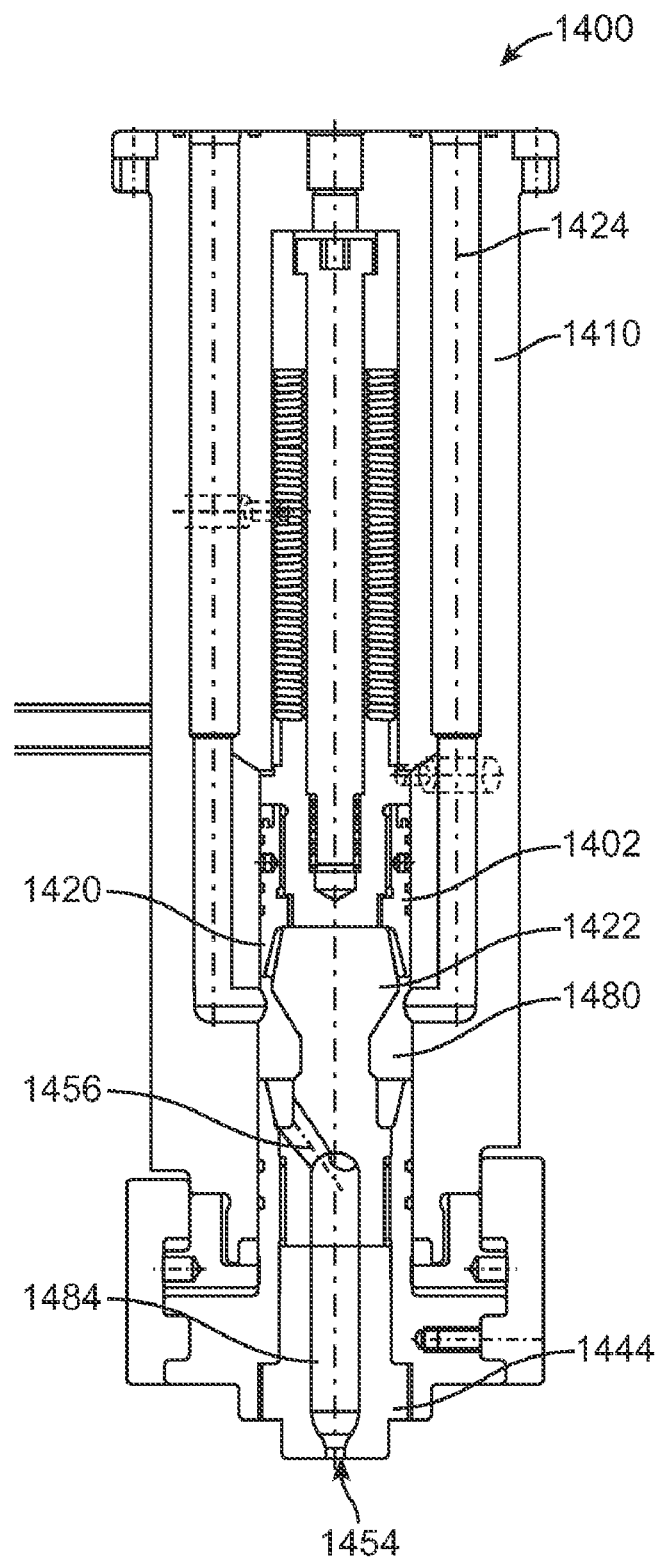
FIG. 36 is a section view of a crossover nozzle system in accordance with the fifth alternative embodiment of the invention.

FIG. 36 shows crossover nozzle system 1400 in accordance with the fifth embodiment of the invention. Other parts of the mold, like the top plate, feeder plate/stationary core plate, stationary core, mold cavities, manifold plates, cavity plates, core plates, bottom plates, etc., are described in connection with the other embodiments disclosed in this application, and are not shown in FIG. 36. Furthermore, while a single crossover nozzle assembly is shown in FIG. 36, it would be clear to a person skilled in the art of injection molding that multiple crossover nozzle assemblies may be used, both in a central and the off-center positions.

Referring to FIG. 36, a molten plastic feed drive (not shown) forces the molten plastic into inlet hole 1424, and, from there, into the space between front floating sprue insert 1422 and primary sprue bar 1410. From there, one or more radial holes 1456 lead to sprue insert hole 1484, and further to opening 1454 on primary sprue shut-off insert 1444, and further to the molds. When the molten plastic feed drive is on, the high pressure of molten plastic improves metal-to-metal sealing, thus reducing the leaks (as explained in detail above with reference to FIGS. 33-35). When the molten plastic drive is off, the pressure of the molten plastic is reduced, but a certain amount of drool may occur at opening 1454, because this crossover nozzle system does not have a shut-off valve. Thus, the crossover nozzle system as in FIG. 36 may be suitable for the high viscosity and/or high surface tension molten plastics.

Figure 37:
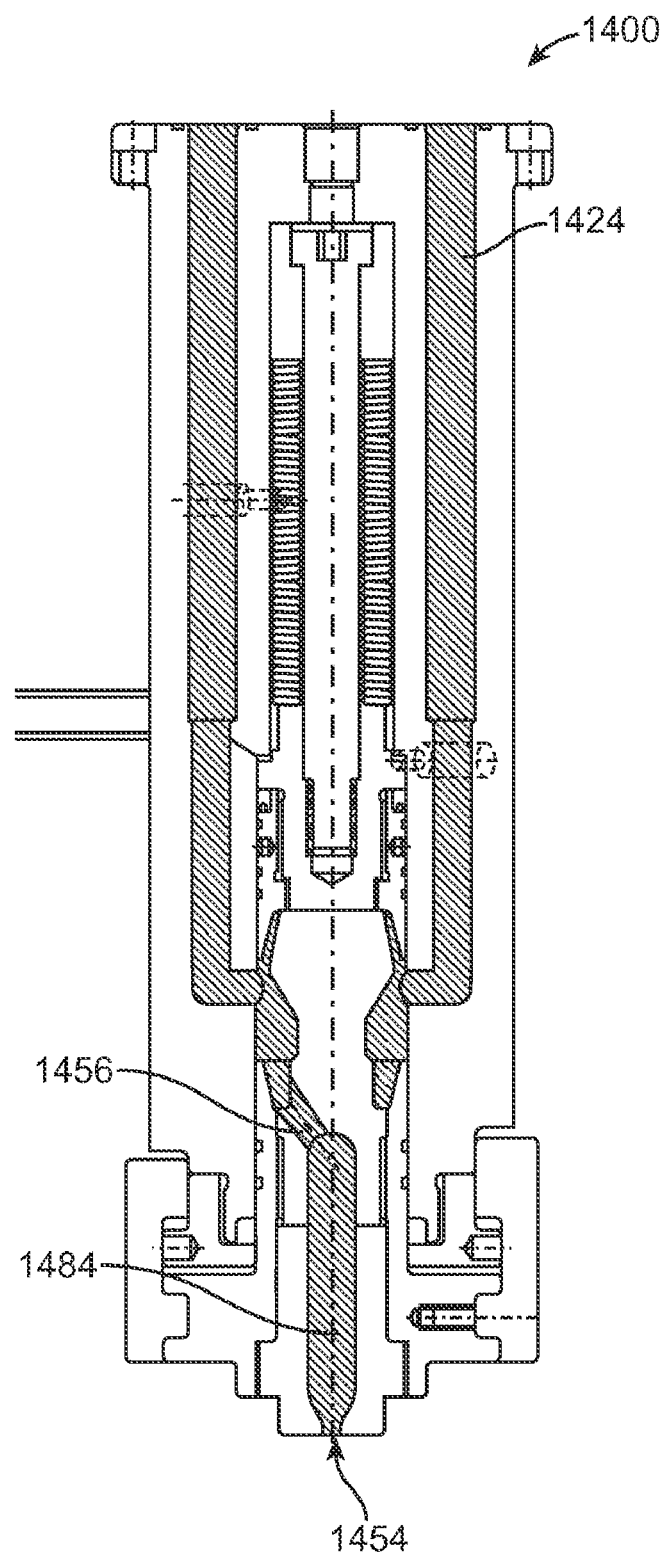
FIG. 37 is a section view of the crossover nozzle system of FIG. 36, showing the flow of molten plastic to the molds.

FIG. 37 shows the path of molten plastic (depicted by the shading) through crossover nozzle system 1400. The molten plastic enters inlet hole 1424, and flows to radial holes 1456, and from there to sprue insert hole 1484 and further to opening 1454. FIG. 37 is a cross-sectional view having the cross-section plane passing through one of radial hole 1456 on the left hand side. Additional radial holes 1456 may be present, but, not being on the cross-section plane, are not shown in FIG. 37.

The crossover nozzle system in general and that of the fifth alternative embodiment described above provides the following advantageous features:

1. There is no shut-off valve. Therefore, no actuation of the valve is needed, either by the molten plastic pressure or by the external actuators. Certain level of the molten plastic drool is tolerated in this embodiment.

2. Primary sprue bar is one-piece. Primary sprue bar extension is not needed, thus a design simplification is achieved.

3. Metal-to-metal seals based on high molten plastic pressure are used between back tapered extensions and primary sprue bar, front tapered extensions and primary sprue bar, and the front floating sprue insert and the shank on the shut-off valve. The sealing ability of the metal-to-metal seals improves with the higher pressure of the molten plastic, coinciding with the need for an improved sealing to limit the leaks of molten plastic.

4. Wiper seal which improves its sealing performance with increased temperature is used to further limit molten plastic leaks.

5. Weep holes are provided to discharge the molten plastic which leaked past the metal-to-metal seals and the wiper seal.

6. Recirculation area is reduced by increasing the diameter of front floating sprue insert in the vicinity of the back tapered extension.

7. Two-part "C" clamp uses one fastener only to attach each part with the front floating sprue. The removal of the "C" clamp provides an easy access to the front floating sprue insert, primary sprue shut-off insert, and the parts attached thereto.

A sixth alternative embodiment of the invention is shown in connection with FIGS. 38-40, and is described below. According to an aspect of the sixth alternative embodiment, the crossover nozzle system does not have a primary sprue shut-off valve as similar to the fifth embodiment described above.

Furthermore, the sixth alternative embodiment incorporates the advantages of the metal-to-metal sealing, the wiper seal, a reduced recirculation flow, easily removable "C" clamp design, and a single sprue bar. These advantages are explained in detail with the above embodiments, and are not repeated here for the sake of brevity.

Figure 38:
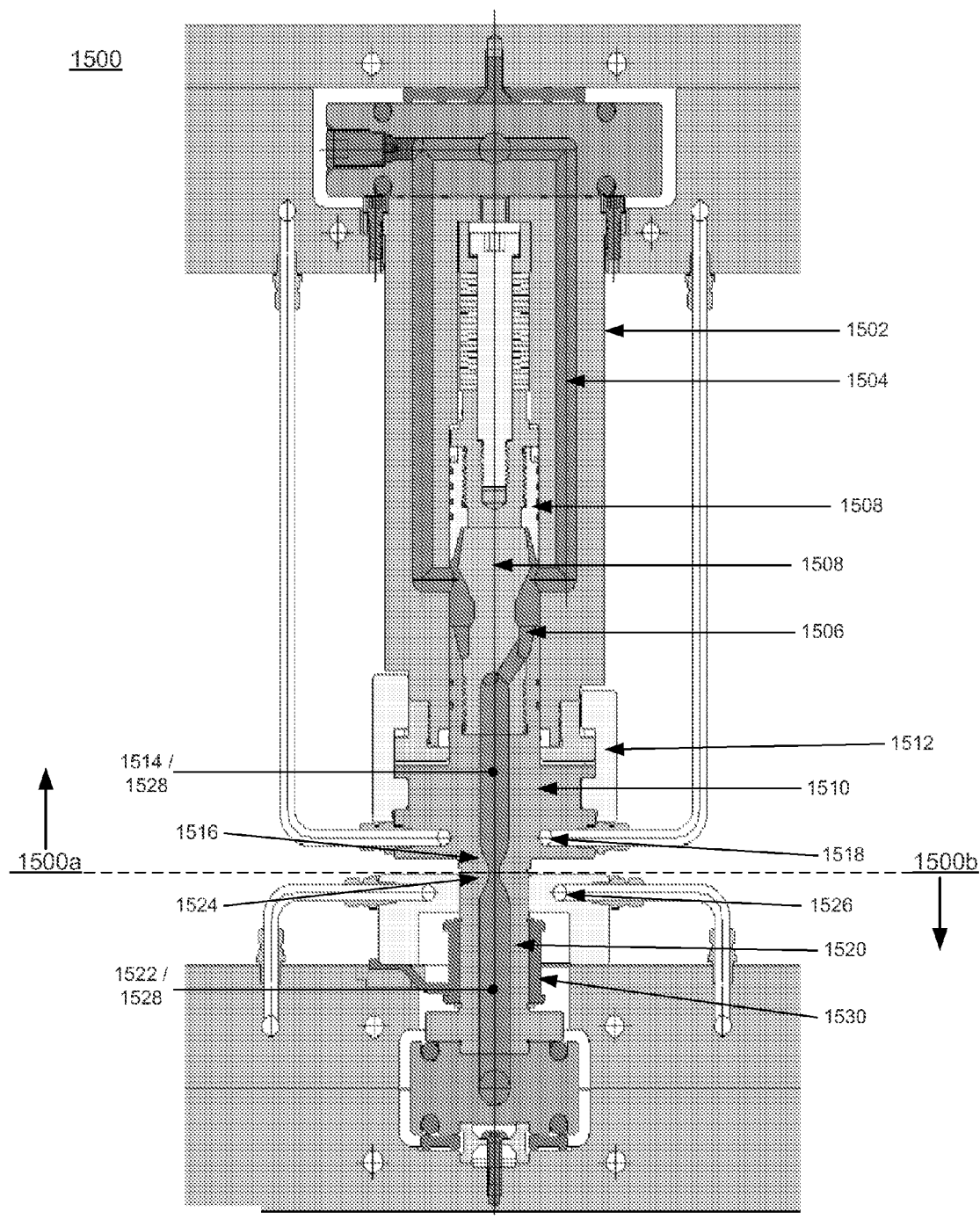
FIG. 38 is a section view of a crossover nozzle system in accordance with the sixth alternative embodiment of the invention.

FIG. 38 shows crossover nozzle system 1500 in accordance with the sixth embodiment of the invention. The crossover nozzle system 1500 includes a primary side 1500a in operational contact with a secondary side 1500b. The primary side 1500a and the secondary side 1500b can be disconnected for access to both sides. The primary side 1500a includes a primary sprue bar 1502 that has an inlet hole 1504 that is in fluid communication with the feeder manifold for the conveyance of plastic therein. A floating sprue insert 1508 is located within the primary sprue bar 1502. A plurality of radial holes 1506 of the floating sprue insert 1508 are in fluid communication with the inlet hole 1504. A primary sprue insert 1510 is threadably connected to the floating sprue insert 1508. The primary sprue insert 1510 is connected to a "C" clamp 1512 which is in turn connected to the primary sprue bar 1502. The primary sprue insert 1510 includes a primary insert hole 1514 that is fluidly connected to the plurality of radial holes 1506. The primary sprue insert 1510 includes a primary opening 1516 that is fluidly connected to the primary insert hole 1514. A primary cooling channel 1518 is adjacent to the primary insert hole 1514. The primary cooling channel 1518 may be connected to valves (not shown) which control the flow of a coolant within the primary cooling channel 1518.

The primary sprue insert 1510 is in operational contact with a secondary sprue 1520. The primary sprue insert 1510 and secondary sprue 1520 are held in contact by mold press means during injection, but they separate as the mold opens after each injection cycle to allow ejection of molded part(s). The secondary sprue 1520 includes a secondary sprue hole 1522 that is fluidly connected to the main manifold of the molding chambers. A secondary opening 1524 is fluidly connected to the secondary sprue hole 1522. The secondary sprue 1520 includes a secondary cooling channel 1526. The secondary cooling channel 1526 may be connected to valves (not shown) which control the flow of a coolant within the cooling secondary channel 1526. In some embodiments, the primary cooling channel 1518 and secondary cooling channel 1526 are fluidly connected to one or more cooling channels of the molding chambers. The primary cooling channel 1518 and secondary cooling channel 1526 may be fluidly connected in this manner without using dedicated valves that only serve to regulate flow to the primary cooling channel 1518 and secondary cooling channel 1526. The primary cooling channel 1518 and secondary cooling channel 1526 may be fluidly connected in series (i.e., downstream or upstream) or in parallel with the molding chamber cooling channels.

The primary insert hole 1514 and the secondary sprue hole 1522 form a chamber 1528 with an hour glass shaped profile. The chamber 1528 is separated by a parting line at a reduced diameter of the hour glass shaped profile. An electrical heating unit 1530 is attached about the secondary sprue hole 1522 to reheat molten plastic after the parting line.

Other parts of the mold, like the top plate, feeder plate/stationary core plate, stationary core, mold cavities, manifold plates, cavity plates, core plates, bottom plates, etc., are described in connection with the other embodiments disclosed in this application. Furthermore, while a single crossover nozzle assembly is shown in FIG. 38, multiple crossover nozzle assemblies may also be used, both in a central and the off-center positions.

Figure 39:
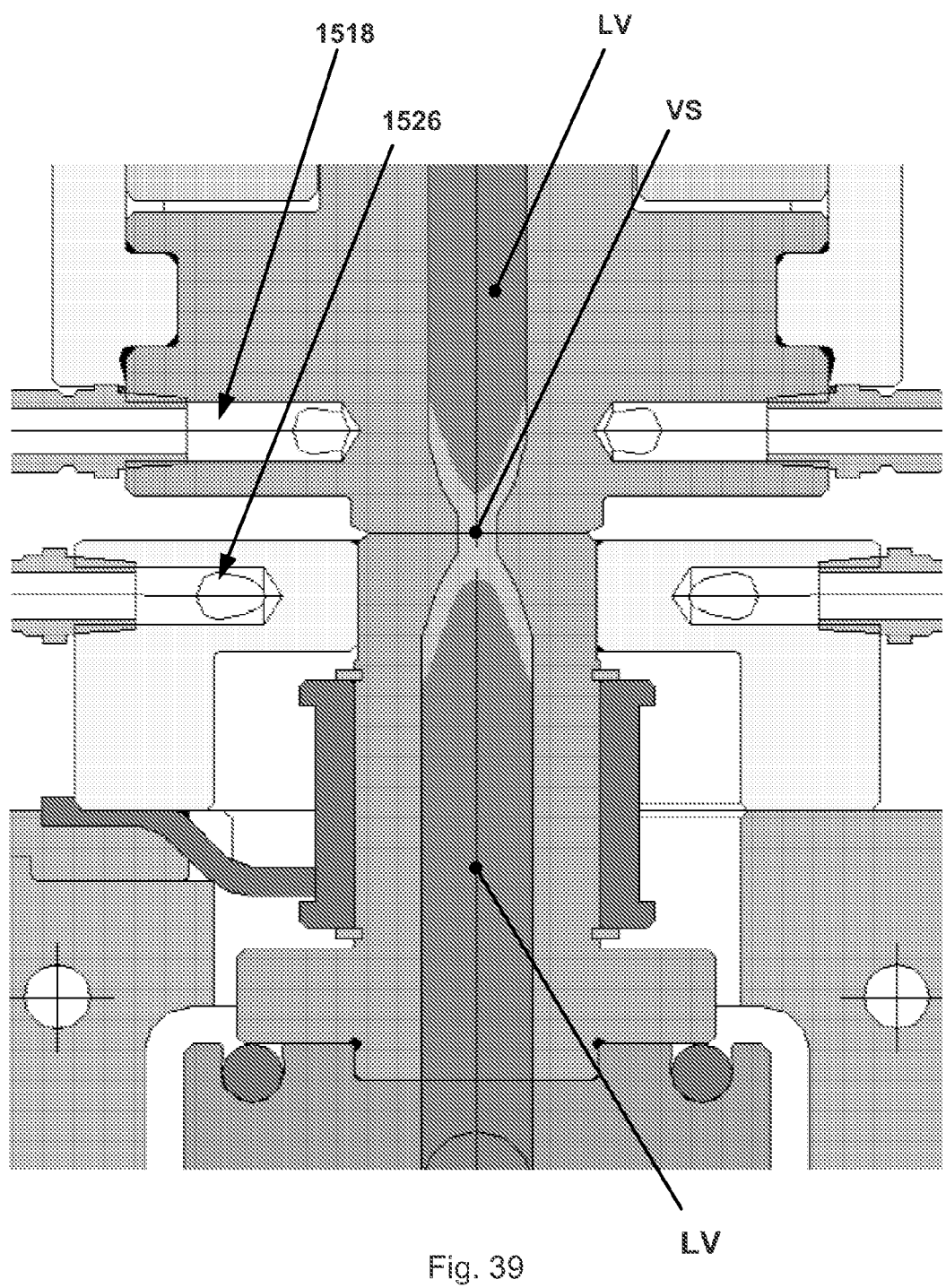
FIG. 39 is an enlarged section detail of the central portion of FIG. 38, showing the cooling of the central portion to create a viscous seal from the molten plastic.

FIG. 39 shows a close-up view of the system 1500 while in use. Molten plastic (depicted by the shading) is passed through the chamber 1528 while coolant is passed through the primary cooling channel 1518 and secondary cooling channel 1526. This causes the area about the parting line to cool the molten plastic, which in turn causes the molten plastic about the parting line to have a higher viscosity as compared to lower viscosity LV areas before and after the parting line. The area of high viscosity creates a viscous seal VS which prevents molten plastic from seeping past the parting line, but still enables to flow of molten plastic. The viscous seal VS eliminates the need for additional seals (e.g., o-rings) and/or mechanical pins. Valves can control the flow of coolant to the primary cooling channel 1518 and secondary cooling channel 1526 in order to regulate the temperature of the area about the parting line, and thus the viscosity of the viscous seal. More coolant flow results in a higher viscosity viscous seal VS, and less coolant flow results in a comparatively lower viscosity viscous seal VS.

It should be understood that while an hourglass shaped chamber 1528 is depicted, other shapes may be used, such as a straight cylinder with a uniform diameter or a shape with an increased diameter about the parting line. Cooling may need to be adjusted (i.e., increased) to accommodate non-hourglass shapes.

FIG. 40 shows the primary side 1500a of the system 1500 decoupled from the secondary side 1500b (not shown). The primary side 1500a of the system 1500 is accessible from the front. Both sides 1500a,b of the system can be accessed for maintenance and configuration changes. Although not shown in this view, the secondary side 1500b of the system 1500 is also accessible. This allows on-system maintenance access to the internal portions of the secondary sprue 1520 without removing the secondary sprue 1520 from the system 1500.

The crossover nozzle system in general and that of the six alternative embodiment described above provides the following advantageous features, in addition to the several features mentioned previously:

1. The parting line is located at the smallest diameter of the hourglass shaped chamber, which provides lower fluidic sealing requirements.

2. Cooling around the parting line is provided to provide a viscous seal from the molten plastic.

3. The viscous seal provides complete fluid sealing for the parting line, thus eliminating the need for additional seals (e.g., o-rings) and/or mechanical pins.

4. The cooling channels may be equipped with valves to control and adjust the viscous seal, thus improving cycle time.

5. The system is easily accessible from the front which allows on-system maintenance and reducing system downtime.

As will be understood by those skilled in the art, the present invention may be embodied in other specific forms without departing from the essential characteristics thereof. These other embodiments are intended to be included within the scope of the present invention, which is set forth in the following claims.

What is claimed is:

1. A crossover nozzle system for transferring molten plastic from a feeder manifold to a main manifold of the molding chambers of the stack molds of an injection molding machine, the system comprising:
 a primary system side comprising:
  a primary sprue bar having an inlet hole that is in fluid communication with a feeder manifold;
  a floating sprue insert within a cavity of the primary sprue bar, the floating sprue insert having a plurality of radial holes in fluid communication with the inlet hole; and
  a primary sprue insert connected to the primary sprue bar, the primary sprue insert having a primary sprue insert hole that is in fluid communication with the plurality of radial holes, the primary sprue insert having a primary opening that is in fluid communication with the primary insert hole, the primary sprue insert having a primary cooling channel adjacent to the primary opening; and
 a secondary system side in contact with the primary system side, the secondary side comprising a moveable secondary sprue, wherein the primary sprue insert is configured to contact the moveable secondary sprue, the secondary sprue having a secondary opening that is in fluid communication with a secondary sprue hole, the secondary sprue hole being in fluid communication with the main manifold, the secondary sprue having a secondary cooling channel adjacent to the secondary opening, wherein the primary and secondary insert holes contact to form a chamber and the primary and secondary openings meet at a parting line, wherein the primary and secondary cooling channels are configured to cool the primary and secondary sprues, respectively, about the parting line to cool molten plastic passing through a portion of the chamber and create a viscous seal from the molten plastic.

2. The crossover nozzle system of claim 1, wherein the chamber has an hourglass profile with a reduced cross-section.

3. The crossover nozzle system of claim 2, wherein the reduced cross-section is at the parting line.

4. The crossover nozzle system of claim 3, wherein the viscous seal comprises a zone of increased viscosity of the molten plastic about the reduced cross-section.

5. The crossover nozzle system of claim 4, wherein molten plastic is at a lower viscosity before and after the reduced cross-section.

6. The crossover nozzle system of claim 1, wherein the viscous seal provides the only seal for the parting line.

7. The crossover nozzle system of claim 1, wherein the primary and secondary cooling channels are fluidly connected to flow valves that regulate the flow of a cooling liquid to the primary and secondary cooling channels to control the temperature of the viscous seal.

8. The crossover nozzle system of claim 1, wherein the primary and secondary cooling channels are fluidly connected in series or parallel to one or more cooling channels of a molding chamber without the use of dedicated valves.

9. The crossover nozzle system of claim 1, wherein the secondary sprue has a heating unit to heat the molten plastic of the secondary sprue hole after the viscous seal.

10. The crossover nozzle system of claim 1, wherein the primary sprue bar does not have a shutoff valve.

11. The crossover nozzle system of claim 1, wherein the chamber is cylindrical with a uniform cross-section.

12. The crossover nozzle system of claim 1, wherein the secondary sprue is configured to separate from the primary sprue insert in order to allow access to the primary and secondary system sides for maintenance.

13. A crossover nozzle system for transferring molten plastic from a feeder manifold to a main manifold of the molding chambers of the stack molds of an injection molding machine, the system comprising:

a primary system side comprising:
  a primary sprue bar having an inlet hole that is in fluid communication with a feeder manifold;
  a floating sprue insert within a cavity of the primary sprue bar, the floating sprue insert having a plurality of radial holes in fluid communication with the inlet hole; and
  a primary sprue insert connected to the primary sprue bar, the primary sprue insert having a primary sprue insert hole that is in fluid communication with the plurality of radial holes, the primary sprue insert having a primary opening that is in fluid communication with the primary insert hole, the primary sprue insert having a primary cooling channel adjacent to the primary opening;

a secondary system side comprising:
  a secondary sprue moveably in contact with the primary sprue insert, the secondary sprue having a secondary opening that is in fluid communication with a secondary sprue hole, the secondary sprue hole being in fluid communication with the main manifold, the secondary sprue having a secondary cooling channel adjacent to the secondary opening;

wherein the primary and secondary insert holes form an hour-glass shaped chamber and the primary and secondary openings meet at a parting line located at a reduced diameter of the hour-glass shaped chamber, wherein the primary and secondary cooling channels are configured to cool the hour-glass shaped chamber about the parting line to cool molten plastic passing through a portion of the chamber and create a viscous seal from the molten plastic.

14. The crossover nozzle system of claim 13, wherein the viscous seal comprises a zone of increased viscosity of the molten plastic at the reduced cross-section.

15. The crossover nozzle system of claim 14, wherein molten plastic is at a lower viscosity before and after the reduced cross-section.

16. The crossover nozzle system of claim 13, wherein the viscous seal provides the only seal for the parting line.

17. The crossover nozzle system of claim 13, wherein the primary sprue bar does not have a shutoff valve.

18. The crossover nozzle system of claim 13, wherein the primary and secondary cooling channels are fluidly connected to flow valves that regulate the flow of a cooling liquid to the primary and secondary cooling channels to control the viscosity of the viscous seal.

19. The crossover nozzle system of claim 13, wherein the primary and secondary cooling channels are fluidly connected in series or parallel to one or more cooling channels of a molding chamber without the use of dedicated valves.

20. The crossover nozzle system of claim 13, wherein the secondary sprue has a heating unit to heat the molten plastic secondary sprue hole after the viscous seal.

21. The crossover nozzle system of claim 13, wherein the secondary sprue is configured to separate from the primary sprue insert in order to allow access to the primary system and secondary system sides for maintenance.

* * * * *